US011943457B2

(12) United States Patent
Kato et al.

(10) Patent No.: US 11,943,457 B2
(45) Date of Patent: Mar. 26, 2024

(54) INFORMATION PROCESSING APPARATUS AND METHOD

(71) Applicant: SONY GROUP CORPORATION, Tokyo (JP)

(72) Inventors: Tsuyoshi Kato, Kanagawa (JP); Satoru Kuma, Tokyo (JP); Ohji Nakagami, Tokyo (JP); Hiroyuki Yasuda, Saitama (JP); Koji Yano, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 234 days.

(21) Appl. No.: 17/438,269

(22) PCT Filed: Mar. 5, 2020

(86) PCT No.: PCT/JP2020/009331
§ 371 (c)(1),
(2) Date: Sep. 10, 2021

(87) PCT Pub. No.: WO2020/189296
PCT Pub. Date: Sep. 24, 2020

(65) Prior Publication Data
US 2022/0191520 A1 Jun. 16, 2022

(30) Foreign Application Priority Data

Mar. 19, 2019 (JP) .................................. 2019-051291
Jun. 26, 2019 (JP) .................................. 2019-118635
Oct. 1, 2019 (JP) .................................. 2019-181399

(51) Int. Cl.
H04N 19/30 (2014.01)
H04N 19/124 (2014.01)
(Continued)

(52) U.S. Cl.
CPC .......... *H04N 19/30* (2014.11); *H04N 19/124* (2014.11); *H04N 19/1883* (2014.11); *H04N 19/50* (2014.11)

(58) Field of Classification Search
CPC ... G06T 17/005; G06T 2210/56; G06T 9/001; G06T 9/004; H04N 19/124; H04N 19/1883; H04N 19/20; H04N 19/30; H04N 19/50; H04N 19/597; H04N 19/85
USPC ..................................................... 375/240.03
See application file for complete search history.

(56) References Cited

U.S. PATENT DOCUMENTS

2017/0347100 A1  11/2017  Chou
2019/0080483 A1   3/2019  Mammou et al.
(Continued)

FOREIGN PATENT DOCUMENTS

JP   2018-101404 A    6/2018
WO   WO-2020138352 A1 *  7/2020  ............... G06T 9/00
WO   WO-2020189943 A1 *  9/2020  ............... G06T 9/00

OTHER PUBLICATIONS

Rufael Mekuria et al., Design, Implementation and Evaluation of a Point Cloud Codec for Tele-Immersive Video, IEEE Transactions on Circuits and Systems for Video Technology, Jan. 2016, pp. 1-14, IEEE.

(Continued)

*Primary Examiner* — Kathleen M Walsh
(74) *Attorney, Agent, or Firm* — Paratus Law Group, PLLC

(57) ABSTRACT

There is provided an information processing apparatus, an image processing apparatus, an encoding device, a decoding device, an information processing method, and a program that facilitate scalable decoding of attribute information. Regarding the attribute information about a point cloud representing a three-dimensional object, a process of classifying the respective points of the point cloud into prediction points that are the points at which difference values (Continued)

between the attribute information and predicted values are left, and reference points that are the points at which the attribute information is referred to during derivation of the predicted values is recursively repeated on the reference points, so that the attribute information is hierarchized. At the time of the hierarchization, the prediction points are selected so that points also exist in voxels of the hierarchical level one level higher than the hierarchical level to which the voxels containing the points of the current hierarchical level belong.

16 Claims, 46 Drawing Sheets

(51) Int. Cl.
*H04N 19/169* (2014.01)
*H04N 19/50* (2014.01)

(56) References Cited

U.S. PATENT DOCUMENTS

| | | | | |
|---|---|---|---|---|
| 2019/0081638 | A1* | 3/2019 | Mammou | H04N 19/436 |
| 2021/0227259 | A1* | 7/2021 | Sugio | H04N 19/463 |
| 2021/0383577 | A1* | 12/2021 | Sugio | H04N 19/597 |
| 2022/0159284 | A1* | 5/2022 | Hur | H04N 21/2393 |
| 2022/0312036 | A1* | 9/2022 | Sugio | G06T 9/00 |

OTHER PUBLICATIONS

Khaled Mammou et al., Lifting Scheme for Lossy Attribute Encoding in TMC1, International Organisation for Standardisation, Coding of Moving Pictures and Audio, ISO/IEC JTC1/SC29/WG11, MPEG2018/m42640, Apr. 2018, pp. 1-9, San Diego, US.

Mammou et al., G-PCC codec description v2, International Organisation for Standardisation Coding of Moving Pictures and Audio, ISO/IEC JTC1/SC29/WG11 N18189, Jan. 2019, pp. 1-39, Marrakech, MA.

Nakagami et al., [G-PCC] Spatial scalability support for G-PCC, International Organisation for Standardisation Coding of Moving Pictures and Audio, ISO/IEC JTC1/SC29/WG11 MPEG2019/m47352, Mar. 2019, pp. 1-11, Geneva, CH.

Kuma et al., [G-PCC] New proposal CE13.15 Related on improved weight derivation for spatial scalable lifting, International Organisation for Standardisation Coding of Moving Pictures and Audio, ISO/IEC JTC1/SC29/WG11 MPEG 2019/m50743, Oct. 2019, pp. 1-3, Geneva, CH.

* cited by examiner

FIG. 6

| | | |
|---|---|---|
| 1 | | PREDICTION POINTS ARE SELECTED SO THAT ATTRIBUTE INFORMATION REMAINS IN VOXELS OF HIGHER LOD |
| | 1-1 | IN BOTH ENCODING AND DECODING, PREDICTED VALUES ARE DERIVED WITH USE OF POSITIONAL INFORMATION AT RESOLUTION OF CURRENT LOD |
| | 1-1' | IN DECODING, PREDICTED VALUES ARE DERIVED WITH USE OF POSITIONAL INFORMATION AT RESOLUTION OF CURRENT LOD |
| | 1-2 | PREDICTED VALUES ARE DERIVED WITH USE OF VIRTUAL REFERENCE POINTS |

FIG. 12

| | | |
|---|---|---|
| 1 | | QUANTIZATION IS PERFORMED WITH USE OF QUANTIZATION WEIGHT FOR EACH LOD |
| | 1-1 | QUANTIZATION WEIGHT DERIVATION FUNCTION IS SHARED BETWEEN ENCODING AND DECODING |
| | 1-1-1 | PREDETERMINED FUNCTION IS SHARED BEFOREHAND |
| | 1-1-2 | FUNCTION-DEFINING PARAMETERS ARE TRANSMITTED |
| | 1-2 | QUANTIZATION WEIGHTS ARE SHARED BETWEEN ENCODING AND DECODING |
| | 1-2-1 | PREDETERMINED QUANTIZATION WEIGHTS ARE SHARED BEFOREHAND |
| | 1-2-2 | QUANTIZATION WEIGHTS ARE TRANSMITTED |
| 2 | | QUANTIZATION WEIGHTS FOR RESPECTIVE POINTS ARE TRANSMITTED |
| | 2-1 | QUANTIZATION WEIGHTS FOR ALL POINTS ARE TRANSMITTED |
| | 2-2 | DIFFERENCE VALUES OF RESPECTIVE POINTS ARE TRANSMITTED |

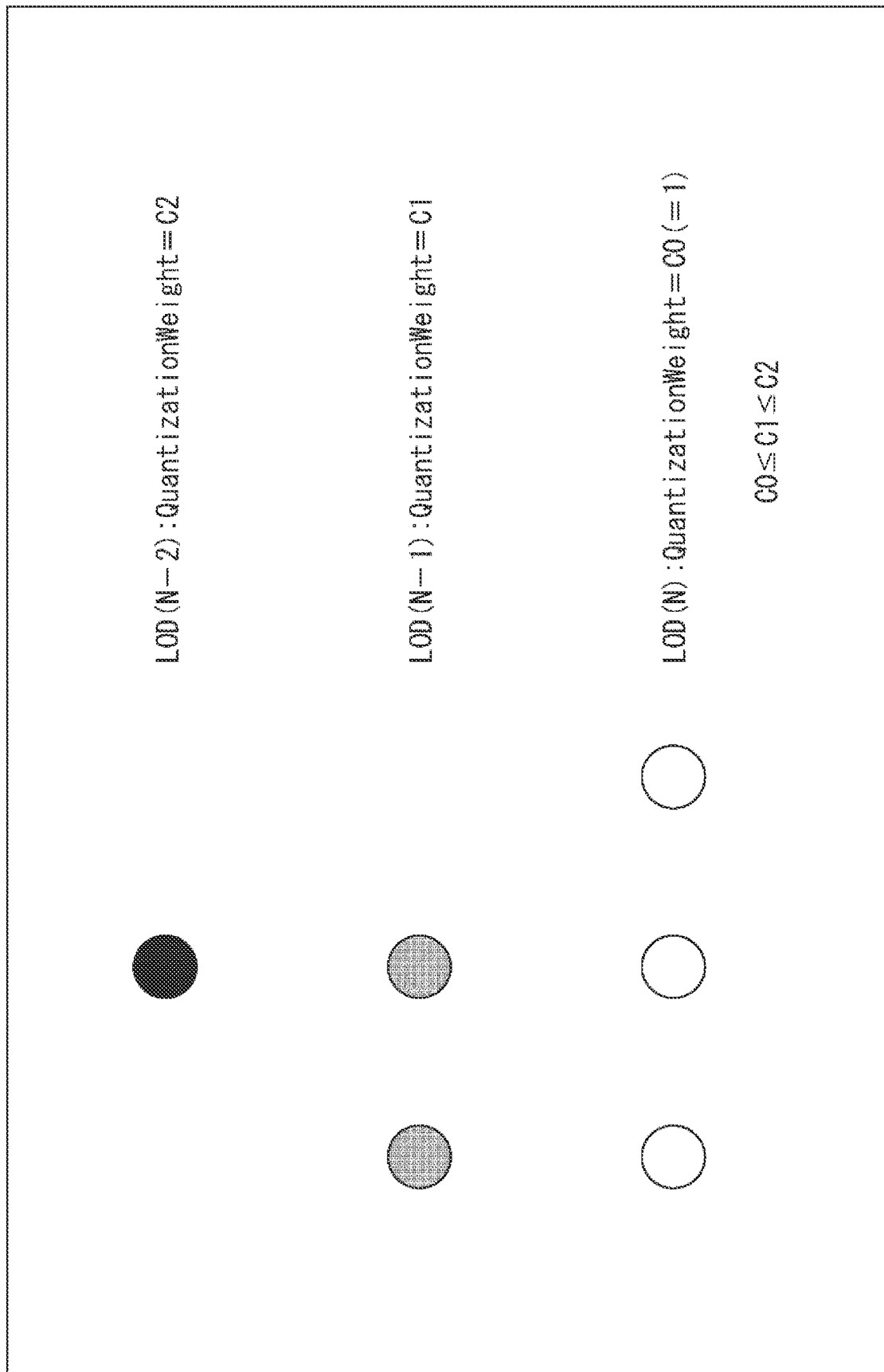

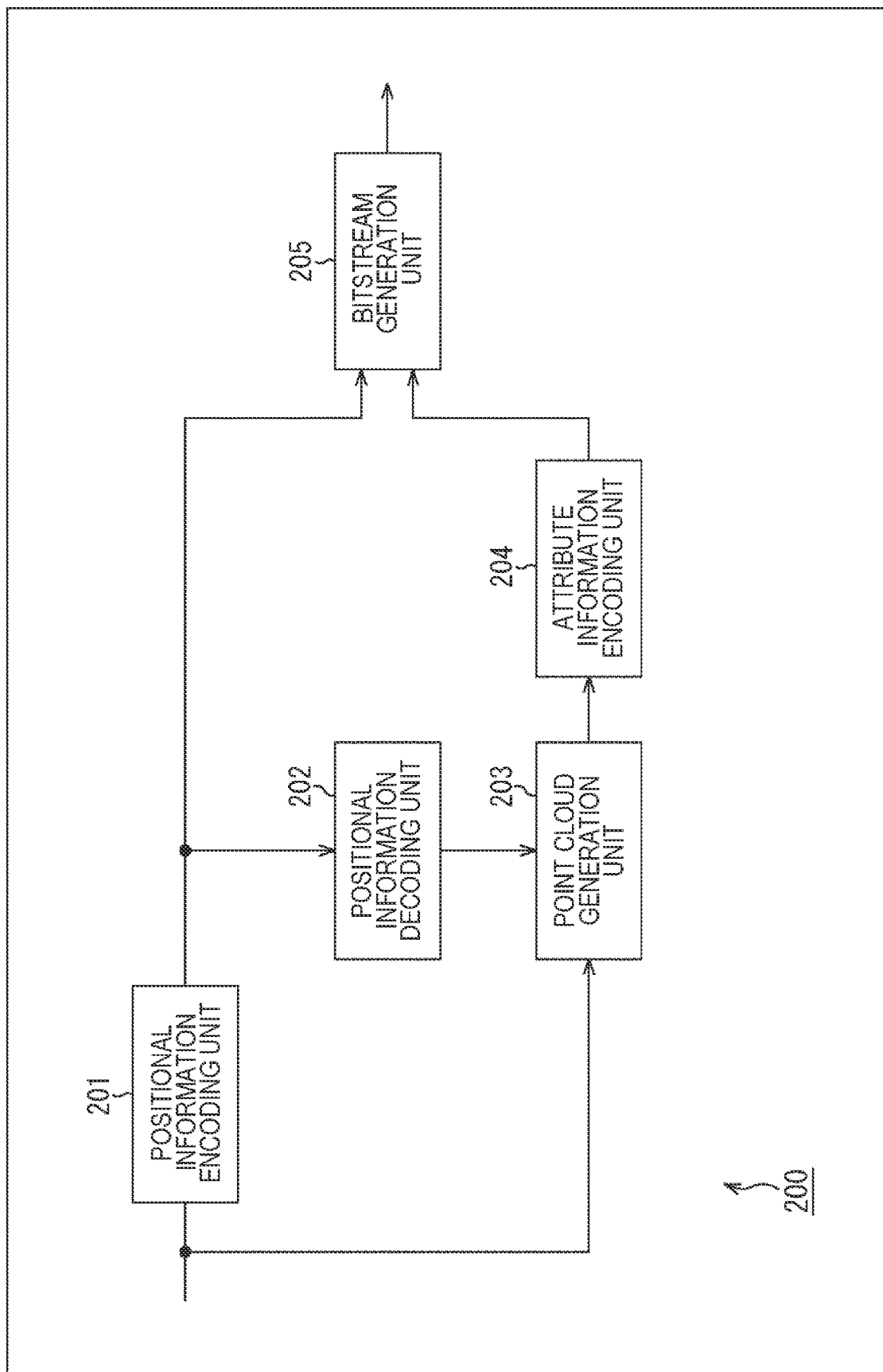

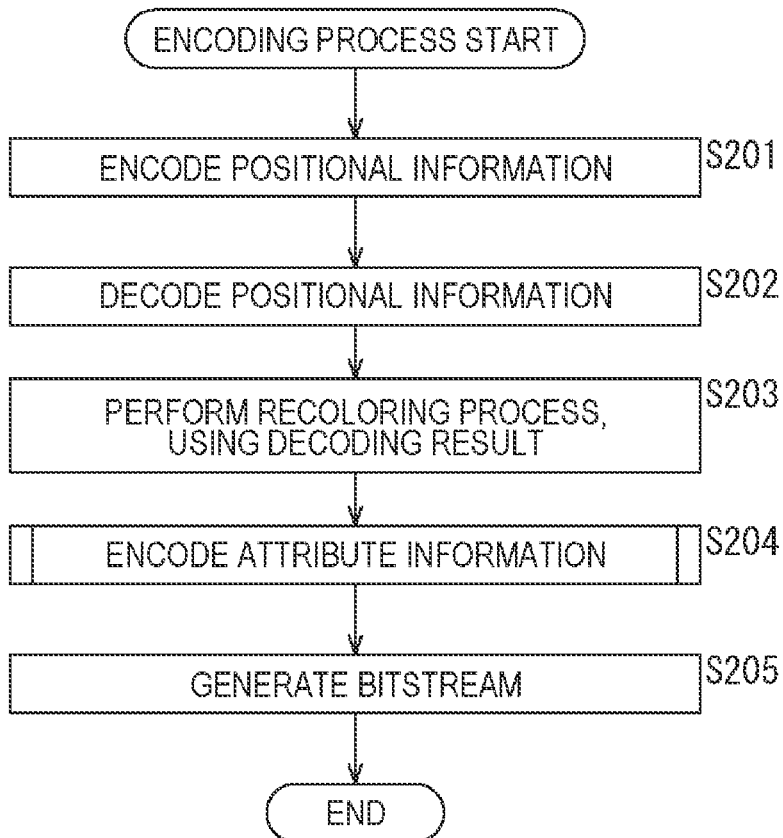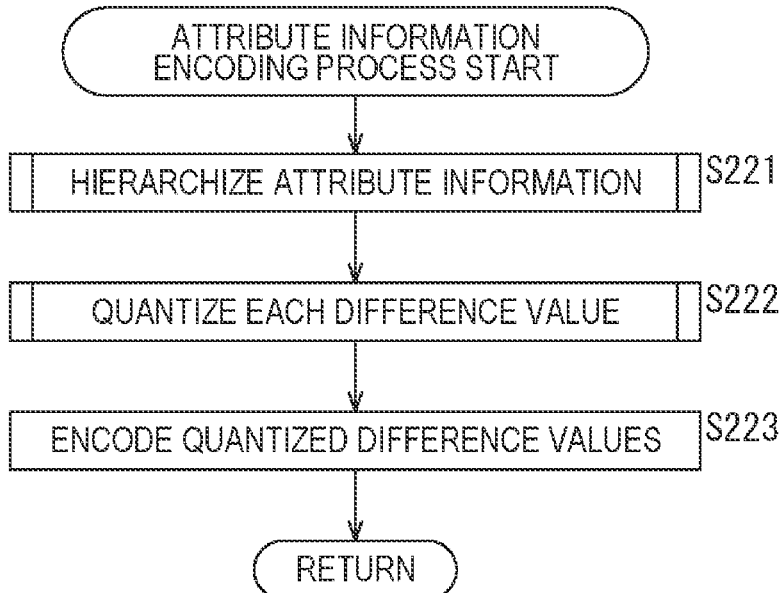

FIG. 37 for $i = 0$ to $i = LoDCount$ $$QuantizationWeight[i] = \frac{pointCount}{predictorCount[i]} = \frac{\sum_{k=0}^{LoDCount} predictorCount[k]}{predictorCount[i]}$$

.... (1 1)

if ($i == LoDCount$)

$QuantizationWeight[i] = 1$

.... (1 2)

A for $i = 0$ to $i = LoDCount$ $$QuantizationWeight[i] = \frac{\sum_{k=i}^{LoDCount} predictorCount[k]}{predictorCount[i]}$$

| | | | | | 2 | | 4 |
| - | - | - | - | - | - | - | - |
| | | | | 2 | | 4 | |
| | | | 1 | | | 3 | |
| | | | 2 | | | 4 | |
| | | 1 | 2 | | 4 | | |
| | 0 | 0 | 0 | 0 | 3 | 0 | 4 |

| 1 | 2 | 3 | 4 | 5 |
|---|---|---|---|---|
| 0 | 0 | 0 | 0 | 0 |
|   | 1 | 2 | 3 | 4 |
|   | 3 | 2 | ⋮ | 4 |
|   |   | 1 |   | 4 |
|   |   | 3 |   | 3 |
|   |   | 2 |   | 4 |
|   |   | 2 |   | 4 |
|   |   |   |   | ⋮ |

# INFORMATION PROCESSING APPARATUS AND METHOD

CROSS REFERENCE TO PRIOR APPLICATION

This application is a National Stage Patent Application of PCT International Patent Application No. PCT/JP2020/009331 (filed on Mar. 5, 2020) under 35 U.S.C. § 371, which claims priority to Japanese Patent Application Nos. 2019-051291 (filed on Mar. 19, 2019), 2019-118635 (filed on Jun. 26, 2019), and 2019-181399 (filed on Oct. 1, 2019), which are all hereby incorporated by reference in their entirety.

TECHNICAL FIELD

The present disclosure relates to information processing apparatuses and methods, and more particularly to information processing apparatuses and methods that enable easier scalable decoding of attribute information.

BACKGROUND ART

Methods for encoding 3D data representing a three-dimensional structure such as a point cloud, for example, have been developed (see Non-Patent Document 1, for example). Point cloud data includes positional information and attribute information about each point. Therefore, point cloud encoding is performed on both the positional information and the attribute information. As a method for encoding attribute information, a technique called "lifting" has been suggested, for example (see Non-Patent Document 2, for example).

Meanwhile, scalable decoding of such encoded data of a point cloud has been considered. For example, when a wide three-dimensional space is represented by a point cloud, the amount of encoded data is very large. Decoding all of the data will unnecessarily increase the load. Therefore, scalable decoding is required so that the necessary data of the object can be obtained at the required resolution.

CITATION LIST

Non-Patent Documents

Non-Patent Document 1: R. Mekuria, Student Member IEEE, and K. Blom and P. Cesar, Members IEEE, "Design, Implementation and Evaluation of a Point Cloud Codec for Tele-Immersive Video", tcsvt_paper_submitted_february.pdf Non-Patent Document 2: Khaled Mammou, Alexis Tourapis, Jungsun Kim, Fabrice Robinet, Valery Valentin, and Yeping Su, "Lifting Scheme for Lossy Attribute Encoding in TMC1", ISO/IEC JTC1/SC29/WG11 MPEG2018/m42640, April 2018, San Diego, US

SUMMARY OF THE INVENTION

Problems to be Solved by the Invention

In the case of a conventional encoding method, however, highest-resolution positional information is required in decoding encoded data of attribute information. Therefore, positional information needs to be decoded at an unnecessarily high resolution, which might increase the load of the decoding process.

The present disclosure has been made in view of such circumstances, and is to enable easier scalable decoding of attribute information.

Solutions to Problems

An information processing apparatus according to one aspect of the present technology is an information processing apparatus that includes a hierarchization unit that performs hierarchization of attribute information about a point cloud representing a three-dimensional object by recursively repeating, on a reference point, a process of classifying the respective points of the point cloud into a prediction point that is a point at which a difference value between the attribute information and a predicted value is left, and the reference point that is a point at which the attribute information is referred to during derivation of the predicted value. During the hierarchization, the hierarchization unit selects the prediction point so that a point also exists in a voxel of a hierarchical level one level higher than the hierarchical level to which voxels containing points of a current hierarchical level belong.

An information processing method according to one aspect of the present technology is an information processing method that includes: performing hierarchization of attribute information about a point cloud representing a three-dimensional object by recursively repeating, on a reference point, a process of classifying points of the point cloud into a prediction point that is a point at which a difference value between the attribute information and a predicted value is left, and the reference point that is a point at which the attribute information is referred to during derivation of the predicted value; and selecting, during the hierarchization, the prediction point in such a manner that a point also exists in a voxel of a hierarchical level one level higher than a hierarchical level to which voxels containing points of a current hierarchical level belong.

An information processing apparatus according to another aspect of the present technology is an information processing apparatus that includes an inverse hierarchization unit that performs inverse hierarchization of attribute information about a point cloud representing a three-dimensional object, the attribute information having been hierarchized by recursively repeating, on a reference point, a process of classifying points of the point cloud into a prediction point that is a point at which a difference value between the attribute information and a predicted value is left, and the reference point that is a point at which the attribute information is referred to during derivation of the predicted value. During the inverse hierarchization, the inverse hierarchization unit derives the predicted value of the attribute information about the prediction point at each hierarchical level using the attribute information about the reference point and positional information at a resolution of a hierarchical level that is not the lowest hierarchical level of the point cloud, and derives the attribute information about the prediction point using the predicted value and the difference value.

An information processing method according to another aspect of the present technology is an information processing method that includes: performing inverse hierarchization of attribute information about a point cloud representing a three-dimensional object, the attribute information having been hierarchized by recursively repeating, on a reference point, a process of classifying points of the point cloud into a prediction point that is a point at which a difference value between the attribute information and a predicted value is left, and the reference point that is a point at which the attribute information is referred to during derivation of the predicted value; and deriving, during the inverse hierarchization, the predicted value of the attribute information about the prediction point at each hierarchical level using the attribute information about the reference point and positional information at a resolution of a hierarchical level that is not the lowest hierarchical level of the point cloud, and deriving the attribute information about the prediction point using the predicted value and the difference value.

An information processing apparatus according to yet another aspect of the present technology is an information processing apparatus that includes: a generation unit that generates information indicating a hierarchical structure of positional information about a point cloud representing a three-dimensional object; and a hierarchization unit that hierarchizes attribute information about the point cloud to associate the attribute information with the hierarchical structure of the positional information, on the basis of the information generated by the generation unit.

An information processing apparatus according to still another aspect of the present technology is an information processing apparatus that includes: a generation unit that generates information indicating a hierarchical structure of positional information about a point cloud representing a three-dimensional object; and an inverse hierarchization unit that inversely hierarchizes attribute information about the point cloud, to associate a hierarchical structure of the attribute information with the hierarchical structure of the positional information, on the basis of the information generated by the generation unit.

In the information processing apparatus and method according to one aspect of the present technology, the attribute information about a point cloud representing a three-dimensional object is hierarchized by recursively repeating, on reference points, a process of classifying the respective points of the point cloud into prediction points that are the points at which difference values between the attribute information and predicted values are left, and the reference points that are the points at which the attribute information is referred to during derivation of the predicted values. At the time of the hierarchization, the prediction points are selected so that points also exist in voxels of the hierarchical level one level higher than the hierarchical level to which the voxels containing points of the current hierarchical level belong.

In the information processing apparatus and method according to another aspect of the present technology, regarding the attribute information about a point cloud representing a three-dimensional object, a process of classifying the respective points of the point cloud into prediction points that are the points at which difference values between the attribute information and predicted values are left, and reference points that are the points at which the attribute information is referred to during derivation of the predicted values is recursively repeated on the reference points, so that inverse hierarchization of hierarchized attribute information is performed. At the time of the inverse hierarchization, predicted values of the attribute information about the prediction points are derived at each hierarchical level with the use of the attribute information about the reference points and the positional information at the resolution of a hierarchical level that is not the lowest hierarchical level of the point cloud, and the attribute information about the prediction points is derived with the use of the predicted values and the difference values.

In the information processing apparatus according to yet another aspect of the present technology, information indicating the hierarchical structure of the positional information about a point cloud representing a three-dimensional object is generated, and, on the basis of the generated information, the attribute information about the point cloud is hierarchized to be associated with the hierarchical structure of the positional information.

In the information processing apparatus according to still another aspect of the present technology, information indicating the hierarchical structure of the positional information about a point cloud representing a three-dimensional object is generated, and, on the basis of the generated information, the attribute information about the point cloud is inversely hierarchized, the hierarchical structure of the attribute information being regarded as being associated with the hierarchical structure of the positional information.

BRIEF DESCRIPTION OF DRAWINGS

FIG. 6 is a diagram for explaining example methods for hierarchizing attribute information.

FIG. 12 is a diagram for explaining an example of a quantization method.

FIG. 13 is a diagram for explaining an example of quantization.

FIG. 14 is a block diagram showing a typical example configuration of an encoding device.

FIG. 17 is a flowchart for explaining an example flow in an encoding process.

FIG. 18 is a flowchart for explaining an example flow in an attribute information encoding process.

FIG. 37 is a diagram showing examples of derivation of quantization weights.

FIG. 39 is a diagram showing an example of labeling.

FIG. 41 is a diagram showing an example of labeling.

FIG. 42 is a diagram showing an example of labeling.

MODE FOR CARRYING OUT THE INVENTION

Figure 1:
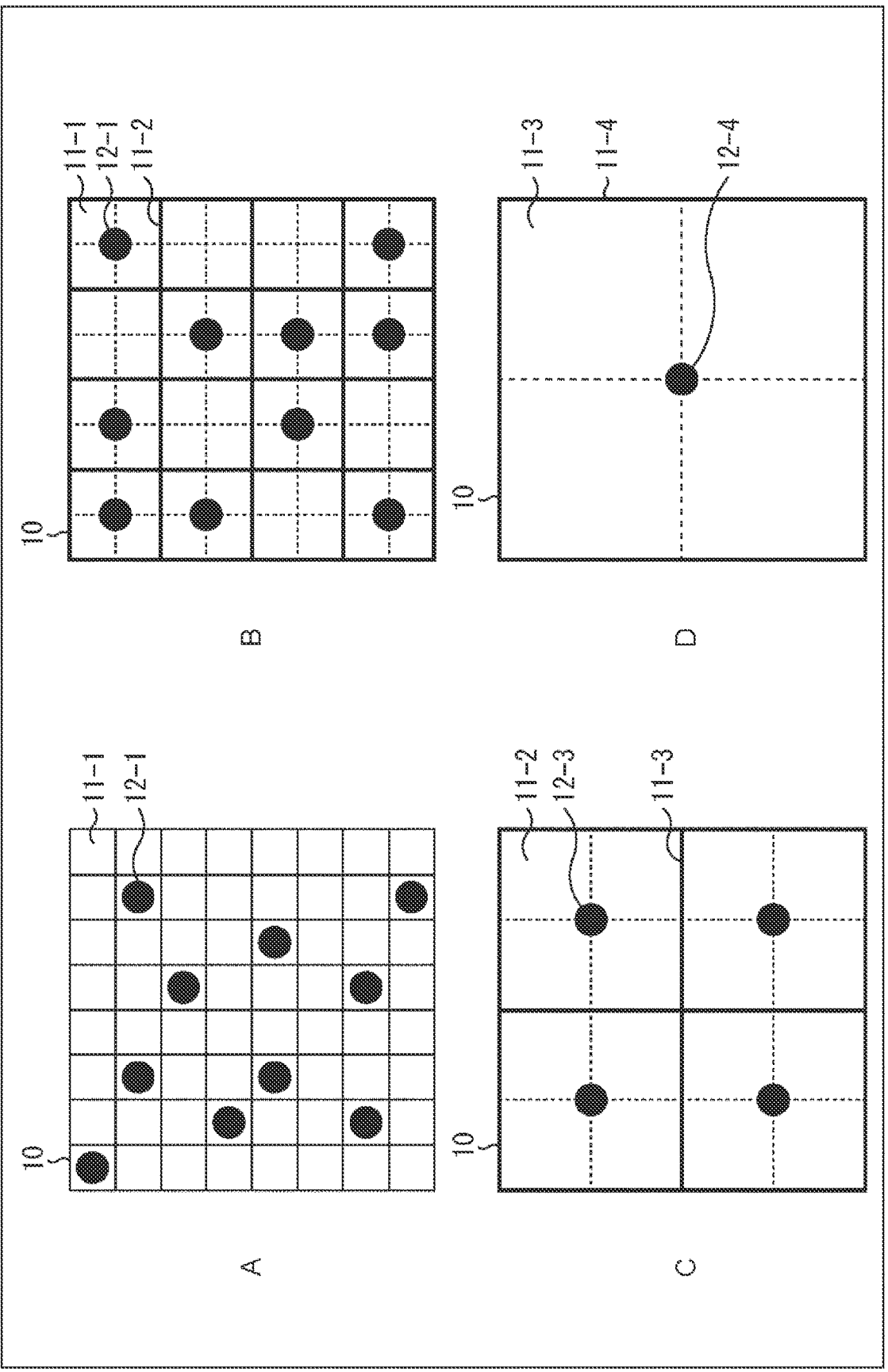
FIG. 1 is a diagram for explaining an example of hierarchization of positional information.

The following is a description of modes for carrying out the present disclosure (the modes will be hereinafter referred to as embodiments). Note that explanation will be made in the following order.

1. Scalable decoding
2. First embodiment (an encoding device)
3. Second embodiment (a decoding device)
4. DCM
5. Quantization Weights
6. LoD Generation
7. Notes

1. Scalable Decoding

<Documents and the Like that Support Technical Contents and Terms>

The scope disclosed in the present technology includes not only the contents disclosed in the embodiments but also the contents disclosed in the following non-patent documents that were known at the time of filing.

Non-Patent Document 1: (mentioned above)
Non-Patent Document 2: (mentioned above)
Non-Patent Document 3: TELECOMMUNICATION STANDARDIZATION SECTOR OF ITU (International Telecommunication Union), "Advanced video coding for generic audiovisual services", H.264, April 2017
Non-Patent Document 4: TELECOMMUNICATION STANDARDIZATION SECTOR OF ITU (International Telecommunication Union), "High efficiency video coding", H.265, December 2016
Non-Patent Document 5: Jianle Chen, Elena Alshina, Gary J. Sullivan, Jens-Rainer, and Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017
Non-Patent Document 6: Sebastien Lasserre and David Flynn, "[PCC] Inference of a mode using point location direct coding in TMC3", ISO/IEC JTC1/SC29/WG11 MPEG2018/m42239, January 2018, Gwangju, Korea That is, the contents disclosed in the non-patent documents listed above are also the basis for determining the support requirements. For example, even when the Quad-Tree Block Structure disclosed in Non-Patent Document 4 and the Quad Tree Plus Binary Tree (QTBT) Block Structure disclosed in Non-Patent Document 4 are not directly disclosed in the embodiments, those structures are within the scope of the present technology, and satisfy the support requirements of the claims. Further, the technical terms such as parsing, syntax, and semantics are also within the scope of disclosure of the present technology, and satisfy the support requirements of the claims, even when those technical terms are not directly described, for example.

<Point Cloud>

There have been 3D data such as point clouds that represent three-dimensional structures with positional information, attribute information, and the like about points, and meshes that are formed with vertices, edges, and planes, and define three-dimensional shapes using polygonal representations.

For example, in the case of a point cloud, a three-dimensional structure (a three-dimensional object) is expressed as a set of a large number of points. That is, the data of a point cloud (also referred to as point cloud data) is formed with positional information and attribute information about the respective points in this point cloud. The attribute information includes color information, reflectance information, and normal information, for example. Accordingly, the data structure is relatively simple, and any desired three-dimensional structure can be expressed with a sufficiently high accuracy with the use of a sufficiently large number of points.

<Octree>

Since the amount of such point cloud data is relatively large, compression of data amounts by encoding has been considered, as disclosed in Non-Patent Document 1, for example. Positional information about a point cloud is first encoded (decoded), and attribute information is then encoded (decoded), for example. The positional information is quantized with voxels at the time of encoding, and is further hierarchized into an octree.

Voxels are small regions of a predetermined size that divide a three-dimensional space. The positional information is corrected so that a point is provided for each voxel. As shown in A of FIG. 1, for example, a region 10 as a two-dimensional region is divided by voxels 11-1 represented by squares, and the positional information about each point 12-1 is corrected so that a point 12-1 represented by a black circle is provided for each of the voxels 11-1. That is, the positional information is quantized in accordance with the size of the voxels. Note that, in A of FIG. 1, only one voxel 11-1 is denoted by a reference numeral, but all the squares in the region 10 in A of FIG. 1 are voxels 11-1. Likewise, all the black circles shown in A of FIG. 1 are points 12-1.

In an octree, one voxel is divided into two in each of the x, y, and z directions (which means that it is divided into eight), to form voxels of a hierarchical level (also called LoD) that is one level lower. In other words, two voxels aligned in each of the x, y, and z directions (which are eight voxels in total) are integrated to form a voxel of a hierarchical level (LoD) that is one level higher. The positional information is then quantized with the voxels at each hierarchical level.

For example, in the case illustrated in A of FIG. 1, the region is two-dimensional. Therefore, four voxels 11-1 aligned vertically and horizontally as shown in B of FIG. 1 are integrated, to form a voxel 11-2 of one higher level indicated by bold lines. The positional information is then quantized with this voxel 11-2. That is, when a point 12-1 (A of FIG. 1) exists in the voxel 11-2, its positional information is corrected, so that the point 12-1 is converted into a point 12-2 corresponding to the voxel 11-2. Note that, in B of FIG. 1, only one voxel 11-1 is denoted by a reference numeral, but all the squares indicated by dotted lines in the region 10 in B of FIG. 1 are voxels 11-1. Also, in B of FIG. 1, only one voxel 11-2 is denoted by a reference numeral, but all the squares indicated by bold lines in the region 10 in B of FIG. 1 are voxels 11-2. Likewise, all the black circles shown in B of FIG. 1 are points 12-2.

Likewise, as shown in C of FIG. 1, four voxels 11-2 aligned vertically and horizontally are integrated, to form a voxel 11-3 of one higher level indicated by bold lines. The positional information is then quantized with this voxel 11-3. That is, when a point 12-2 (B of FIG. 1) exists in the voxel 11-3, its positional information is corrected, so that the point 12-2 is converted into a point 12-3 corresponding to the voxel 11-3. Note that, in C of FIG. 1, only one voxel 11-2 is denoted by a reference numeral, but all the squares indicated by dotted lines in the region 10 in C of FIG. 1 are voxels 11-2. Also, in C of FIG. 1, only one voxel 11-3 is denoted by a reference numeral, but all the squares indicated by bold lines in the region 10 in C of FIG. 1 are voxels 11-3. Likewise, all the black circles shown in C of FIG. 1 are points 12-3.

Likewise, as shown in D of FIG. 1, four voxels 11-3 aligned vertically and horizontally are integrated, to form a voxel 11-4 of one higher level indicated by bold lines. The positional information is then quantized with this voxel 11-4. That is, when a point 12-3 (C of FIG. 1) exists in the voxel 11-4, its positional information is corrected, so that the point 12-3 is converted into a point 12-4 corresponding to the voxel 11-4. Note that, in D of FIG. 1, only one voxel 11-3 is denoted by a reference numeral, but all the squares indicated by dotted lines in the region 10 in D of FIG. 1 are voxels 11-3.

In this manner, the positional information is hierarchized in accordance with the hierarchical structure of voxels.

<Lifting>

On the other hand, when attribute information is encoded, the positional relationship between points is used for encoding, with the positional information including deterioration due to the encoding being known. As a method for encoding such attribute information, a method using region adaptive hierarchical transform (RAHT) or transform called "lifting" disclosed in Non-Patent Document 2 has been considered. By using these techniques, it is possible to hierarchize attribute information like an octree of positional information.

For example, in the case of "lifting", the attribute information about each point is encoded as a difference value from a predicted value which is derived with the use of the attribute information about the other points. The points from which the difference value (which is the predicted value) is derived are then hierarchically selected.

Figure 2:
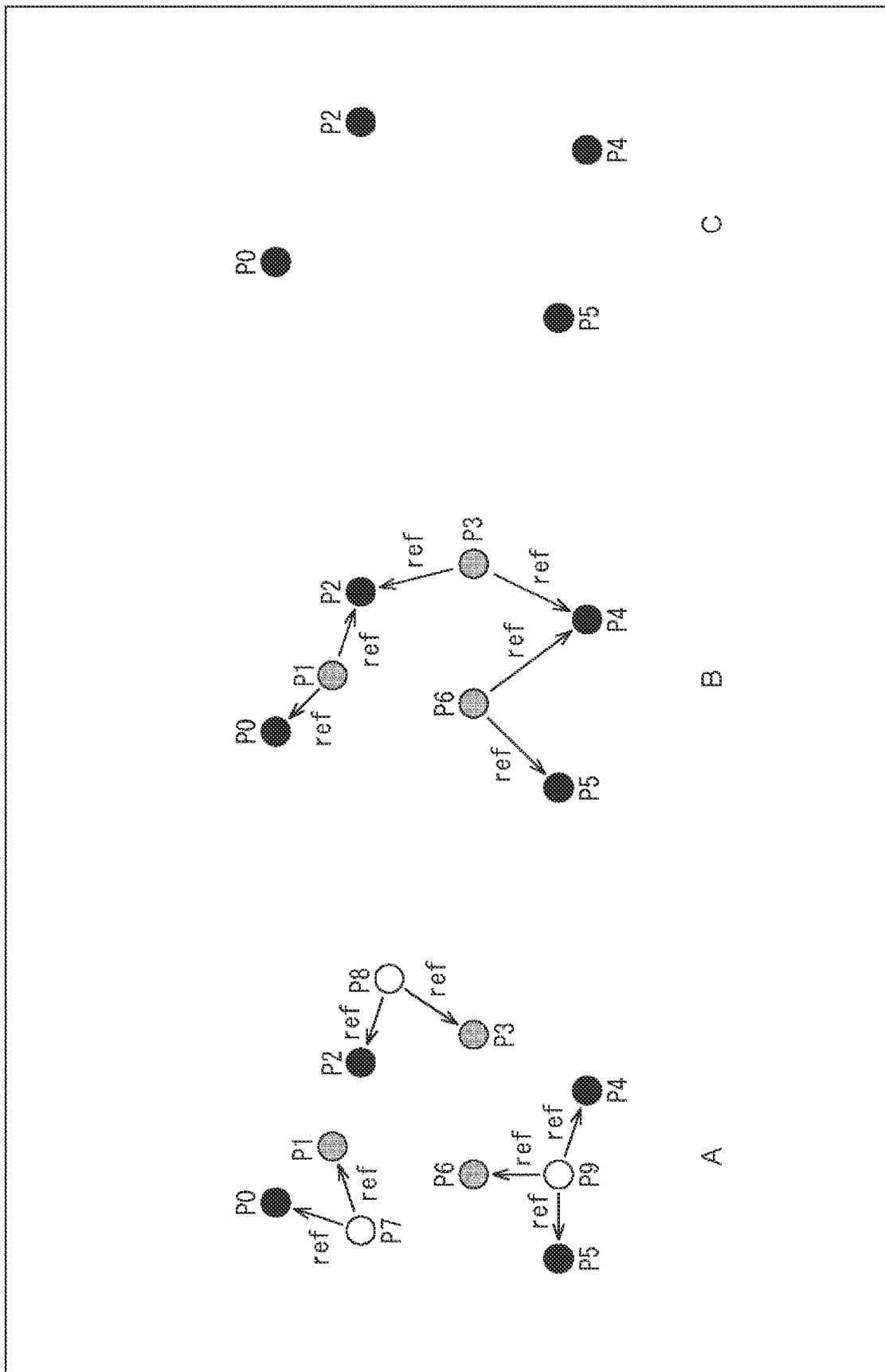
FIG. 2 is a diagram for explaining an example of "lifting".

For example, at a hierarchical level shown in A of FIG. 2 being explained as a two-dimensional structure, points P7, P8, and P9 indicated by white circles among the respective points (P0 to P9) indicated by circles are selected as prediction points at which predicted values are derived, and the other points P0 to P6 are selected as reference points that are the points at which attribute information is referred to during the derivation of the predicted value. The predicted value of the prediction point P7 is then derived by referring to the attribute information about the reference points P0 and P1. The predicted value of the prediction point P8 is derived by referring to the attribute information about the reference points P2 and P3. The predicted value of the prediction point P9 is derived by referring to the attribute information about the reference points P4 to P6. That is, at this hierarchical level, difference values of the respective points P7 to P9 are obtained.

As shown in B of FIG. 2, at the next higher hierarchical level, the same classification (sorting) between prediction points and reference points as in the case of the hierarchical level shown in A of FIG. 2 is performed on the points (P0 to P6) selected as the reference points at the hierarchical level shown in A of FIG. 2 (one level lower).

For example, in B of FIG. 2, the points P1, P3, and P6 indicated by gray circles are selected as the prediction points, and the points P0, P2, P4, and P5 indicated by black circles are selected as the reference points. The predicted value of the prediction point P1 is then derived by referring to the attribute information about the reference points P0 and P2. The predicted value of the prediction point P3 is derived by referring to the attribute information about the reference points P2 and P4. The predicted value of the prediction point P6 is derived by referring to the attribute information about the reference points P4 and P5. That is, at this hierarchical level, difference values of the respective points P1, P3, and P6 are obtained.

As shown in C of FIG. 2, at the next higher hierarchical level, classification (sorting) is performed on the points (P0, P2, P4, and P5) selected as the reference points at the hierarchical level shown in B of FIG. 2 (one level lower).

As such classification is recursively repeated on the reference points of the next lower hierarchical level, the attribute information is hierarchized.

<Classification of Points>

The procedures for classifying (sorting) points in this "lifting" are now described in greater detail. In "lifting", points are classified in the order from a lower level to a higher level as described above. In each hierarchical level, the respective points are arranged in Morton order. Next, the point at the top of the sequence of points arranged in Morton order is selected as a reference point. Next, points (vicinity points) located in the vicinity of the reference point are searched for, and the detected points (vicinity points) are set as prediction points (also referred to as index points).

Figure 3:
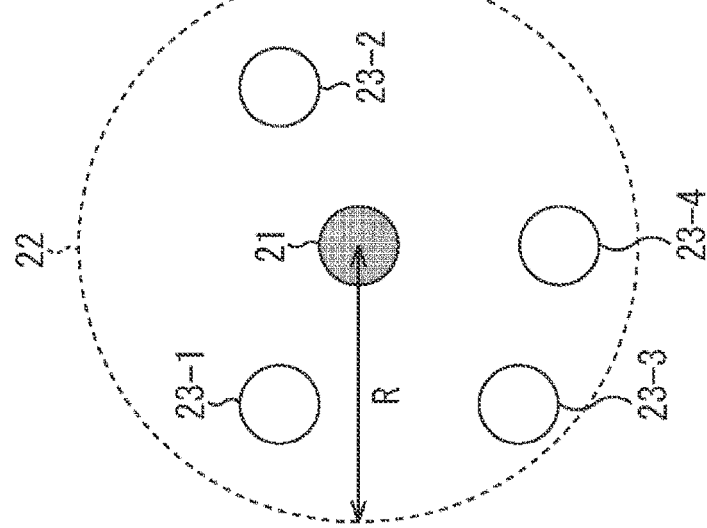
FIG. 3 is a diagram for explaining an example of "lifting".

For example, as shown in FIG. 3, a point is searched for in a circle 22 having a radius R, a process target reference point 21 being the center. This radius R is set beforehand for each hierarchical level. In the case of the example shown in FIG. 3, points 23-1 to 23-4 are detected, and are set as prediction points.

Next, the remaining points are classified in a manner similar to the above. That is, among the points that are not selected as reference points or prediction points at this stage, the point at the top in Morton order is selected as a reference point, and points in the vicinity of the reference point are detected and are set as prediction points.

The above process is repeated until all the points are classified, and the processing of the hierarchical level is completed. The process target then moves on to the next higher hierarchical level. The procedures described above are then repeated for the hierarchical level. That is, the respective points selected as reference points at the next lower hierarchical level are arranged in Morton order, and are classified into a reference point and prediction points as described above. As the process described above is repeated, the attribute information is hierarchized.

<Derivation of Predicted Values>

Figure 4:
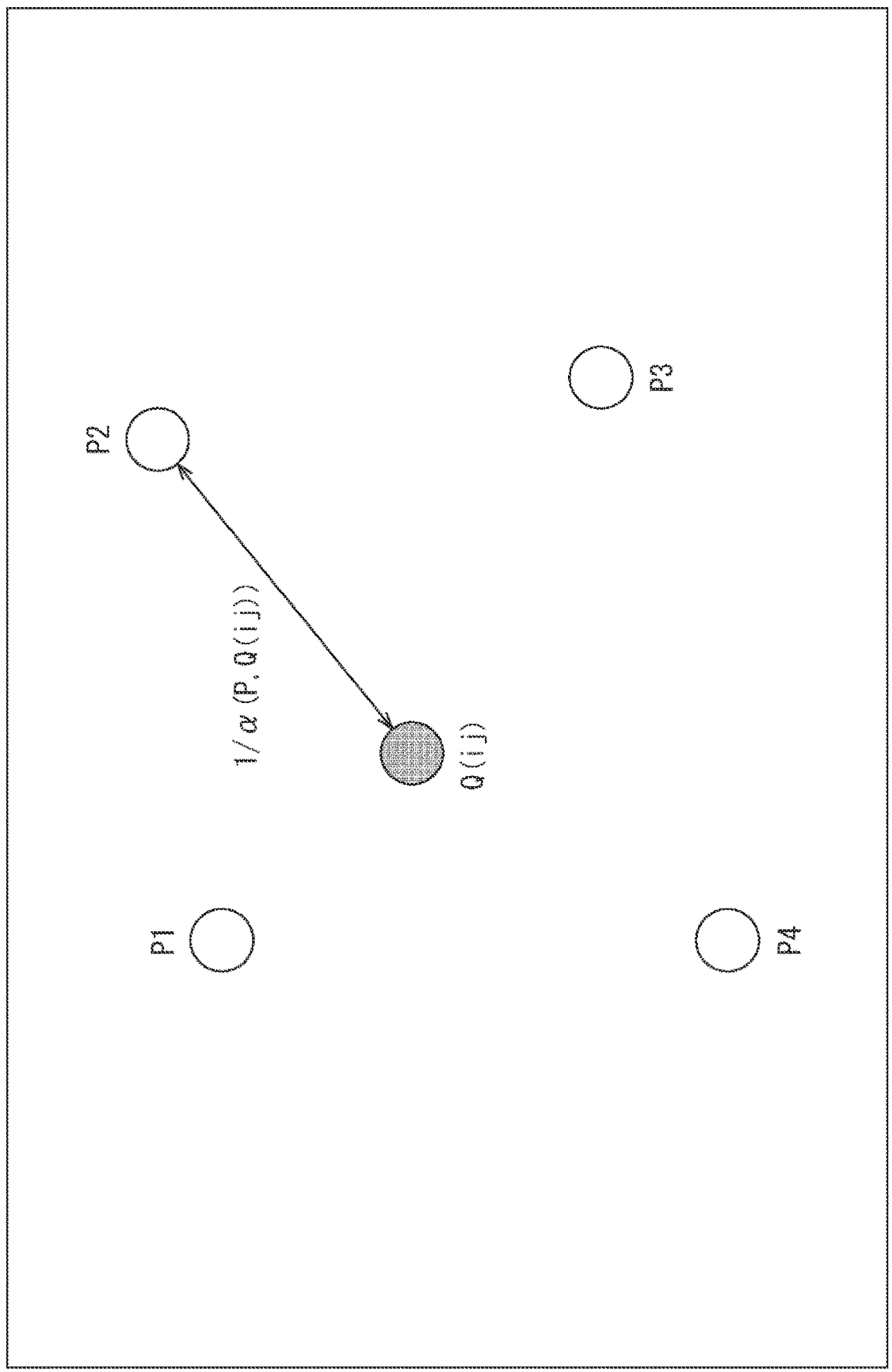
FIG. 4 is a diagram for explaining an example of "lifting".

Further, in the case of "lifting" described above, a predicted value of the attribute information about a prediction point is derived with the use of the attribute information about the reference points around the prediction point. For example, as shown in FIG. 4, a predicted value of a prediction point Q (i, j) is derived by referring to the attribute information about reference points P1 to P3. In this case, as shown below in Expression (1), the attribute information about each reference point is weighted with a quantization weight (a (P, Q (i, j))) depending on the reciprocal of the distance between the prediction point and the reference point, and is integrated. Thus, a predicted value is derived. Here, A (P) represents the attribute information about a point P.

[Mathematical Formula 1]

$$Pred(Q(i, j)) = \sum_{P \in V(Q(i,j))} \alpha(P, Q(i, j)) A(P) \quad (1)$$

The positional information about the highest resolution (which is the lowest hierarchical level) was used in the derivation of the distance between this prediction point and its reference point.

<Quantization>

Figure 5:
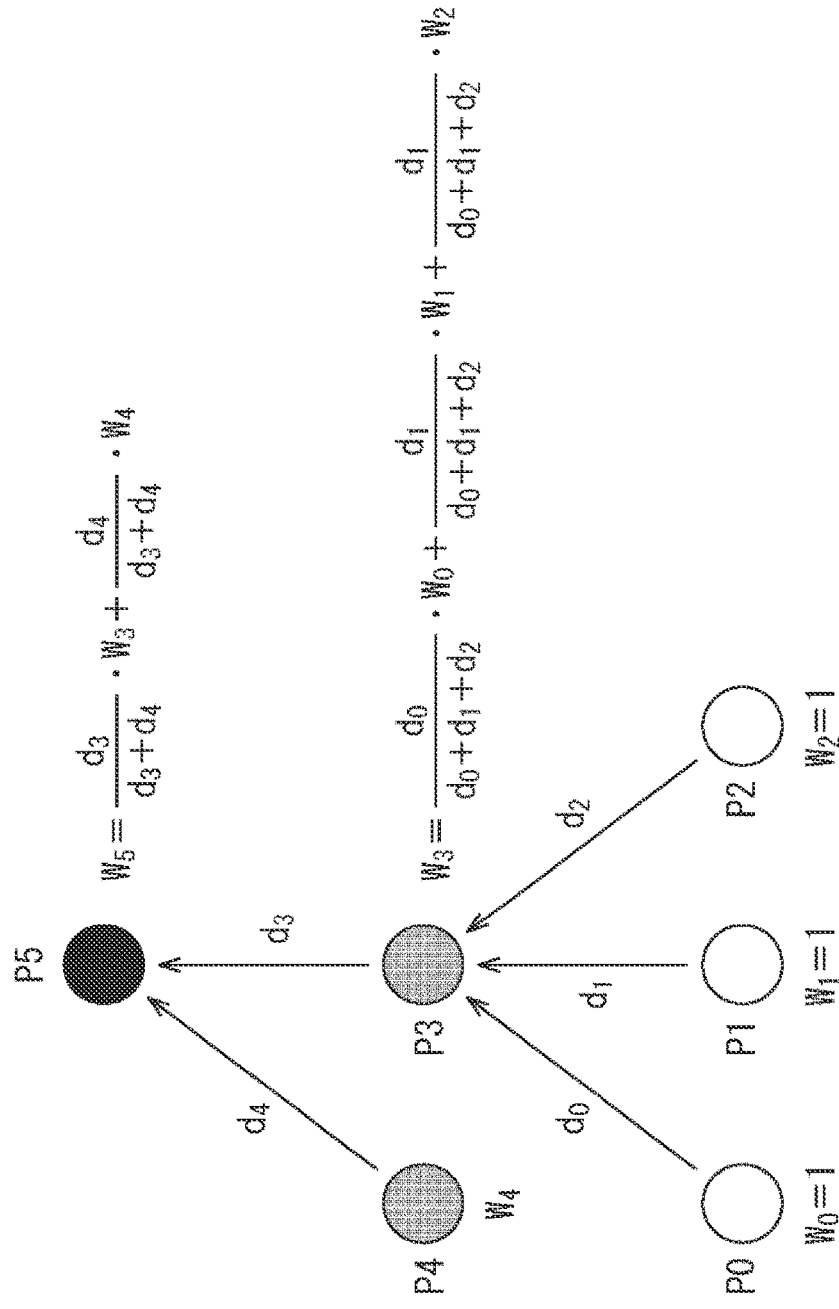
FIG. 5 is a diagram for explaining an example of quantization.

After hierarchized as described above, attribute information is further quantized and encoded. At the time of the quantization, the attribute information (difference value) about each point is weighted in accordance with the hierarchical structure, as shown in the example shown in FIG. 5. This quantization weight W is derived for each point, with the use of the quantization values of the lower hierarchical levels, as shown in FIG. 5. Note that the quantization weights can also be used in "lifting (hierarchization of attribute information) so as to increase compression efficiency.

<Hierarchical Structure Mismatch>

As described above, a method for hierarchizing attribute information differs from that in the case of an Octree of positional information. Therefore, the hierarchical structure of attribute information is not guaranteed to match the hierarchical structure of positional information. Because of that, there is a possibility that, at an intermediate resolution (a hierarchical level higher than the lowest hierarchical level), the points of the attribute information do not match the points of the positional information, and the attribute information cannot be predicted correctly (that is, inverse hierarchization of the attribute information is difficult) even with the use of the positional information at the intermediate resolution.

In other words, to perform correct decoding (inverse hierarchization) on the attribute information, it is necessary to decode the positional information down to the lowest hierarchical level, regardless of the current hierarchical level. Therefore, there is a possibility of an increase in the load of the decoding process.

<Position Mismatch>

Further, positional information is quantized with voxels as described above, and therefore, the positional information of points might change depending on hierarchical levels. Because of that, there is a possibility that the attribute information cannot be predicted correctly (that is, inverse hierarchization of the attribute information is difficult) from the positional information at an intermediate resolution.

In other words, to perform correct decoding (inverse hierarchization) on the attribute information, it is necessary to decode the positional information down to the lowest hierarchical level, regardless of the current hierarchical level. Therefore, there is a possibility of an increase in the load of the decoding process.

<Hierarchization of Attribute Information: Method 1>

In view of the above, prediction points are selected so that attribute information remains in voxels of the hierarchical level (LoD) that is one level higher than the level to which the voxels containing points belong (method 1), as shown in the top row of the table shown in FIG. 6.

That is, regarding the attribute information about a point cloud representing a three-dimensional object, a process of classifying the respective points of the point cloud into prediction points that are the points at which difference values between the attribute information and predicted values are left, and reference points that are the points at which the attribute information is referred to during derivation of the predicted values is recursively repeated on the reference points, so that the attribute information is hierarchized. At the time of the hierarchization, the prediction points are selected so that points also exist in voxels of the hierarchical level one level higher than the hierarchical level to which the voxels containing the points of the current hierarchical level belong.

For example, an information processing apparatus includes a hierarchization unit that performs hierarchization of the attribute information about a point cloud representing a three-dimensional object by recursively repeating, on reference points, a process of classifying the respective points of the point cloud into prediction points that are the points at which difference values between the attribute information and predicted values are left, and the reference points that are the points at which the attribute information is referred to during derivation of the predicted values. At the time of the hierarchization, the hierarchization unit selects the prediction points so that points also exist in voxels of the hierarchical level one level higher than the hierarchical level to which the voxels containing points of the current hierarchical level belong.

Figure 7:
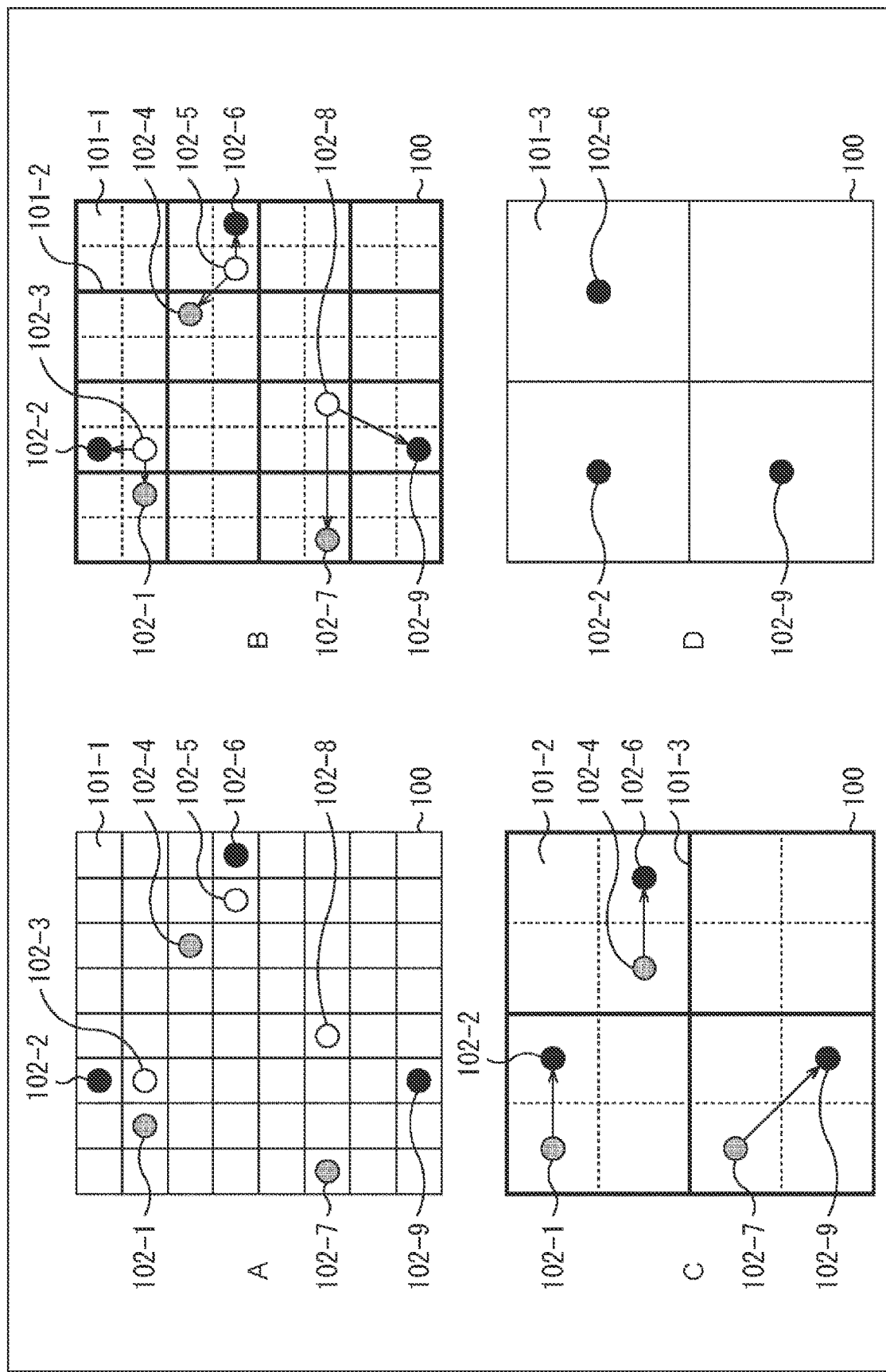
FIG. 7 is a diagram for explaining an example of hierarchization of attribute information.

Encoding to be explained two-dimensionally is performed as shown in FIG. 7, for example. For example, as shown in A of FIG. 7, positional information is set so that points 102-1 to 102-9 are placed in voxels 101-1 of a predetermined hierarchical level in a predetermined spatial region 100. Note that, when there is no need to distinguish voxels 101-1 to 101-3 from one another, they are referred to as voxels 101.

Further, when there is no need to distinguish the points 102-1 to 102-9 from one another, they are referred to as points 102.

At this hierarchical level, as shown in B of FIG. 7, the points 102-1 to 102-9 are classified into prediction points and reference points, so that points also exist in voxels 101-2 of the hierarchical level that is one level higher than the hierarchical level of the voxels 101-1 in which the points 102-1 to 102-9 exist. In the example shown in B of FIG. 7, points 102-3, 102-5, and 102-8 indicated by white circles are set as the prediction points, and the other points are set as the reference points.

Likewise, at the next higher hierarchical level, the points 102 are classified into prediction points and reference points, so that points also exist in voxels 101-3 of the hierarchical level that is one level higher than the hierarchical level of the voxels 101-2 in which the points 102-1, 102-2, 102-4, 102-6, 102-7, and 102-9 exist (C of FIG. 7). In the example shown in C of FIG. 7, the points 102-1, 102-4, and 102-7 indicated by gray circles are set as the prediction points, and the other points are set as the reference points.

In this manner, hierarchization is performed so that one point 102 exists in each voxel 101-3 in which points 102 exist at the lower hierarchical levels, as shown in D of FIG. 7. Such a process is performed at each hierarchical level. That is, it is possible to realize hierarchization that is similar to that in an octree.

Figure 8:
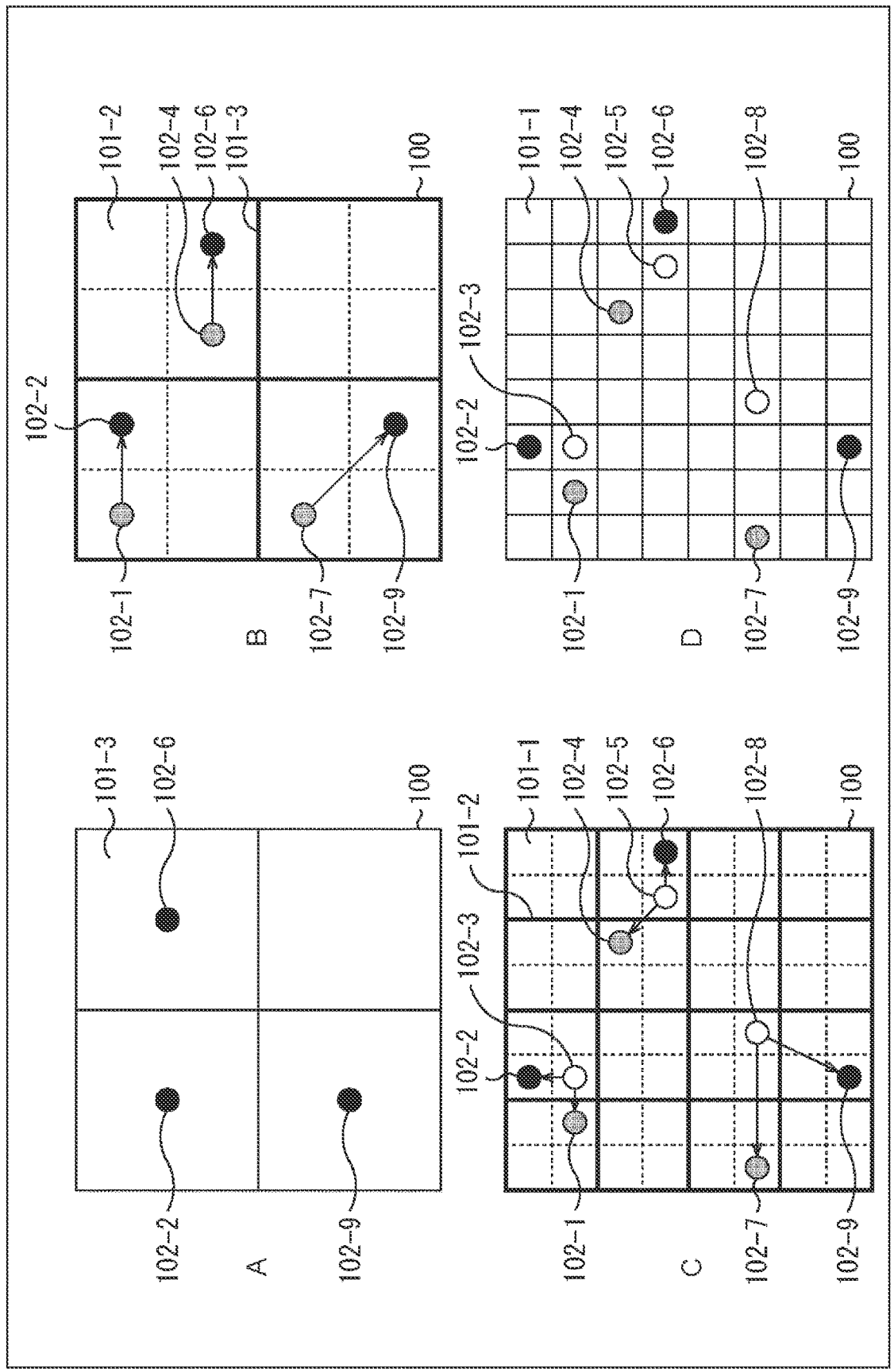
FIG. 8 is a diagram for explaining an example of inverse hierarchization of attribute information.

As shown in FIG. 8, for example, decoding is performed in the reverse order of that shown in FIG. 7. For example, as shown in A of FIG. 8, positional information is set so that points 102-2, 102-6, and 102-9 are placed in voxels 101-3 of a predetermined hierarchical level in a predetermined spatial region 100 (a state similar to that shown in D of FIG. 7).

At the next lower hierarchical level, as shown in B of FIG. 8, predicted values of the points 102-1, 102-4, and 102-7 are derived with the use of the attribute information about the points 102-2, 102-6, and 102-9 of the respective voxels 101-3, and are added to the difference values, so that the attribute information about the points 102 of the respective voxels 101-2 is restored (a state similar to that shown in C of FIG. 7).

Further, at the next lower hierarchical level, as shown in C of FIG. 8, predicted values of the points 102-3, 102-5, and 102-8 are also derived with the use of the attribute information about the points 102-1, 102-2, 102-4, 102-6, 102-7, and 102-9 of the respective voxels 101-2, and is added to the difference values, so that the attribute information is restored (a state similar to that shown in B of FIG. 7).

In this manner, the attribute information about the points 102 of the respective voxels 101-1 is restored as shown in D of FIG. 8 (a state similar to that shown in A of FIG. 7). That is, as in the case of an octree, the attribute information about each hierarchical level can be restored with the use of the attribute information about a higher hierarchical level.

In this manner, the hierarchical structure of the attribute information can be associated with the hierarchical structure of the positional information. As a result, the positional information corresponding to each piece of the attribute information can be obtained even at an intermediate resolution. Accordingly, it is possible to correctly decode the attribute information by decoding the positional information and the attribute information at the intermediate resolution. Thus, scalable decoding of attribute information can be performed more easily.

<Hierarchization of Attribute Information: Method 1-1>

At the time of derivation of predicted values when method 1 described above is adopted, the predicted values may be derived with the use of the positional information at the resolution of the current hierarchical level (LoD) in both encoding and decoding, as mentioned in the second row from the top of the table shown in FIG. 6 (method 1-1).

For example, regarding the attribute information about a point cloud representing a three-dimensional object, a process of classifying the respective points of the point cloud into prediction points that are the points at which difference values between the attribute information and predicted values are left, and reference points that are the points at which the attribute information is referred to during derivation of the predicted values may be recursively repeated on the reference points, so that inverse hierarchization of hierarchized attribute information is performed. At the time of the inverse hierarchization, predicted values of the attribute information about the prediction points may be derived at each hierarchical level with the use of the attribute information about the reference points and the positional information at the resolution of a hierarchical level that is not the lowest hierarchical level of the point cloud, and the attribute information about the prediction points may be derived with the use of the predicted values and the difference values.

Further, for example, an information processing apparatus may include an inverse hierarchization unit that performs inverse hierarchization of the attribute information about a point cloud representing a three-dimensional object, the attribute information having been hierarchized by recursively repeating, on reference points, a process of classifying the respective points of the point cloud into prediction points that are the points at which difference values between the attribute information and predicted values are left, and the reference points that are the points at which the attribute information is referred to during derivation of the predicted values. At the time of the inverse hierarchization, the inverse hierarchization unit may derive predicted values of the attribute information about the prediction points at each hierarchical level with the use of the attribute information about the reference points and the positional information at the resolution of a hierarchical level that is not the lowest hierarchical level of the point cloud, and derive the attribute information about the prediction points with the use of the predicted values and the difference values.

Further, for example, in the inverse hierarchization, the predicted values may be derived with the use of the attribute information about the reference points and the positional information of the reference points and the prediction points at the resolution of the current hierarchical level.

As explained above with reference to FIG. 4, derivation of predicted values of prediction points is performed with the use of the attribute information about reference points that are weighted in accordance with the distances between the prediction points and the reference points.

In either case of encoding or decoding, derivation of the distances may be performed with the use of the positional information at the resolution of the current hierarchical level that is the process target. That is, in the hierarchization, predicted values of the prediction points may be derived with the use of the attribute information about the reference points that are weighted in accordance with distances based on the positional information at the resolution of the current hierarchical level in the point cloud.

In the case of encoding, the distances between the prediction points and the reference points are derived with the use of the positional information at the resolution of the voxels 101-1 in B of FIG. 7, and the distances between the prediction points and the reference points are derived with the use of the positional information at the resolution of the voxels 101-2 in C of FIG. 7. Likewise, in the case of decoding, the distances between the prediction points and the reference points are derived with the use of the positional information at the resolution of the voxels 101-2 in B of FIG. 8, and the distances between the prediction points and the reference points are derived with the use of the positional information at the resolution of the voxels 101-1 in C of FIG. 8.

In this manner, the same distances can be derived in both encoding and decoding. That is, the same predicted values can be derived in both encoding and decoding. Accordingly, even when the attribute information is decoded at an intermediate resolution, it is possible to reduce the decrease in accuracy due to an error in distance calculation (the increase in error due to decoding). More specifically, when the attribute information is decoded at an intermediate resolution, decoding can be performed more accurately than the case of method 1-1' described later. It is also possible to reduce the increase in the encoding/decoding load to a smaller amount than in the case of method 1-2 described later.

Note that, in the case of decoding (inverse hierarchization) (FIG. 8), the correspondence relationship between the positional information and the attribute information is not clear from the positional information and the attribute information about the respective points at an intermediate resolution. For example, in B of FIG. 8, which voxel 101-2 contains which point 102 is unclear. Therefore, the attribute information may be hierarchized with the use of the positional information (hierarchization up to an intermediate resolution to be decoded) as in the case of hierarchization, so that the attribute information about each point is associated with the positional information at each hierarchical level. In this manner, more accurate inverse hierarchization can be performed.

<Hierarchization of Attribute Information: Method 1-1'>

Note that, at the time of derivation of predicted values when method 1 described above is adopted, the predicted values may be derived with the use of the positional information at the resolution of the current hierarchical level (LoD) in decoding, as mentioned in the third row from the top of the table shown in FIG. 6 (method 1-1'). That is, in encoding, the positional information at the highest resolution (the resolution of the lowest hierarchical level) is known, and therefore, predicted values (more specifically, the distances between the reference points to be used in derivation of predicted values and the prediction points) may be derived with the use of the positional information at the highest resolution.

That is, predicted values of the prediction points may be derived with the use of the attribute information about the reference points that are weighted in accordance with distances based on the positional information at the resolution of the lowest hierarchical level in the point cloud.

Figure 9:
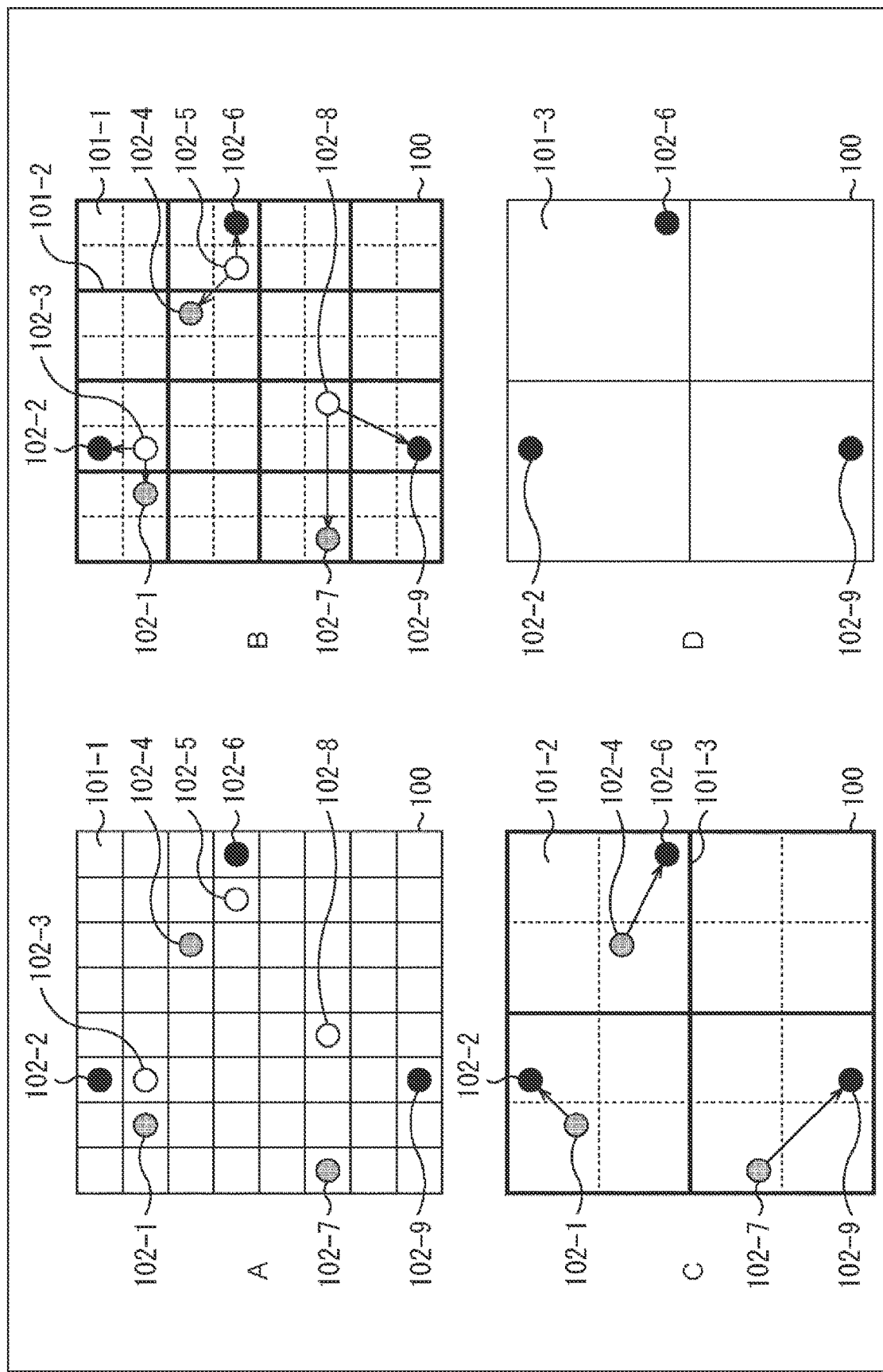
FIG. 9 is a diagram for explaining an example of hierarchization of attribute information.

For example, if the hierarchical level shown in A of FIG. 9 (the same hierarchical level as that shown in A of FIG. 7) is the lowest hierarchical level, derivation of predicted values of the points 102-3, 102-5, and 102-8 is performed with the use of the positional information at the resolution of the voxels 101-1, as shown in B of FIG. 9. This is similar to the case illustrated in B of FIG. 7.

In this case, however, as shown in C of FIG. 9, derivation of predicted values of the points 102-1, 102-4, and 102-7 is also performed with the use of the positional information at the resolution of the voxels 101-1, as in the case illustrated in B of FIG. 9. That is, as shown in D of FIG. 9, the positional information about the points 102-2, 102-6, and 102-9 of each voxel 101-3 also has the resolution of the voxels 101-1.

In this manner, prediction accuracy can be made higher than that in the case of method 1-1, and accordingly, encoding efficiency can be made higher than that in the case of method 1-1. However, at the time of decoding, as shown in D of FIG. 9, the positional information about the points 102-2, 102-6, and 102-9 of each voxel 101-3 cannot have the resolution of the voxels 101-1. Therefore, decoding is performed in a manner similar to that in the case illustrated in FIG. 8 (method 1-1). That is, the distances between the reference points and the prediction points are derived with the use of the positional information having different resolutions for encoding and decoding.

<Hierarchization of Attribute Information: Method 1-2>

Further, at the time of derivation of predicted values when method 1 described above is adopted, predicted values may be derived with the use of virtual reference points, as mentioned in the bottom row of the table shown in FIG. 6 (method 1-2). That is, in hierarchization, all the points at the current hierarchical level may be classified as prediction points, reference points may be set in the voxels at the next higher hierarchical level, and predicted values of the respective prediction points may be derived with the use of the attribute information about the reference points.

Further, for example, in inverse hierarchization, predicted values of the respective prediction points may be derived with the use of the attribute information about the reference points, the positional information about the reference points at the resolution of the hierarchical level one level higher than the current hierarchical level, and the positional information about the prediction points at the resolution of the current hierarchical level.

Figure 10:
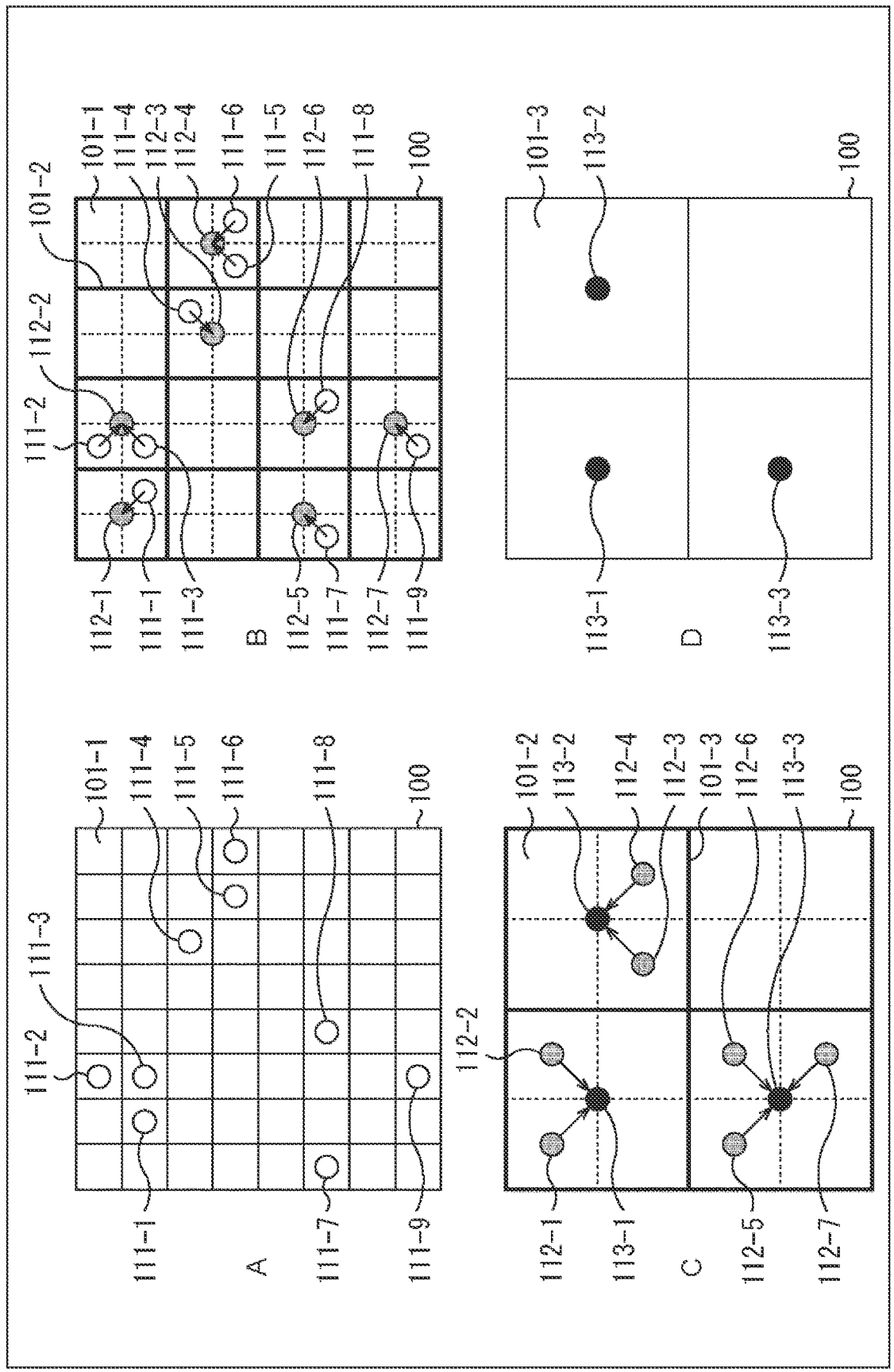
FIG. 10 is a diagram for explaining an example of hierarchization of attribute information.

Encoding to be explained two-dimensionally is performed as shown in FIG. 10, for example. A of FIG. 10 shows the same hierarchical level as that shown in FIG. 7, and, in the spatial region 100, points 111-1 to 111-9 similar to the points 102-1 to 102-9 exist in the respective voxels 101-1. Note that, when there is no need to distinguish the points 111-1 to 111-9 from one another, they are referred to as points 111.

In this case, all the points 111-1 to 111-9 are set as prediction points, which differs from the case illustrated in FIG. 7. As shown in B of FIG. 10, virtual points 112-1 to 112-7 of voxels 101-2 are then set as reference points in the voxels 101-2 to which the voxels 101-1 containing the prediction points (the points 111) belong at the hierarchical level that is one level higher than the voxels 101-1. Note that, when there is no need to distinguish the points 112-1 to 112-7 from one another, they are referred to as points 112.

The attribute information about the newly set virtual points 112 is derived by a recoloring process using the attribute information about the points 111 in the vicinity. Note that the positions of the points 112 are any appropriate positions in the voxels 101-2, and may be other than the center positions shown in B of FIG. 10.

As shown in B of FIG. 10, predicted values of the respective prediction points (the points 111) are derived with the use of these reference points (the point 112).

At the next higher hierarchical level, the points 112 set in B of FIG. 10 are then set as prediction points, as shown in C of FIG. 10. In a manner similar to that in the case illustrated in B of FIG. 10, virtual points 113-1 to 113-3 of voxels 101-3 are then set as reference points in the voxels 101-3 to which the voxels 101-2 containing the prediction points (the points 112) belong at the hierarchical level that is one level higher than the voxels 101-2. Note that, when there is no need to distinguish the points 113-1 to 113-3 from one another, they are referred to as points 113.

The attribute information about the newly set virtual points 113 is derived by a recoloring process in a manner similar to that in the case of the points 112. As shown in C of FIG. 10, predicted values of the respective prediction points (the points 112) are derived with the use of these reference points (the point 113).

In this manner, hierarchization is performed so that one point 113 exists in each voxel 101-3 in which points 111 exist at the lower hierarchical levels, as shown in D of FIG. 10. Such a process is performed at each hierarchical level. That is, it is possible to realize hierarchization that is similar to that in an octree.

Figure 11:
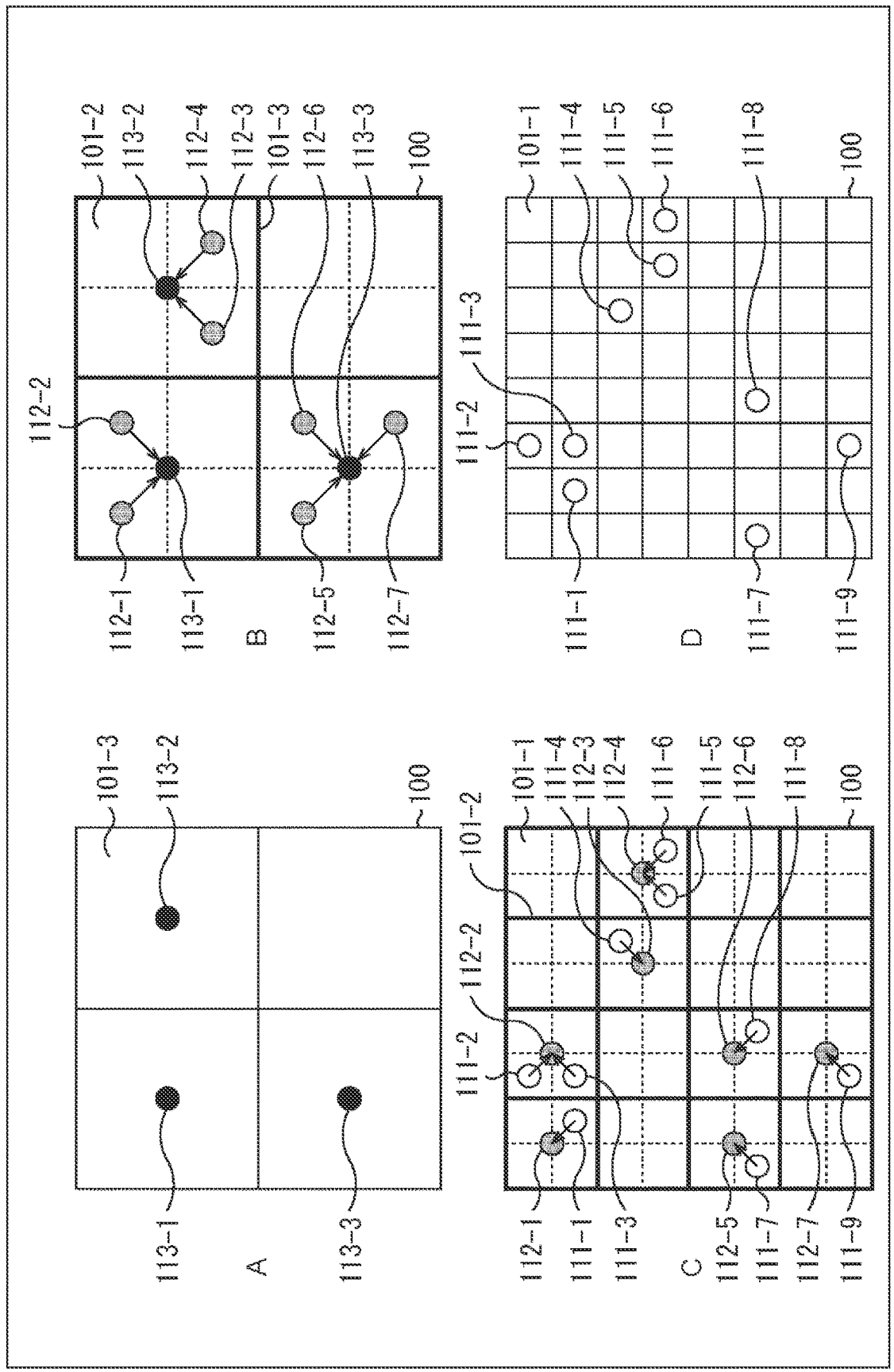
FIG. 11 is a diagram for explaining an example of inverse hierarchization of attribute information.

As shown in FIG. 11, for example, decoding is performed in the reverse order of that shown in FIG. 10. For example, as shown in A of FIG. 11, positional information is set so that points 113-1 to 113-3 are placed in voxels 101-3 of a predetermined hierarchical level in a predetermined spatial region 100 (a state similar to that shown in D of FIG. 10).

At the next lower hierarchical level, as shown in B of FIG. 11, predicted values of the points 112-1 to 112-7 are derived with the use of the attribute information about the points 113-1 to 113-3 of the respective voxels 101-3, and are added to the difference values, so that the attribute information about the points 112 of the respective voxels 101-2 is restored (a state similar to that shown in C of FIG. 10).

Further, at the next lower hierarchical level, as shown in C of FIG. 11, predicted values of the points 111-1 to 111-9 are derived with the use of the attribute information about the points 112-1 to 112-7 of the respective voxels 101-2, and are added to the difference values, so that the attribute information is restored (a state similar to that shown in B of FIG. 10).

In this manner, the attribute information about the points 111 of the respective voxels 101-1 is restored as shown in D of FIG. 11 (a state similar to that shown in A of FIG. 10). That is, as in the case of an octree, the attribute information about each hierarchical level can be restored with the use of the attribute information about a higher hierarchical level.

Further, in this case, prediction is performed with the use of virtual points that have been subjected to a recoloring process. Accordingly, prediction accuracy can be made higher than those in the cases of method 1-1 and method 1-1'. That is, encoding efficiency can be made higher than those in the cases of method 1-1 and method 1-1'. Further, in the case of this method, the distances between reference points and prediction points can be derived with the use of positional information at the same resolution both in encoding and decoding.

Accordingly, decoding can be performed more accurately than in the case of method 1-1'. In this case, however, virtual points are set, and a recoloring process is performed. Therefore, the load increases accordingly.

<Hierarchization of Attribute Information: Combinations>

Note that any of the methods described above may be selected and adopted. In that case, the encoding side selects and adopts a method, and information indicating which method is selected is transmitted from the encoding side to the decoding side. The decoding side is only required to adopt the same method as that on the encoding side, on the basis of the information.

<Reference to a Lower Hierarchical Level at the Time of Derivation of a Quantization Weight>

Meanwhile, as explained in <Quantization>, the quantization weight W to be used in quantization and hierarchization of attribute information (difference values) is derived for each point with the use of the quantization weight of a lower hierarchical level. Therefore, at the time of decoding, to inversely quantize the attribute information at an intermediate resolution, the quantization weight of a hierarchical level lower than that is required. That is, it is difficult to perform scalable decoding. In other words, to decode attribute information having a desired intermediate resolution, all the hierarchical levels need be decoded. Therefore, there is a possibility of an increase the load of the decoding process.

<Quantization Weights: Method 1>

In view of the above, instead of the above quantization weight for each point, a quantization weight for each hierarchical level (LoD) is used to perform quantization and inverse quantization of attribute information (method 1), as mentioned in the top row of the table shown in FIG. 12. That is, the difference value of each point of each hierarchical level generated as described above may be quantized and inversely quantized with the use of a quantization weight for each hierarchical level.

For example, as shown in FIG. 13, a quantization weight for a hierarchical level LoD (N) is set at C0, and the attribute information (difference values) about all the points of the hierarchical level LoD (N) is quantized and inversely quantized with the use of the quantization weight C0. Also, a quantization weight for the next higher hierarchical level LoD (N−1) is set at C1, and the attribute information (difference values) about all the points of the hierarchical level LoD (N−1) is quantized and inversely quantized with the use of the quantization weight C1. Further, a quantization weight for the next higher hierarchical level LoD (N−2) is set at C2, and the attribute information (difference values) about all the points of the hierarchical level LoD (N−2) is quantized and inversely quantized with the use of the quantization weight C2.

Note that these quantization weights C0, C1, and C2 are set independently of one another. When quantization weights for the respective points are used, it is necessary to take into consideration how to perform weighting between the points of the same hierarchical level. This might not only complicate the processing, but also make it difficult to maintain the independence of the quantization weight of each hierarchical level, because information about the lower hierarchical levels is required, for example. On the other hand, quantization weights for the respective hierarchical levels can be more easily derived independently of one another.

As such quantization weights that are independent among hierarchical levels are adopted, it is possible to perform quantization and inverse quantization that do not depend on any lower hierarchical level. That is, because it is not necessary to refer to information about any lower hierarchical level as described above, scalable decoding can be realized more easily.

Note that the quantization weight for a higher hierarchical level may be greater (C0≤C1≤C2 in the case of the example shown in FIG. 13). In general, hierarchized attribute information is more important, because the attribute information about a higher hierarchical level affects the attribute information about a larger number of points (or is directly or indirectly used in deriving predicted values of a larger number of points). Accordingly, it is possible to reduce the decrease in the accuracy of encoding and decoding by quantizing and inversely quantizing the attribute information (difference values) about a higher hierarchical level with the use of a quantization weight of a greater value.

<Quantization Weights: Method 1-1>

Also, when method 1 is adopted, a function for deriving quantization weights (a quantization weight derivation function) may be shared between encoding and decoding, as mentioned in the second row from the top of the table shown in FIG. 12 (method 1-1). That is, in encoding and decoding, the same quantization weight derivation function may be used to derive the above quantization weights for the respective hierarchical levels. In this manner, the same quantization weights can be derived in encoding and decoding. Thus, the decrease in accuracy due to quantization and inverse quantization can be reduced.

Note that this quantization weight derivation function may be any kind of function. That is, the quantization weights to be derived with this quantization weight derivation function for the respective hierarchical levels are any appropriate ones. For example, the quantization weight derivation function may be a function for obtaining a greater quantization weight for a higher hierarchical level (a function that monotonically increases with hierarchical levels). Also, the rate of increase in the quantization weight for each hierarchical level may or may not be constant. Further, the range of quantization weights to be derived with this quantization weight derivation function may also be any appropriate range.

<Quantization Weights: Method 1-1-1>

Also, in that case, a predetermined function may be shared beforehand, as mentioned in the third row from the top of the table shown in FIG. 12 (method 1-1-1). That is, in encoding and decoding, the same quantization weight derivation function that is determined in advance may be used to derive the above mentioned quantization weights for the respective hierarchical levels. With this arrangement, a quantization weight derivation function can be more easily shared between encoding and decoding.

<Quantization Weights: Method 1-1-2>

Also, as mentioned in the fourth row from the top of the table shown in FIG. 12, parameters that define a quantization weight derivation function (such as information or coefficients that specify a function, for example) may be shared (method 1-1-2). That is, a quantization weight derivation function may be defined at the time of encoding, and the parameters defining the quantization weight derivation function may be transmitted (included in a bitstream) to the decoding side. That is, the quantized difference values and the parameters that define the function to be used for deriving the quantization weights for the respective hierarchical levels may be encoded to generate encoded data. Further, the encoded data may be decoded to obtain the quantized difference values and the parameter defining the function to be used for deriving the quantization weights for the respective hierarchical levels. With this arrangement, the quantization weight derivation function used at the time of encoding can be easily restored on the basis of the parameters included in the bitstream. Thus, the same quantization weight derivation function as that in the case of encoding can be easily adopted in decoding.

<Quantization Weights: Method 1-2>

Also, when method 1 is adopted, quantization weights may be shared between encoding and decoding, as mentioned in the fifth row from the top of the table shown in FIG. 12 (method 1-2). That is, in encoding and decoding, quantization and inverse quantization may be performed with the use of the same quantization weights. By doing so, it is possible to reduce the decrease in accuracy due to quantization and inverse quantization. Note that the quantization weights for the respective hierarchical levels may have any appropriate values.

<Quantization Weights: Method 1-2-1>

Also, in that case, predetermined quantization weights may be shared beforehand, as mentioned in the sixth row from the top of the table shown in FIG. 12 (method 1-2-1). That is, quantization and inverse dequantization may be performed with the use of predetermined quantization weights that are the same in encoding and decoding. With this arrangement, quantization weights can be more easily shared between encoding and decoding.

<Quantization Weights: Method 1-2-2>

Also, as mentioned in the seventh row from the top of the table shown in FIG. 12, quantization weights may be transmitted from the encoding side to the decoding side (method 1-2-2). That is, quantization weights may be set at the time of encoding, and the quantization weights may be transmitted (included in a bitstream) to the decoding side. That is, the quantized difference values and the quantization weights for the respective hierarchical levels may be encoded to generate encoded data. The encoded data may then be decoded to obtain the quantized difference values and the quantization weights for the respective hierarchical levels. With this arrangement, the quantization weights included in the bitstream can be used in the inverse quantization at the time of decoding. Thus, the quantization weights used in the quantization at the time of encoding can be more easily used in the inverse quantization at the time of decoding.

<Quantization Weights: Method 2>

Note that quantization weights for the respective points may be used in quantization and inverse quantization. For example, as mentioned in the eighth row from the top of the table shown in FIG. 12, the quantization weights for the respective points may be defined and used in encoding (quantization), and the quantization weights for the respective points may be transmitted (included in a bitstream) to the decoding side (method 2). With this arrangement, quantization and inverse quantization can be performed with the use of quantization weights more suitable for the attribute information (difference values) about the respective points. Thus, the decrease in encoding efficiency can be reduced.

<Quantization Weights: Method 2-1>

When this method 2 is adopted, the quantization weights for all the defined points may be transmitted (included in a bitstream), as mentioned in the ninth row from the top of the table shown in FIG. 12 (method 2-1). With this arrangement, at the time of decoding (inverse quantization), the quantization weights included in the bitstream can be used without any change. Thus, inverse quantization can be performed more easily.

<Quantization Weights: Method 2-2>

Also, when method 2 is adopted, the difference values between the quantization weights for the respective defined points and a predetermined value may be transmitted (included in a bitstream), as mentioned in the lowermost row of the table shown in FIG. 12 (method 2-2). This predetermined value may be any appropriate value. A value different from each quantization weight may be set as this predetermined value, or a difference value between quantization weights may be transmitted. With this arrangement, the increase in the amount of information regarding the quantization weights can be reduced to a smaller value, and the decrease in encoding efficiency can be reduced to a smaller value than in the case of method 2-1, for example.

<Quantization Weights: Combinations>

Note that any of the methods described above may be selected and adopted. In that case, the encoding side selects and adopts a method, and information indicating which method is selected is transmitted from the encoding side to the decoding side. The decoding side is only required to adopt the same method as that on the encoding side, on the basis of the information.

<Application of Quantization Weights to Hierarchization>

The quantization weights may be used in hierarchization of attribute information. For example, in the case of "lifting", the difference value derived at each hierarchical level is updated with the use of the quantization weight, and the attribute information about the points set as reference points is updated with the use of the updated difference value. In this manner, the decrease in compression efficiency is reduced. When such an update process is performed in hierarchization of attribute information, the above described quantization weights for the respective hierarchical levels may be used.

With this arrangement, it is not necessary to refer to information about any lower hierarchical level, and thus, scalable decoding can be realized more easily.

2. First Embodiment

<Encoding Device>

Next, a device according to the present technology described above in <1. Scalable Decoding> is described. FIG. 14 is a block diagram showing an example configuration of an encoding device as an embodiment of an information processing apparatus to which the present technology is applied. An encoding device 200 shown in FIG. 14 is a device that encodes a point cloud (3D data). The encoding device 200 encodes a point cloud by adopting the present technology described above in <1. Scalable Decoding>.

Note that FIG. 14 shows the principal components and aspects such as processing units and the data flow, but FIG. 14 does not necessarily show all the components and aspects. That is, in the encoding device 200, there may be a processing unit that is not shown as a block in FIG. 14, or there may be a processing or data flow that is not shown as arrows or the like in FIG. 14.

As shown in FIG. 14, the encoding device 200 includes a positional information encoding unit 201, a positional information decoding unit 202, a point cloud generation unit 203, an attribute information encoding unit 204, and a bitstream generation unit 205.

The positional information encoding unit 201 encodes positional information about a point cloud (3D data) that has been input to the encoding device 200. The encoding method used herein may be any appropriate method. For example, processing such as filtering for noise reduction (denoising) and quantization may be performed. The positional information encoding unit 201 supplies the generated encoded data of the positional information to the positional information decoding unit 202 and the bitstream generation unit 205.

The positional information decoding unit 202 acquires the encoded data of the positional information supplied from the positional information encoding unit 201, and decodes the encoded data. The decoding method adopted herein may be any appropriate method that is compatible with the encoding performed by the positional information encoding unit 201. For example, processing such as filtering for denoising and inverse quantization may be performed. The positional information decoding unit 202 supplies the generated positional information (decoding result) to the point cloud generation unit 203.

The point cloud generation unit 203 acquires the attribute information about the point cloud input to the encoding device 200, and the positional information (decoding result) supplied from the positional information decoding unit 202. The point cloud generation unit 203 performs a process (a recoloring process) of associating the attribute information with the positional information (decoding result). The point cloud generation unit 203 supplies the attribute information associated with the positional information (decoding result) to the attribute information encoding unit 204.

The attribute information encoding unit 204 acquires the positional information (decoding result) and the attribute information supplied from the point cloud generation unit 203. Using the positional information (decoding result), the attribute information encoding unit 204 encodes the attribute information by an encoding method according to the present technology described above in <1. Scalable Decoding>, and generates encoded data of the attribute information. The attribute information encoding unit 204 supplies the generated encoded data of the attribute information to the bitstream generation unit 205.

The bitstream generation unit 205 acquires the encoded data of the positional information supplied from the positional information encoding unit 201. The bitstream generation unit 205 also acquires the encoded data of the attribute information supplied from the attribute information encoding unit 204. The bitstream generation unit 205 generates a bitstream including these sets of encoded data. The bitstream generation unit 205 then outputs the generated bitstream to the outside of the encoding device 200.

With such a configuration, the encoding device 200 can associate the hierarchical structure of the attribute information with the hierarchical structure of the positional information. Also, with such a configuration, quantization and inverse quantization that do not depend on any lower hierarchical level can be performed. That is, the encoding device 200 can further facilitate scalable decoding of attribute information.

Note that these processing units (the positional information encoding unit 201 to the bitstream generation unit 205) each have any appropriate configuration. For example, each processing unit may be formed with a logic circuit that realizes the processes described above. Alternatively, each processing unit may include a central processing unit (CPU), a read only memory (ROM), a random access memory (RAM), and the like, for example, and execute a program using these components, to perform the processes described above. Each processing unit may of course have both configurations, and perform some of the processes described above with a logic circuit, and the other by executing a program. The configurations of the respective processing units may be independent of one another. For example, one processing unit may perform some of the processes described above with a logic circuit while the other processing units perform the processes described above by executing a program. Further, some other processing unit may perform the processes described above both with a logic circuit and by executing a program.

<Attribute Information Encoding Unit>

Figure 15:
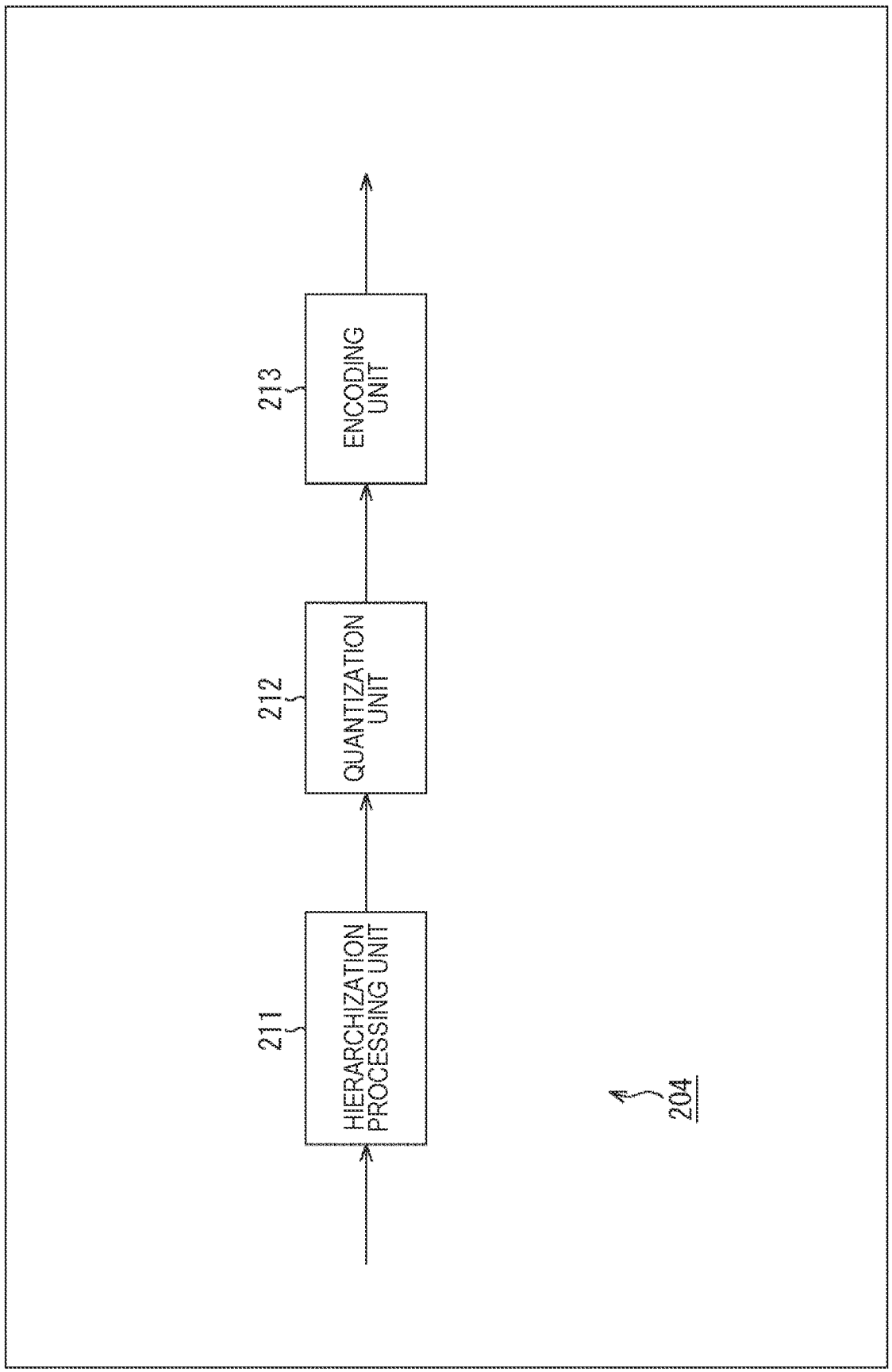
FIG. 15 is a block diagram showing a typical example configuration of an attribute information encoding unit.

FIG. 15 is a block diagram showing a typical example configuration of the attribute information encoding unit 204 (FIG. 14). Note that FIG. 15 shows the principal components and aspects such as processing units and the data flow, but FIG. 15 does not necessarily show all the components and aspects. That is, in the attribute information encoding unit 204, there may be a processing unit that is not shown as a block in FIG. 15, or there may be a processing or data flow that is not shown as arrows or the like in FIG. 15.

As shown in FIG. 15, the attribute information encoding unit 204 includes a hierarchization processing unit 211, a quantization unit 212, and an encoding unit 213.

The hierarchization processing unit 211 performs processing related to hierarchization of attribute information. For example, the hierarchization processing unit 211 acquires attribute information and positional information (a decoding result) supplied to the attribute information encoding unit 204. Using the positional information, the hierarchization processing unit 211 hierarchizes the attribute information. In doing so, the hierarchization processing unit 211 adopts the present technology described above in <1. Scalable Decoding> to perform hierarchization. That is, the hierarchization processing unit 211 generates attribute information having a hierarchical structure similar to that of the positional information (associates the hierarchical structure of the attribute information with the hierarchical structure of the positional information). The hierarchization processing unit 211 supplies the hierarchized attribute information (difference values) to the quantization unit 212.

The quantization unit 212 acquires the attribute information (difference values) supplied from the hierarchization processing unit 211. The quantization unit 212 quantizes the attribute information (difference values). In doing so, the quantization unit 212 adopts the present technology described above in <1. Scalable Decoding> to perform quantization. That is, the quantization unit 212 quantizes the attribute information (difference values), using the quantization weights for the respective hierarchical levels as described in <1. Scalable Decoding>. The quantization unit 212 supplies the quantized attribute information (difference values) to the encoding unit 213. Note that the quantization unit 212 also supplies information about the quantization weights used in the quantization, to the encoding unit 213, as necessary.

The encoding unit 213 acquires the quantized attribute information (difference values) supplied from the quantization unit 212. The encoding unit 213 encodes the quantized attribute information (difference values), and generates encoded data of the attribute information. The encoding method used herein may be any appropriate method. Note that, when the information regarding the quantization weights is supplied from the quantization unit 212, the encoding unit 213 also incorporates the information (such as the quantization weight derivation function defining parameters and the quantization weights, for example) into the encoding data. The encoding unit 213 supplies the generated encoded data to the bitstream generation unit 205.

By performing hierarchization and quantization as described above, the attribute information encoding unit 204 can associate the hierarchical structure of the attribute information with the hierarchical structure of the positional information. Also, quantization can be performed independently of any lower hierarchical level. In addition to that, inverse quantization that does not depend on any lower hierarchical level can be performed. That is, the attribute information encoding unit 204 can further facilitate scalable decoding of attribute information.

Note that these processing units (the hierarchization processing unit 211 to the encoding unit 213) have any appropriate configurations. For example, each processing unit may be formed with a logic circuit that realizes the processes described above. Further, each processing unit may also include a CPU, ROM, RAM, and the like, for example, and execute a program using them, to perform the processes described above. Each processing unit may of course have both configurations, and perform some of the processes described above with a logic circuit, and the other by executing a program. The configurations of the respective processing units may be independent of one another. For example, one processing unit may perform some of the processes described above with a logic circuit while the other processing units perform the processes described above by executing a program. Further, some other processing unit may perform the processes described above both with a logic circuit and by executing a program.

<Hierarchization Processing Unit>

Figure 16:
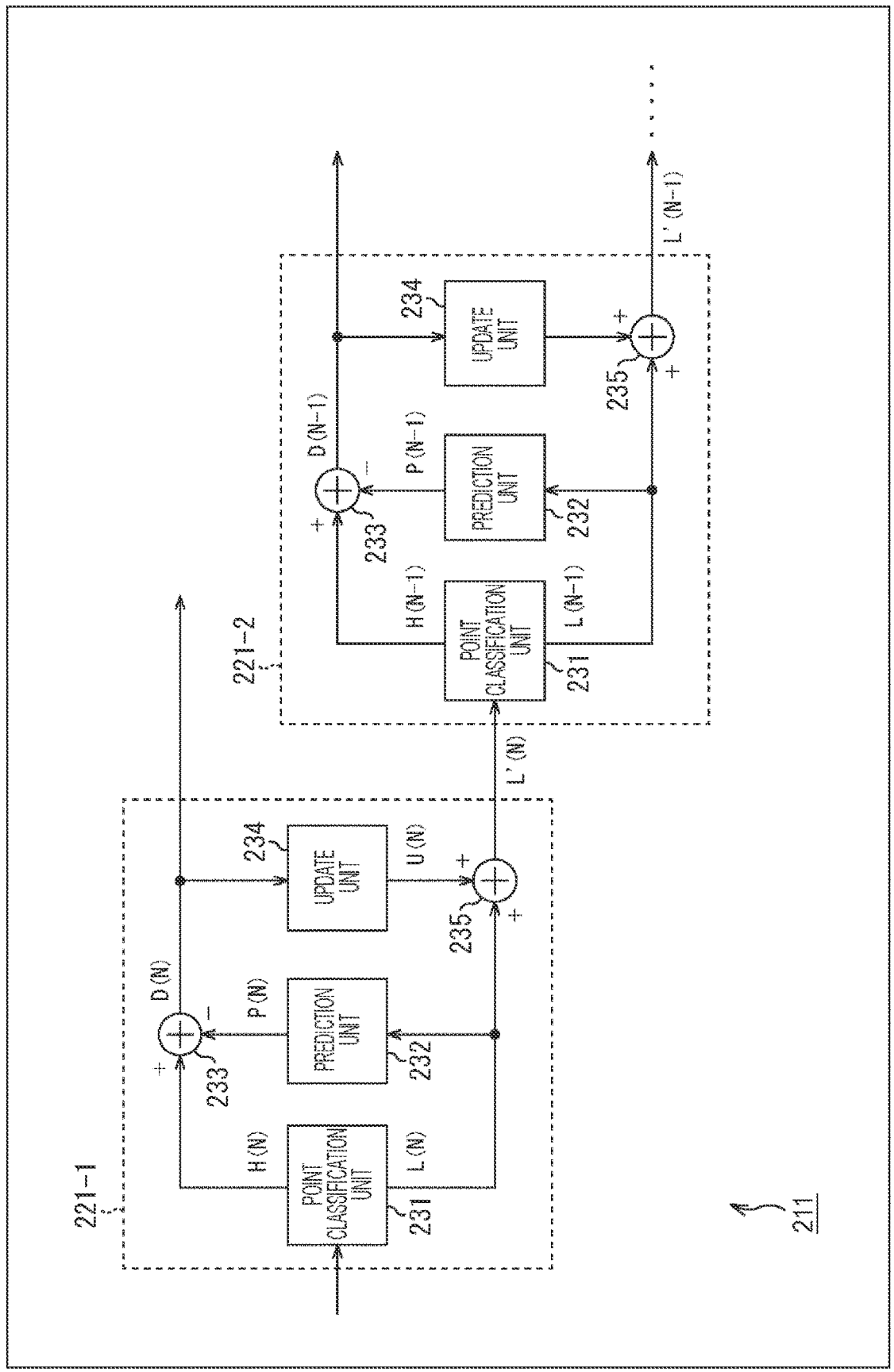
FIG. 16 is a block diagram showing a typical example configuration of a hierarchization processing unit.

FIG. 16 is a block diagram showing a typical example configuration of the hierarchization processing unit 211 (FIG. 15). Note that FIG. 16 shows the principal components and aspects such as processing units and the data flow, but FIG. 16 does not necessarily show all the components and aspects. That is, in the hierarchization processing unit 211, there may be a processing unit that is not shown as a block in FIG. 16, or there may be a processing or data flow that is not shown as arrows or the like in FIG. 16.

As shown in FIG. 16, the hierarchization processing unit 211 includes an individual hierarchical level processing unit 221-1, an individual hierarchical level processing unit 221-2, . . . . The individual hierarchical level processing unit 221-1 performs processing on the lowest hierarchical level (N) of attribute information. The individual hierarchical level processing unit 221-2 performs processing on the hierarchical level (N−1) one level higher than the lowest hierarchical level (N) of attribute information. When there is no need to distinguish these individual hierarchical level processing units 221-1, 221-2, . . . , they are referred to as individual hierarchical level processing units 221. That is, the hierarchization processing unit 211 includes the same number of individual hierarchical level processing units 221 as the number of hierarchical levels of attribute information that can be handled.

An individual hierarchical level processing unit 221 performs processing related to hierarchization of the attribute information about the current hierarchical level (current LoD) that is the process target. For example, an individual hierarchical level processing unit 221 classifies the respective points of the current hierarchical level into prediction points and reference points (the prediction points of a higher hierarchical level) of the current hierarchical level, and derives predicted values and difference values. In doing so, the individual hierarchical level processing unit 221 adopts the present technology described above in <1. Scalable Decoding> to perform processing.

An individual hierarchical level processing unit 221 includes a point classification unit 231, a prediction unit 232, an arithmetic unit 233, an update unit 234, and an arithmetic unit 235.

The point classification unit 231 classifies the respective points of the current hierarchical level into prediction points and reference points. In doing so, as described above in <1. Scalable Decoding>, the point classification unit 231 selects prediction points (in other words, reference points) so that points also exist in voxels of the hierarchical level one level higher than the hierarchical level to which the voxels containing the points of the current hierarchical level belong. That is, the point classification unit 231 classifies points by any of the methods described above with reference to the table shown in FIG. 6. The point classification unit 231 supplies the attribute information H(N) about the points selected as the prediction points to the arithmetic unit 233. The point classification unit 231 also supplies the attribute information L(N) about the points selected as the reference points to the prediction unit 232 and the arithmetic unit 235.

Note that the point classification unit 231, the prediction unit 232, and the update unit 234 share the positional information about each point.

The prediction unit 232 derives predicted values P(N) of the attribute information about the prediction points, using the attribute information L(N), the positional information, and the like about the points selected as the reference points supplied from the point classification unit 231. In doing so, the prediction unit 232 derives predicted values P(N) by a method according to the present technology described above in <1. Scalable Decoding>. The prediction unit 232 supplies the derived predicted values P(N) to the arithmetic unit 233.

For each prediction point, the arithmetic unit 233 subtracts the predicted value P(N) supplied from the prediction unit 232 from the attribute information H(N) supplied from the point classification unit 231, and thus derives a difference value D(N). The arithmetic unit 233 supplies the derived difference value D(N) of each prediction point to the quantization unit 212 (FIG. 15). The arithmetic unit 233 also supplies the difference value D(N) of each derived prediction point to the update unit 234.

The update unit 234 acquires the difference values D(N) of the prediction points supplied from the arithmetic unit 233. The update unit 234 updates the difference values D(N) by performing a predetermined operation, and derives coefficients U(N). The arithmetic method adopted herein may be any appropriate method, but an arithmetic operation shown below in Expression (2) may be performed with the use of the quantization weights W to be used for quantization, for example.

[Mathematical Formula 2]

$$\text{Update}(P) = \frac{\sum_{Q \in \Delta(P)} [\alpha(P, Q) \times w(Q) \times D(Q)]}{\sum_{Q \in \Delta(P)} [\alpha(P, Q) \times w(Q)]} \quad (2)$$

In doing so, the update unit 234 derives the quantization weights w to be used in this arithmetic operation independently for the respective hierarchical levels, as described above in <1. Scalable Decoding>. That is, the point classification unit 231 performs this arithmetic operation, using the quantization weights w derived by adopting one of the methods described above with reference to the table shown in FIG. 12. The update unit 234 supplies the derived coefficients U(N) to the arithmetic unit 235.

The arithmetic unit 235 acquires the attribute information L(N) about the reference points supplied from the point classification unit 231. The arithmetic unit 235 also acquires the coefficients U(N) supplied from the update unit 234. The arithmetic unit 235 updates the attribute information L(N) (derives updated attribute information L' (N)) by adding the coefficient U(N) to the attribute information L(N). As a result, the decrease in compression efficiency can be reduced. The arithmetic unit 235 supplies the updated attribute information L'(N) to (the point classification unit 231 of) the individual hierarchical level processing unit 221 whose process target is the next higher hierarchical level (N−1). For example, in the case illustrated in FIG. 16, the arithmetic unit 235 of the individual hierarchical level processing unit 221-1 supplies the updated attribute information L'(N) to the individual hierarchical level processing unit 221-2. The individual hierarchical level processing unit 221 supplied with the updated attribute information L'(N) performs similar processing, with the process target being the points (that is, the next higher hierarchical level being the current hierarchical level).

By performing hierarchization as described above, the hierarchization processing unit 211 can associate the hierarchical structure of the attribute information with the hierarchical structure of the positional information. Also, hierarchization can be performed with the use of the quantization weights derived not depending on any lower hierarchical level. That is, the hierarchization processing unit 211 can further facilitate scalable decoding of attribute information.

Note that these processing units (the point classification unit 231 to the arithmetic unit 235) have any appropriate configurations. For example, each processing unit may be formed with a logic circuit that realizes the processes described above. Further, each processing unit may also include a CPU, ROM, RAM, and the like, for example, and execute a program using them, to perform the processes described above. Each processing unit may of course have both configurations, and perform some of the processes described above with a logic circuit, and the other by executing a program. The configurations of the respective processing units may be independent of one another. For example, one processing unit may perform some of the processes described above with a logic circuit while the other processing units perform the processes described above by executing a program. Further, some other processing unit may perform the processes described above both with a logic circuit and by executing a program.

<Flow in an Encoding Process>

Next, a process to be performed by the encoding device 200 is described. The encoding device 200 encodes the data of a point cloud by performing an encoding process. Referring now to the flowchart shown in FIG. 17, an example flow in this encoding process is described.

When the encoding process is started, the positional information encoding unit 201 of the encoding device 200 encodes the positional information about an input point cloud, and generates encoded data of the positional information in step S201.

In step S202, the positional information decoding unit 202 decodes the encoded data of the positional information generated in step S201, and generates the positional information.

In step S203, the point cloud generation unit 203 performs a recoloring process using the attribute information about the input point cloud and the positional information (decoding result) generated in step S202, and associates the attribute information with the positional information.

In step S204, the attribute information encoding unit 204 performs an attribute information encoding process to encode the attribute information subjected to the recoloring process in step S203, and generates encoded data of the attribute information. In doing so, the attribute information encoding unit 204 adopts the present technology described above in <1. Scalable Decoding> to perform processing. The attribute information encoding process will be described later in detail.

In step S205, the bitstream generation unit 205 generates and outputs a bitstream containing the encoded data of the positional information generated in step S201 and the encoded data of the attribute information generated in step S204.

When the processing in step S205 is completed, the encoding process comes to an end.

By performing the processing in each step in the above manner, the encoding device 200 can associate the hierarchical structure of the attribute information with the hierarchical structure of the positional information. Also, with such a configuration, quantization and inverse quantization that do not depend on any lower hierarchical level can be performed. That is, the encoding device 200 can further facilitate scalable decoding of attribute information.

<Flow in an Attribute Information Encoding Process>

Next, an example flow in the attribute information encoding process to be performed in step S204 in FIG. 17 is described, with reference to the flowchart shown in FIG. 18.

When the attribute information encoding process is started, the hierarchization processing unit 211 of the attribute information encoding unit 204 hierarchizes the attribute information by performing a hierarchization process, and derives difference values of the attribute information about the respective points in step S221. In doing so, the hierarchization processing unit 211 adopts the present technology described above in <1. Scalable Decoding> to perform hierarchization. The hierarchization process will be described later in detail.

In step S222, the quantization unit 212 quantizes each difference value derived in step S221 by performing a quantization process. In doing so, the quantization unit 212 adopts the present technology described above in <1. Scalable Decoding> to perform quantization. The quantization process will be described later in detail.

In step S223, the encoding unit 213 encodes the difference values quantized in step S222, and generates encoded data of the attribute information.

When the processing in step S223 is completed, the attribute information encoding process comes to an end, and the process returns to FIG. 17.

By performing the processing in each step in the above manner, the attribute information encoding unit 204 can associate the hierarchical structure of the attribute information with the hierarchical structure of the positional information. Also, quantization can be performed independently of any lower hierarchical level. In addition to that, inverse quantization that does not depend on any lower hierarchical level can be performed. That is, the attribute information encoding unit 204 can further facilitate scalable decoding of attribute information.

<Flow in a Hierarchization Process>

Figure 19:
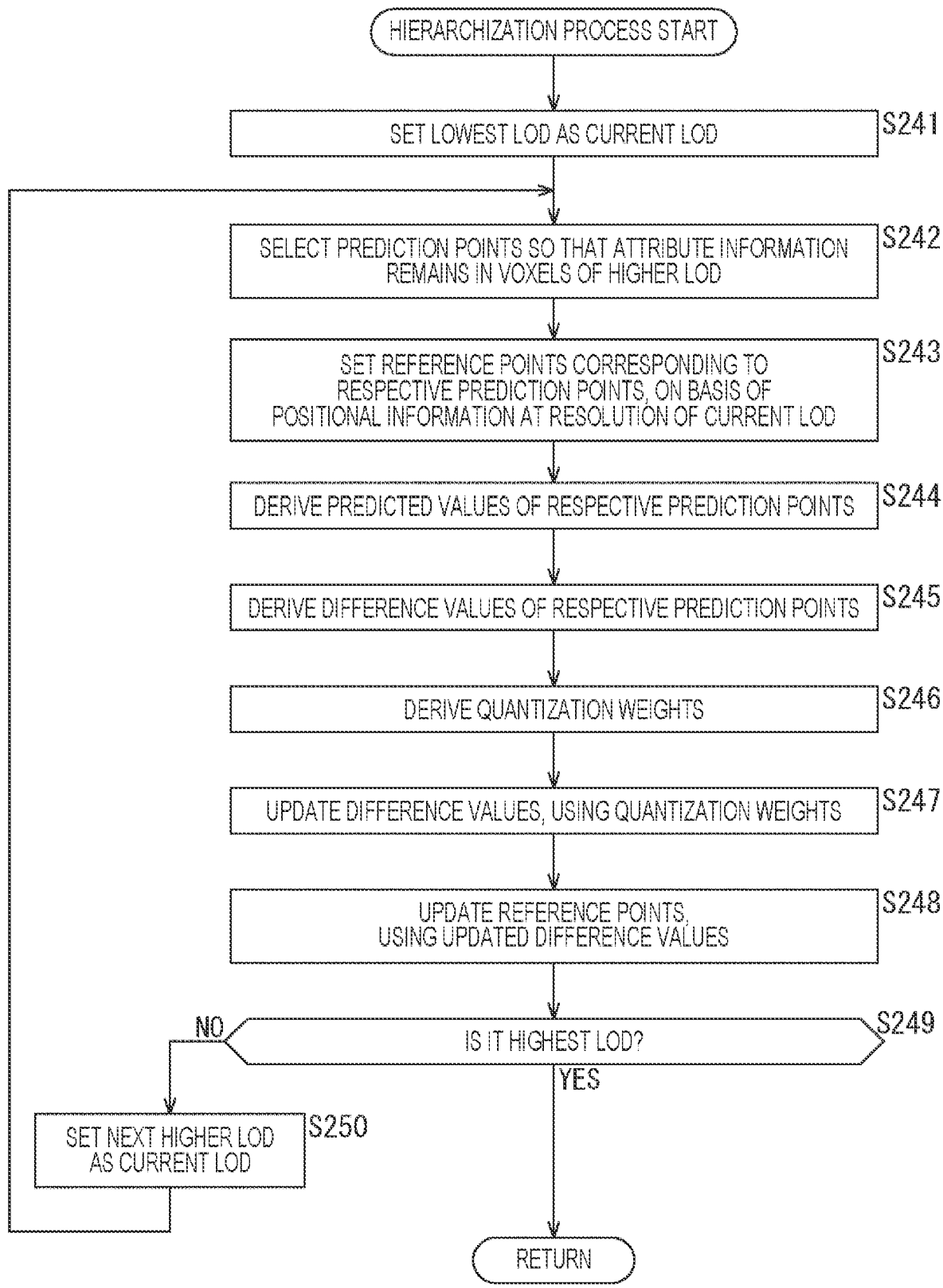
FIG. 19 is a flowchart for explaining an example flow in a hierarchization process.

Next, an example flow in the hierarchization process to be performed in step S221 in FIG. 18 is described, with reference to the flowchart shown in FIG. 19. A case where method 1-1 described in the second row from the top of the table shown in FIG. 6 is adopted is described herein.

When the hierarchization process is started, the individual hierarchical level processing units 221 of the hierarchization processing unit 211 in step S241 sets the lowest hierarchical level (LoD) as the current hierarchical level (current LoD) that is the process target.

In step S242, the point classification unit 231 selects prediction points so that points also exist in voxels of the hierarchical level one level higher than the hierarchical level to which the voxels containing the points of the current hierarchical level belong. In other words, the point classification unit 231 selects reference points by this process.

For example, the point classification unit 231 sets reference points one by one for voxels of the hierarchical level one level higher than the hierarchical level to which each voxel containing a point of the current hierarchical level belongs. Note that, when there is a plurality of candidate points, the point classification unit 231 selects one of them. The selection method adopted herein may be any appropriate method. For example, the point having the largest number of points in its vicinity may be selected as a reference point. After setting a reference point, the point classification unit 231 next sets a point other than the reference point, as a prediction point. In this manner, prediction points are selected so that points also exist in voxels of the hierarchical level one level higher than the hierarchical level to which the voxels containing the points of the current hierarchical level belong.

In step S243, the point classification unit 231 sets reference points corresponding to the respective prediction points on the basis of the positional information at the resolution of the current hierarchical level.

For example, the point classification unit 231 searches for a prediction point (a vicinity prediction point) located within a predetermined range from a reference point, using the positional information at the resolution of the current hierarchical level. The point classification unit 231 associates the prediction point with the reference point so that the detected vicinity prediction point will refer to the reference point. As the point classification unit 231 performs such processing on each reference point, all the prediction points are associated with the reference points. That is, the reference points (to be referred to by the respective prediction points) corresponding to the respective prediction points are set.

In step S244, the prediction unit 232 derives predicted values of the respective prediction points. That is, on the basis of the correspondence relationship set by the processing in step S243, the prediction unit 232 derives predicted values of the attribute information about the prediction points, using the attribute information about the reference points corresponding to the respective prediction points.

For example, as explained above with reference to FIG. 4, the prediction unit 232 weights the attribute information about the respective reference points corresponding to the prediction points with quantization weights ($\alpha$ (P, Q (i, j))) corresponding to the reciprocals of the distances between the prediction points and the reference points, and integrates the attribute information by performing an arithmetic operation as shown in Expression (1) shown above. In doing so, the prediction unit 232 derives and adopts the distances between the prediction points and the reference points, using the positional information at the resolution of the current hierarchical level.

In step S245, the arithmetic unit 233 derives difference values of the respective prediction points by subtracting the predicted values derived in step S244 from the attribute information about the prediction points selected in step S242.

In step S246, the update unit 234 derives the quantization weights to be used in the update process. The update unit 234 derives the quantization weights by adopting one of the methods described in the table shown in FIG. 12. That is, the update unit 234 derives the quantization weights independently for each hierarchical level.

In step S247, the update unit 234 updates the difference values derived in step S245, using the quantization weights derived in step S246. For example, the update unit 234 performs this update by performing the arithmetic operation expressed by Expression (2) shown above.

In step S248, the arithmetic unit 235 updates the attribute information about the reference points set in step S243, using the difference values updated in step S247.

In step S249, the individual hierarchical level processing unit 221 determines whether or not the current hierarchical level (current LoD) is the highest hierarchical level. Note that the highest hierarchical level in the hierarchical structure of the attribute information is set independently of the hierarchical levels of the positional information, and therefore, might be different from the highest hierarchical level in the hierarchical structure of the positional information. If the current hierarchical level is determined not to be the highest hierarchical level, the process moves on to step S250.

In step S250, the individual hierarchical level processing unit 221 sets the next higher hierarchical level (LoD) as the current hierarchical level (current LoD) that is the process target. When the processing in step S250 is completed, the process returns to step S242. That is, the processing in each of steps S242 to S250 is performed for each hierarchical level.

Further, if the current hierarchical level is determined to be the highest hierarchical level in step S249, the hierarchization process comes to an end, and the process returns to FIG. 18.

By performing the processing in each step in the above manner, the hierarchization processing unit 211 can associate the hierarchical structure of the attribute information with the hierarchical structure of the positional information. Also, hierarchization can be performed with the use of the quantization weights derived not depending on any lower hierarchical level. That is, the hierarchization processing unit 211 can further facilitate scalable decoding of attribute information.

<Flow in a Quantization Process>

Figure 20:
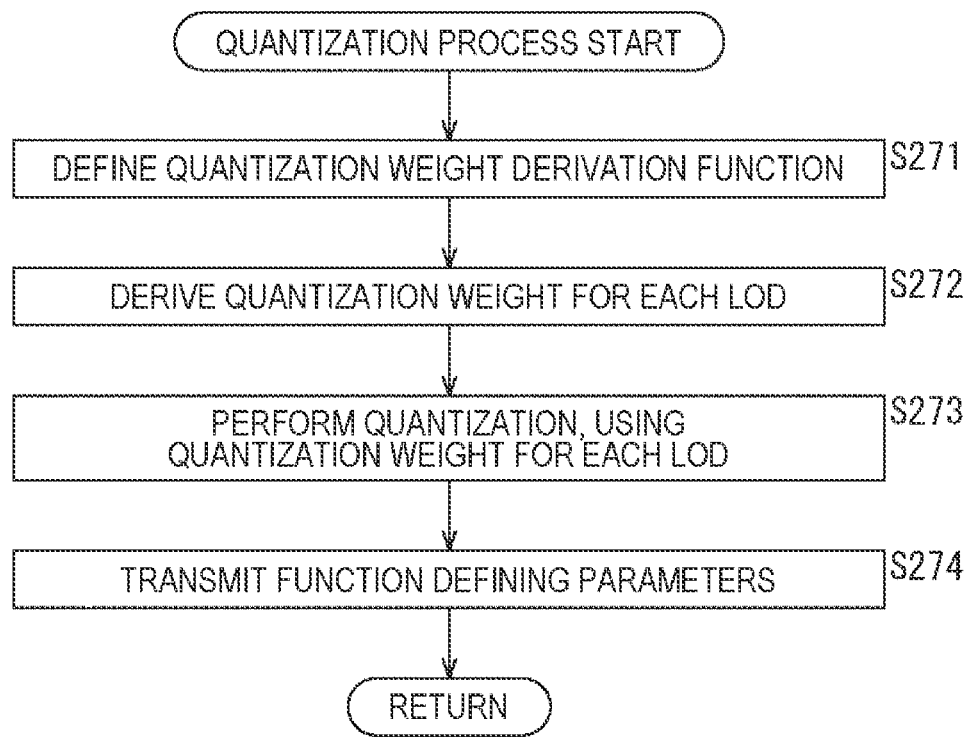
FIG. 20 is a flowchart for explaining an example flow in a quantization process.

Next, an example flow in the quantization process to be performed in step S222 in FIG. 18 is described, with reference to the flowchart shown in FIG. 20. A case where method 1-1-2 described in the fourth row from the top of the table shown in FIG. 12 is adopted is described herein.

When the quantization process is started, the quantization unit 212 defines a quantization weight derivation function in step S271.

In step S272, the quantization unit 212 derives a quantization weight for each hierarchical level (LoD), using the quantization weight derivation function defined in step S271.

In step S273, the quantization unit 212 quantizes the difference values of the attribute information, using the quantization weights for the respective LoDs derived in step S272.

In step S274, the quantization unit 212 supplies the encoding unit 213 with the quantization weight derivation function defining parameters that define the quantization weight derivation function used in the quantization weight derivation, and causes the encoding unit 213 to perform encoding. That is, the quantization unit 212 transmits the quantization weight derivation function defining parameters to the decoding side.

When the processing in step S274 is completed, the quantization process comes to an end, and the process returns to FIG. 18.

By performing the quantization process as described above, the quantization unit 212 can perform quantization not depending on any lower hierarchical level. In addition to that, inverse quantization that does not depend on any lower hierarchical level can be performed. That is, the quantization unit 212 can further facilitate scalable decoding of attribute information.

<Flow in a Hierarchization Process>

Note that, when method 1-1' described in the third row from the top of the table shown in FIG. 6 is adopted, the hierarchization process is performed basically in a flow similar to that in the flowchart shown in FIG. 19. However, in the processing in step S243, the point classification unit 231 sets the reference points corresponding to the respective prediction points, on the basis of the positional information at the resolution of the lowest hierarchical level (that is, the highest resolution). Further, in the processing in step S244, the prediction unit 232 derives the distances between the prediction points and the reference points, using the positional information at the resolution of the lowest hierarchical level (that is, the highest resolution), and derives predicted values, using quantization weights depending on the reciprocals of the distances.

By doing so, the hierarchization processing unit 211 can derive predicted values of the prediction points, using the attribute information about the reference points that are weighted in accordance with distances based on the positional information at the resolution of the lowest hierarchical level in the point cloud.

Figure 21:
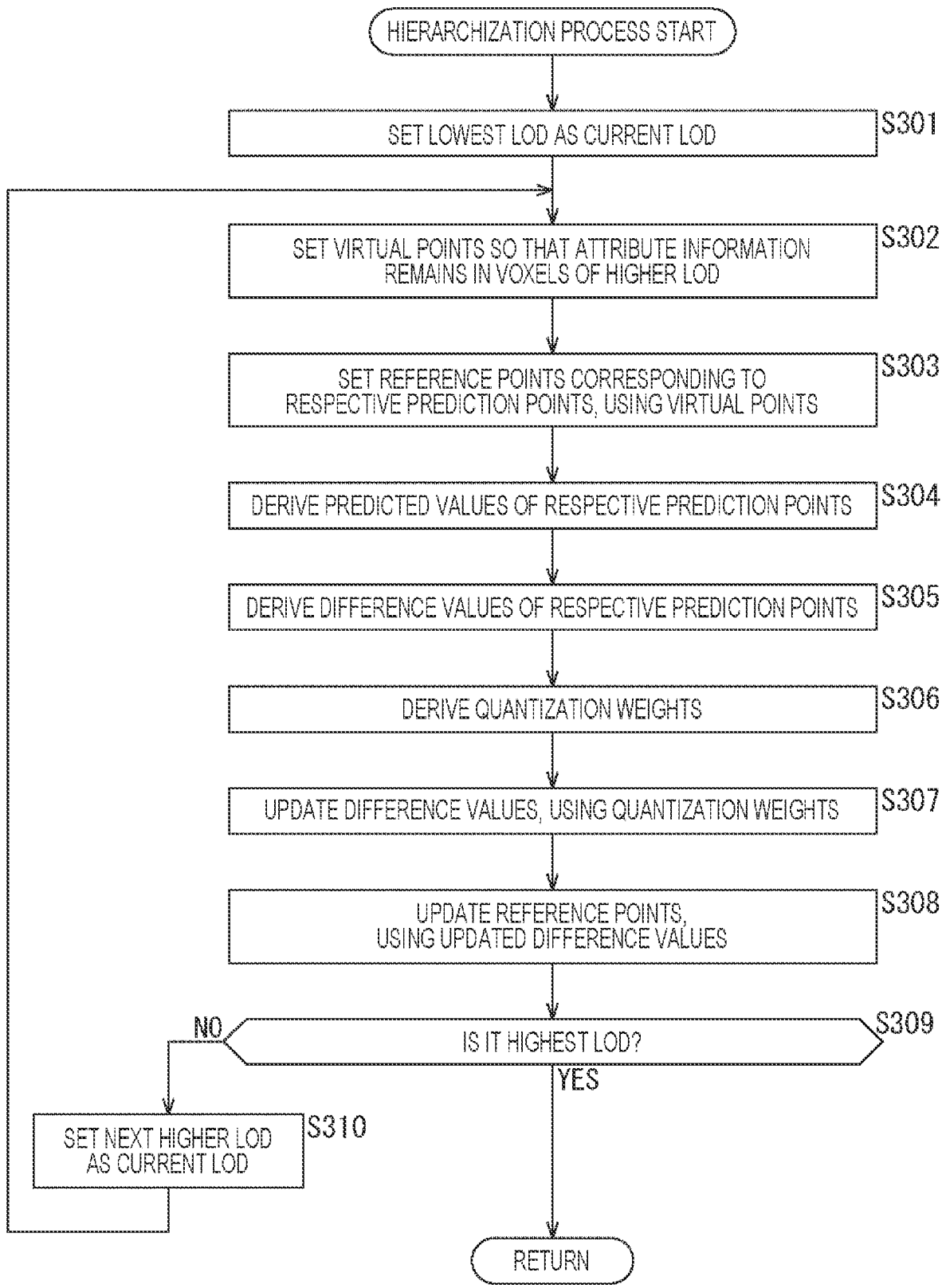
FIG. 21 is a flowchart for explaining an example flow in a hierarchization process.

Next, an example flow in a hierarchization process when method 1-2 described in the fourth row from the top of the table shown in FIG. 6 is adopted is described, with reference to the flowchart shown in FIG. 21.

In this case, the hierarchization processing unit 211 performs the processing in each of step S301 and steps S303 to S310 in a manner similar to that in the processing in each of step S241 and steps S243 to S250 in FIG. 19.

Also, in step S302, the point classification unit 231 sets all the points of the current hierarchical level as prediction points, and further sets virtual reference points so that points also exist in voxels of the hierarchical level one level higher than the hierarchical level to which the voxels containing points of the current hierarchical level belong. The point classification unit 231 performs a recoloring process using the attribute information about the existing points (prediction points), and generates attribute information about the set virtual reference points.

In step S303, the point classification unit 231 sets reference points corresponding to the respective prediction points among the virtual reference points set in step S302, on the basis of the positional information at the resolution of the current hierarchical level.

By performing the processing in each step in the above manner, the hierarchization processing unit 211 can associate the hierarchical structure of the attribute information with the hierarchical structure of the positional information. Also, hierarchization can be performed with the use of the quantization weights derived not depending on any lower hierarchical level. That is, the hierarchization processing unit 211 can further facilitate scalable decoding of attribute information.

<Flow in a Quantization Process>

Figure 22:
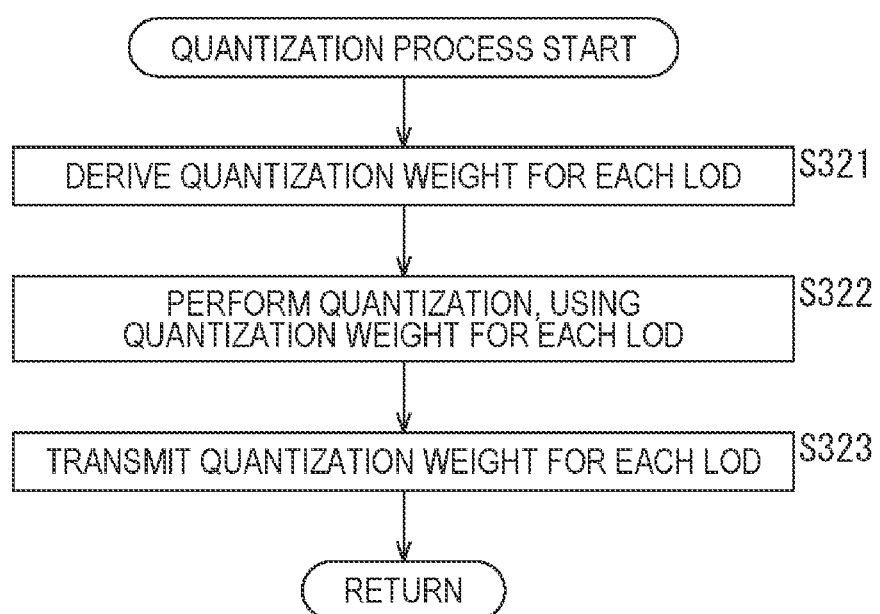
FIG. 22 is a flowchart for explaining an example flow in a quantization process.

Next, an example flow in a quantization process when method 1-2-2 described in the seventh row from the top of the table shown in FIG. 12 is adopted is described, with reference to the flowchart shown in FIG. 22.

When the quantization process is started, the quantization unit 212 derives a quantization weight for each hierarchical level (LoD) in step S321.

In step S322, the quantization unit 212 quantizes the difference values of the attribute information, using the quantization weights for the respective LoDs derived in step S321.

In step S323, the quantization unit 212 supplies the quantization weights used for the quantization to the encoding unit 213, and causes the encoding unit 213 to perform encoding. That is, the quantization unit 212 has the quantization weights transmitted to the decoding side.

When the processing in step S323 is completed, the quantization process comes to an end, and the process returns to FIG. 18.

By performing the quantization process as described above, the quantization unit 212 can perform quantization not depending on any lower hierarchical level. In addition to that, inverse quantization that does not depend on any lower hierarchical level can be performed. That is, the quantization unit 212 can further facilitate scalable decoding of attribute information.

3. Second Embodiment

<Decoding Device>

Figure 23:
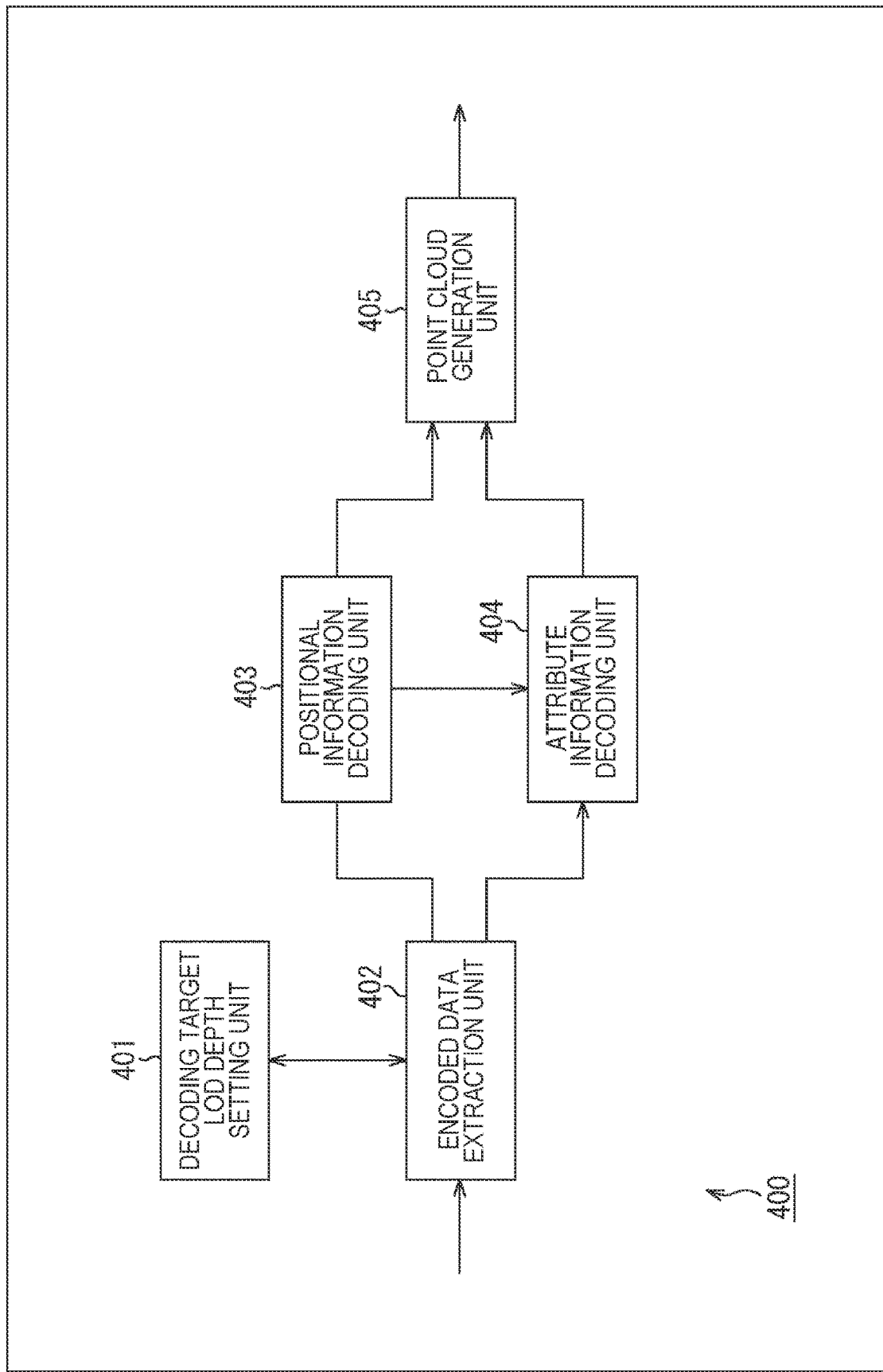
FIG. 23 is a block diagram showing a typical example configuration of a decoding device.

FIG. 23 is a block diagram showing an example configuration of a decoding device as an embodiment of an information processing apparatus to which the present technology is applied. A decoding device 400 shown in FIG. 23 is a device that decodes encoded data of a point cloud (3D data). The decoding device 400 decodes encoded data of a point cloud by adopting the present technology described above in <1. Scalable Decoding>.

Note that FIG. 23 shows the principal components and aspects such as processing units and the data flow, but FIG. 23 does not necessarily show all the components and aspects. That is, in the decoding device 400, there may be a processing unit that is not shown as a block in FIG. 23, or there may be a processing or data flow that is not indicated by arrows or the like in FIG. 23.

As shown in FIG. 23, the decoding device 400 includes a decoding target LoD depth setting unit 401, an encoded data extraction unit 402, a positional information decoding unit 403, an attribute information decoding unit 404, and a point cloud generation unit 405.

The decoding target LoD depth setting unit 401 performs processing related to setting of the depth of the hierarchical level (LoD) that is the decoding target. For example, the decoding target LoD depth setting unit 401 determines to which hierarchical level the encoded data of the point cloud held in the encoded data extraction unit 402 is to be decoded. The method adopted herein for setting the depth of the hierarchical level that is the decoding target may be any appropriate method.

For example, the decoding target LoD depth setting unit 401 may perform setting, on the basis of an instruction regarding the hierarchical level depth, the instruction being sent from the outside such as a user or an application. Alternatively, the decoding target LoD depth setting unit 401 may calculate and set the depth of the hierarchical level to be decoded, on the basis of desired information such as an output image.

For example, the decoding target LoD depth setting unit 401 may set the depth of the hierarchical level to be decoded, on the basis of the viewpoint position, the direction, the angle of view, viewpoint movement (moving, panning, tilting, or zooming), and the like of the two-dimensional image to be generated from the point cloud.

Note that the data unit for setting the depth of the hierarchical level that is the decoding target may be any appropriate data unit. For example, the decoding target LoD depth setting unit 401 can set the hierarchical level depth of the entire point cloud, can set the hierarchical level depth of each object, and can set the hierarchical level depth of each partial region in an object. Of course, a hierarchical level depth can also be set for each data unit other than these examples.

The encoded data extraction unit 402 acquires and holds a bitstream input to the decoding device 400. The encoded data extraction unit 402 extracts, from the held bitstream, the encoded data of the positional information and the attribute information about the hierarchical levels from the highest hierarchical level to the hierarchical level designated by the decoding target LoD depth setting unit 401. The encoded data extraction unit 402 supplies the extracted encoded data of the positional information to the positional information decoding unit 403. The encoded data extraction unit 402 supplies the extracted encoded data of the attribute information to the attribute information decoding unit 404.

The positional information decoding unit 403 acquires the encoded data of the positional information supplied from the encoded data extraction unit 402. The positional information decoding unit 403 decodes the encoded data of the positional information, and generates the positional information (decoding result). The decoding method adopted herein may be any appropriate method that is similar to that in the case of the positional information decoding unit 202 of the encoding device 200. The positional information decoding unit 403 supplies the generated positional information (decoding result) to the attribute information decoding unit 404 and the point cloud generation unit 405.

The attribute information decoding unit 404 acquires the encoded data of the attribute information supplied from the encoded data extraction unit 402. The attribute information decoding unit 404 acquires the positional information (decoding result) supplied from the positional information decoding unit 403. Using the positional information (decoding result), the attribute information decoding unit 404 decodes the encoded data of the attribute information by a method according to the present technology described above in <1. Scalable Decoding>, and generates the attribute information (decoding result). The attribute information decoding unit 404 supplies the generated attribute information (decoding result) to the point cloud generation unit 405.

The point cloud generation unit 405 acquires the positional information (decoding result) supplied from the positional information decoding unit 403. The point cloud generation unit 405 acquires the attribute information (decoding result) supplied from the attribute information decoding unit 404. The point cloud generation unit 405 generates the point cloud (decoding result), using the positional information (decoding result) and the attribute information (decoding result). The point cloud generation unit 405 outputs the data of the generated point cloud (decoding result) to the outside of the decoding device 400.

With such a configuration, the decoding device 400 can correctly derive predicted values of the attribute information, and correctly perform inverse hierarchization on the hierarchical structure of the attribute information associated with the hierarchical structure of the positional information. By doing so, the decoding device 400 can also perform inverse quantization not depending on any lower hierarchical level. That is, the decoding device 400 can more easily perform scalable decoding of attribute information.

Note that these processing units (the decoding target LoD depth setting unit 401 to the point cloud generation unit 405) have any appropriate configurations. For example, each processing unit may be formed with a logic circuit that realizes the processes described above. Further, each processing unit may also include a CPU, ROM, RAM, and the like, for example, and execute a program using them, to perform the processes described above. Each processing unit may of course have both configurations, and perform some of the processes described above with a logic circuit, and the other by executing a program. The configurations of the respective processing units may be independent of one another. For example, one processing unit may perform some of the processes described above with a logic circuit while the other processing units perform the processes described above by executing a program. Further, some other processing unit may perform the processes described above both with a logic circuit and by executing a program.

<Attribute Information Decoding Unit>

Figure 24:
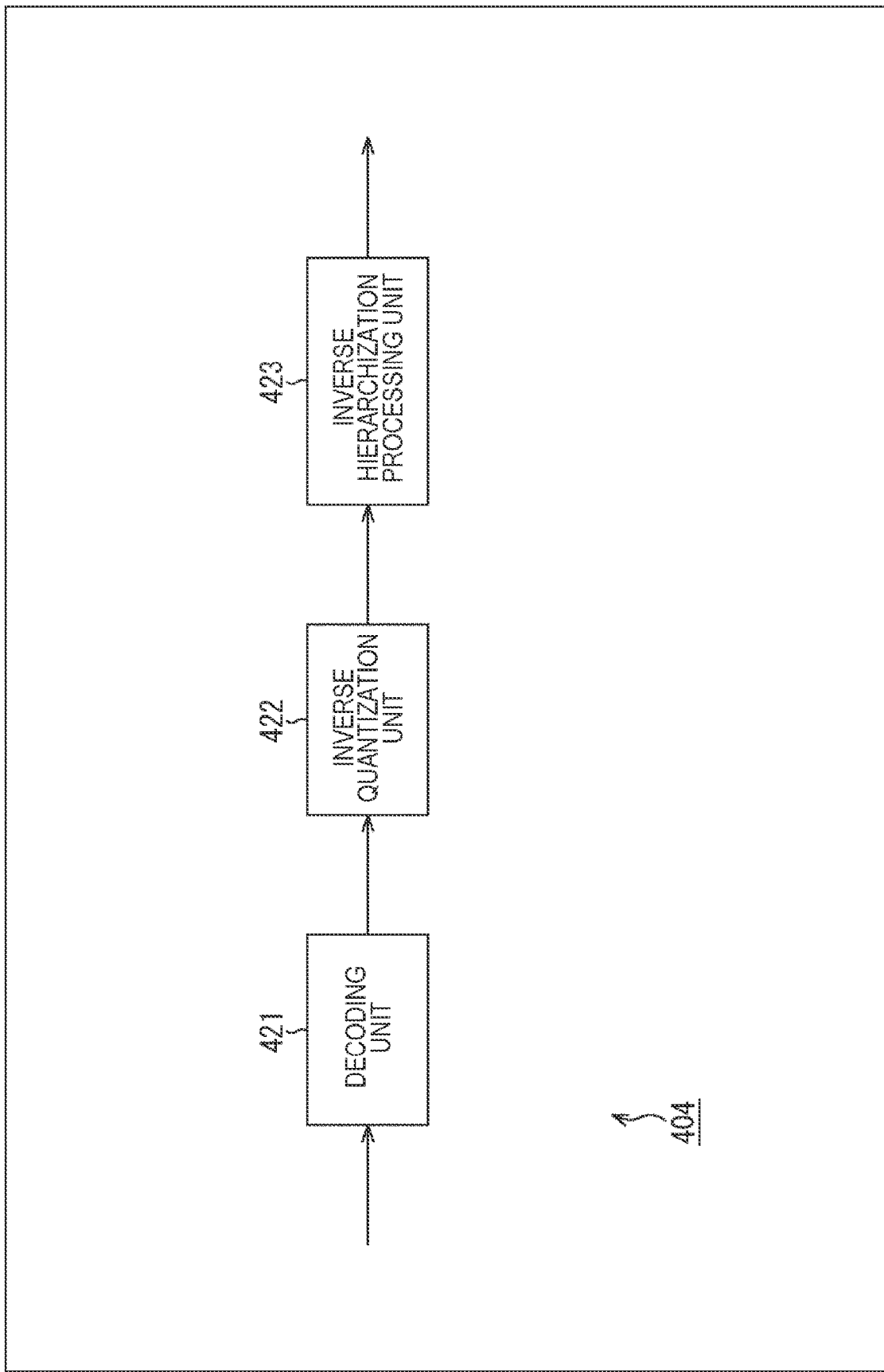
FIG. 24 is a block diagram showing a typical example configuration of an attribute information decoding unit.

FIG. 24 is a block diagram showing a typical example configuration of the attribute information decoding unit 404 (FIG. 23). Note that FIG. 24 shows the principal components and aspects such as processing units and the data flow, but FIG. 24 does not necessarily show all the components and aspects. That is, in the attribute information decoding unit 404, there may be a processing unit that is not shown as a block in FIG. 24, or there may be a processing or data flow that is not shown as arrows or the like in FIG. 24.

As shown in FIG. 24, the attribute information decoding unit 404 includes a decoding unit 421, an inverse quantization unit 422, and an inverse hierarchization processing unit 423.

The decoding unit 421 acquires encoded data of attribute information supplied to the attribute information decoding unit 404. The decoding unit 421 decodes the encoded data of the attribute information, and generates the attribute information (decoding result). The decoding method adopted herein may be any appropriate method compatible with the encoding method adopted by the encoding unit 213 (FIG. 15) of the encoding device 200. Further, the generated attribute information (decoding result) corresponds to the attribute information prior to the encoding, is the difference values between the attribute information and the predicted values as described in the first embodiment, and has been quantized. The decoding unit 421 supplies the generated attribute information (decoding result) to the inverse quantization unit 422.

Note that, when the encoded data of the attribute information includes information regarding quantization weights (such as the quantization weight derivation function defining parameters and the quantization weights, for example), the decoding unit 421 also generates the information (decoding result) regarding the quantization weights. The decoding unit 421 supplies the generated information (decoding result) regarding the quantization weights to the inverse quantization unit 422. The decoding unit 421 can also use the generated information (decoding result) regarding the quantization weights, to decode the encoded data of the attribute information.

The inverse quantization unit 422 acquires the attribute information (decoding result) supplied from the decoding unit 421. The inverse quantization unit 422 inversely quantizes the attribute information (decoding result). In doing so, the inverse quantization unit 422 adopts the present technology described above in <1. Scalable Decoding>, to perform inverse quantization that is the inverse process of the quantization performed by the quantization unit 212 (FIG. 15) of the encoding device 200. That is, the inverse quantization unit 422 inversely quantizes the attribute information (decoding result), using the quantization weights for the respective hierarchical levels as described above in <1. Scalable Decoding>.

Note that, when the information (decoding result) regarding the quantization weights is supplied from the decoding unit 421, the inverse quantization unit 422 also acquires the information (decoding result) regarding the quantization weights. In that case, the inverse quantization unit 422 inversely quantizes the attribute information (decoding result), using the quantization weights specified by the information (decoding result) regarding the quantization weights, or the quantization weights derived on the basis of the information (decoding result) regarding the quantization weights.

The inverse quantization unit 422 supplies the inversely quantized attribute information (decoding result) to the inverse hierarchization processing unit 423.

The inverse hierarchization processing unit 423 acquires the inversely quantized attribute information (decoding result) supplied from the inverse quantization unit 422. As described above, this attribute information is difference values. The inverse hierarchization processing unit 423 also acquires the positional information (decoding result) supplied from the positional information decoding unit 403. Using the positional information (decoding result), the inverse hierarchization processing unit 423 performs inverse hierarchization of the acquired attribute information (difference values), the inverse hierarchization being the inverse process of the hierarchization performed by the hierarchization processing unit 211 (FIG. 15) of the encoding device 200. In doing so, the inverse hierarchization processing unit 423 adopts the present technology described above in <1. Scalable Decoding> to perform inverse hierarchization. That is, the inverse hierarchization processing unit 423 derives predicted values with the use of the positional information, and restores the attribute information by adding the predicted values to the difference values. In this manner, the inverse hierarchization processing unit 423 inversely hierarchizes the attribute information having a hierarchical structure similar to that of the positional information, using the positional information. The inverse hierarchization processing unit 423 supplies the inversely hierarchized attribute information as a decoding result to the point cloud generation unit 405 (FIG. 23).

By performing inverse quantization and inverse hierarchization as described above, the attribute information decoding unit 404 can correctly derive predicted values of attribute information, and perform correct inverse hierarchization on the hierarchical structure of the attribute information associated with the hierarchical structure of the positional information. Also, inverse quantization can be performed independently of any lower hierarchical level. That is, the decoding device 400 can more easily perform scalable decoding of attribute information.

Note that these processing units (the decoding unit 421 to the inverse hierarchization processing unit 423) have any appropriate configurations. For example, each processing unit may be formed with a logic circuit that realizes the processes described above. Further, each processing unit may also include a CPU, ROM, RAM, and the like, for example, and execute a program using them, to perform the processes described above. Each processing unit may of course have both configurations, and perform some of the processes described above with a logic circuit, and the other by executing a program. The configurations of the respective processing units may be independent of one another. For example, one processing unit may perform some of the processes described above with a logic circuit while the other processing units perform the processes described above by executing a program. Further, some other processing unit may perform the processes described above both with a logic circuit and by executing a program.

<Inverse Hierarchization Processing Unit>

Figure 25:
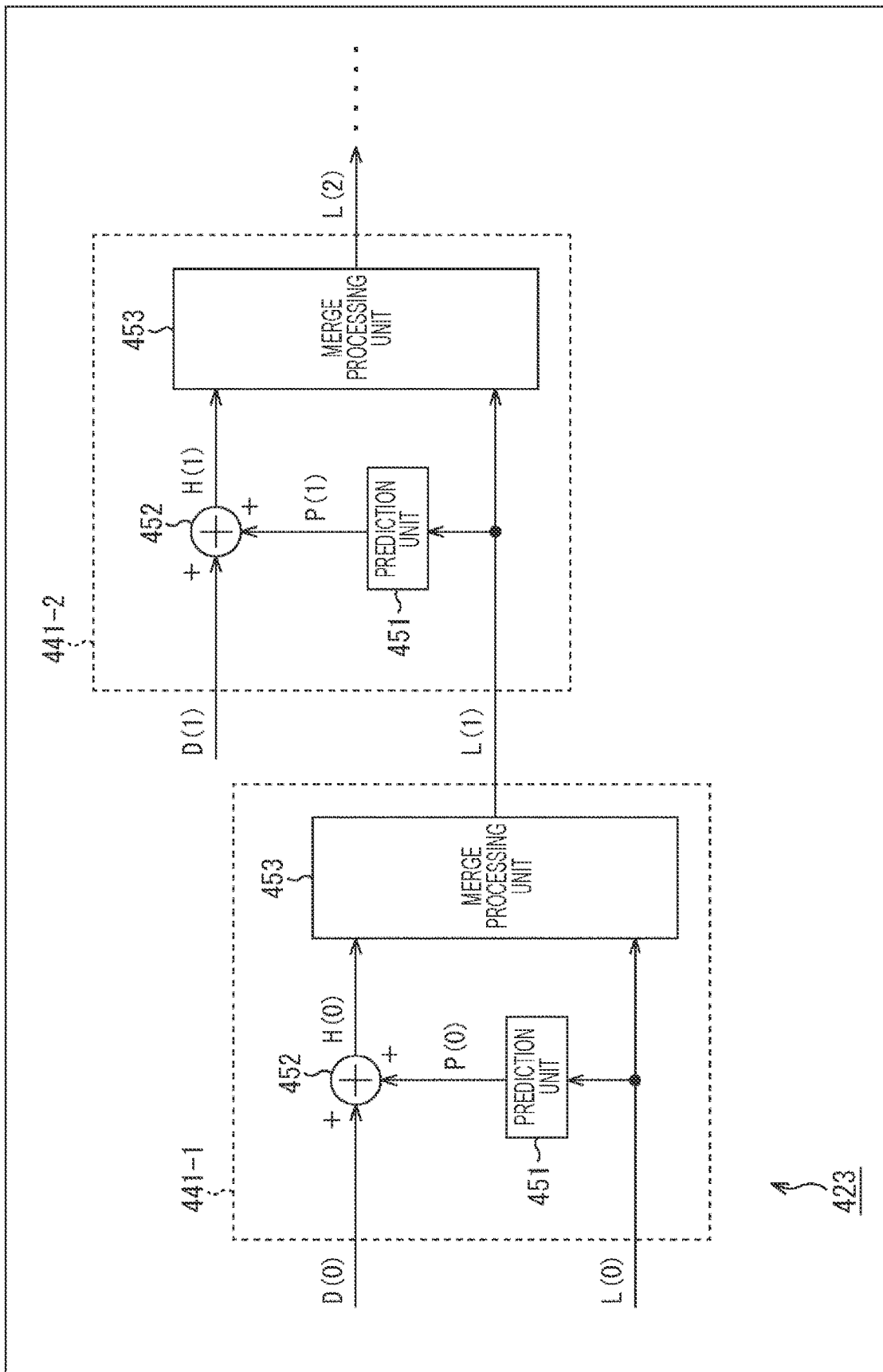
FIG. 25 is a block diagram showing a typical example configuration of an inverse hierarchization processing unit.

FIG. 25 is a block diagram showing a typical example configuration of the inverse hierarchization processing unit 423 (FIG. 24). Note that FIG. 25 shows the principal components and aspects such as processing units and the data flow, but FIG. 24 does not necessarily show all the components and aspects. That is, in the inverse hierarchization processing unit 423, there may be a processing unit that is not shown as a block in FIG. 24, or there may be a processing or data flow that is not shown as arrows or the like in FIG. 24.

As shown in FIG. 24, the inverse hierarchization processing unit 423 includes an individual hierarchical level processing unit 441-1, an individual hierarchical level processing unit 441-2 . . . . The individual hierarchical level processing unit 441-1 performs processing on the highest hierarchical level (0) of attribute information. The individual hierarchical level processing unit 441-2 performs processing on the hierarchical level (1) one level lower than the highest hierarchical level of attribute information. When there is no need to distinguish these individual hierarchical level processing units 441-1, 441-2, . . . , they are referred to as individual hierarchical level processing units 441. That is, the inverse hierarchization processing unit 423 includes the same number of individual hierarchical level processing units 441 as the number of hierarchical levels of attribute information that can be handled.

An individual hierarchical level processing unit 441 performs processing related to inverse hierarchization of the attribute information (difference values) about the current hierarchical level (current LoD) that is the process target. For example, an individual hierarchical level processing unit 441 derives predicted values of the attribute information about the respective points of the current hierarchical level, and adds the predicted values to the difference values, to derive the attribute information about the respective points of the current hierarchical level. In doing so, the individual hierarchical level processing unit 441 adopts the present technology described above in <1. Scalable Decoding> to perform processing.

An individual hierarchical level processing unit 441 includes a prediction unit 451, an arithmetic unit 452, and a merge processing unit 453.

The prediction unit 451 acquires the attribute information L(N) about the reference points of the current hierarchical level supplied from the inverse quantization unit 422 or the individual hierarchical level processing unit 441 of the previous stage. The prediction unit 451 also acquires the positional information (decoding result) supplied from the positional information decoding unit 403. Using the positional information and the attribute information, the prediction unit 451 derives the predicted values P(N) of the attribute information about the prediction points. In doing so, the prediction unit 451 derives predicted values P(N) by a method according to the present technology described above in <1. Scalable Decoding>. The prediction unit 451 supplies the derived predicted value P(N) to the arithmetic unit 452.

The arithmetic unit 452 acquires the difference values D(N) of the attribute information about the prediction points of the current hierarchical level supplied from the inverse quantization unit 422. The arithmetic unit 452 also acquires the predicted values P(N) of the attribute information about the prediction points of the current hierarchical level supplied from the prediction unit 451. The arithmetic unit 452 adds the difference values D(N) to the predicted values P(N), to generate (restore) the attribute information H(N) about the prediction points. The arithmetic unit 452 supplies the generated attribute information H(N) about the prediction points to the merge processing unit 453.

The merge processing unit 453 acquires the attribute information L(N) about the reference points of the current hierarchical level supplied from the inverse quantization unit 422 or the individual hierarchical level processing unit 441 of the previous stage. The merge processing unit 453 also acquires the attribute information H(N) about the prediction points of the current hierarchical level supplied from the arithmetic unit 452. The merge processing unit 453 merges the acquired attribute information L(N) about the reference points and the attribute information H(N) about the prediction points. As a result, attribute information about all the points of the hierarchical levels from the highest hierarchical level to the current hierarchical level is generated. The merge processing unit 453 supplies (the prediction unit 451 and the merge processing unit 453 of) the individual hierarchical level processing unit 441 of the next stage with the generated attribute information about all the points as the attribute information L(N+1) about the reference points of the hierarchical level that is one level lower than the current hierarchical level.

Note that, in the case of the individual hierarchical level processing unit 441 regarding the lowest hierarchical level as the current hierarchical level to be decoded, the merge processing unit 453 supplies the point cloud generation unit 405 (FIG. 23) with the generated attribute information about all the points as a decoding result.

By performing inverse hierarchization as described above, the inverse hierarchization processing unit 423 can correctly derive predicted values of attribute information, and perform correct inverse hierarchization on the hierarchical structure of the attribute information associated with the hierarchical structure of the positional information. That is, the decoding device 400 can more easily perform scalable decoding of attribute information.

Note that these processing units (the prediction unit 451 to the merge processing unit 453) have any appropriate configurations. For example, each processing unit may be formed with a logic circuit that realizes the processes described above. Further, each processing unit may also include a CPU, ROM, RAM, and the like, for example, and execute a program using them, to perform the processes described above. Each processing unit may of course have both configurations, and perform some of the processes described above with a logic circuit, and the other by executing a program. The configurations of the respective processing units may be independent of one another. For example, one processing unit may perform some of the processes described above with a logic circuit while the other processing units perform the processes described above by executing a program. Further, some other processing unit may perform the processes described above both with a logic circuit and by executing a program.

<Flow in a Decoding Process>

Next, a process to be performed by the decoding device 400 is described. The decoding device 400 decodes encoded data of a point cloud by performing a decoding process. An example flow in this decoding process is described, with reference to the flowchart shown in FIG. 26.

When the decoding process is started, the decoding target LoD depth setting unit 401 of the decoding device 400 in step S401 sets the depth of the LoD to be decoded.

In step S402, the encoded data extraction unit 402 acquires and holds a bitstream, and extracts encoded data of the positional information and the attribute information down to the LoD depth set in step S401.

In step S403, the positional information decoding unit 403 decodes the encoded data of the positional information extracted in step S402, and generates the positional information (decoding result).

In step S404, the attribute information decoding unit 404 decodes the encoded data of the attribute information extracted in step S402, and generates the attribute information (decoding result). In doing so, the attribute information decoding unit 404 adopts the present technology described above in <1. Scalable Decoding> to perform processing. The attribute information decoding process will be described later in detail.

In step S405, the point cloud generation unit 405 generates and outputs a point cloud (decoding result), using the positional information (decoding result) generated in step S403 and the attribute information (decoding result) generated in step S404.

When the processing in step S405 is completed, the decoding process comes to an end.

By performing the processing in each step as described above, the decoding device 400 can correctly derive predicted values of the attribute information, and correctly perform inverse hierarchization on the hierarchical structure of the attribute information associated with the hierarchical structure of the positional information. By doing so, the decoding device 400 can also perform inverse quantization not depending on any lower hierarchical level. That is, the decoding device 400 can more easily perform scalable decoding of attribute information.

<Flow in an Attribute Information Decoding Process>

Figure 26:
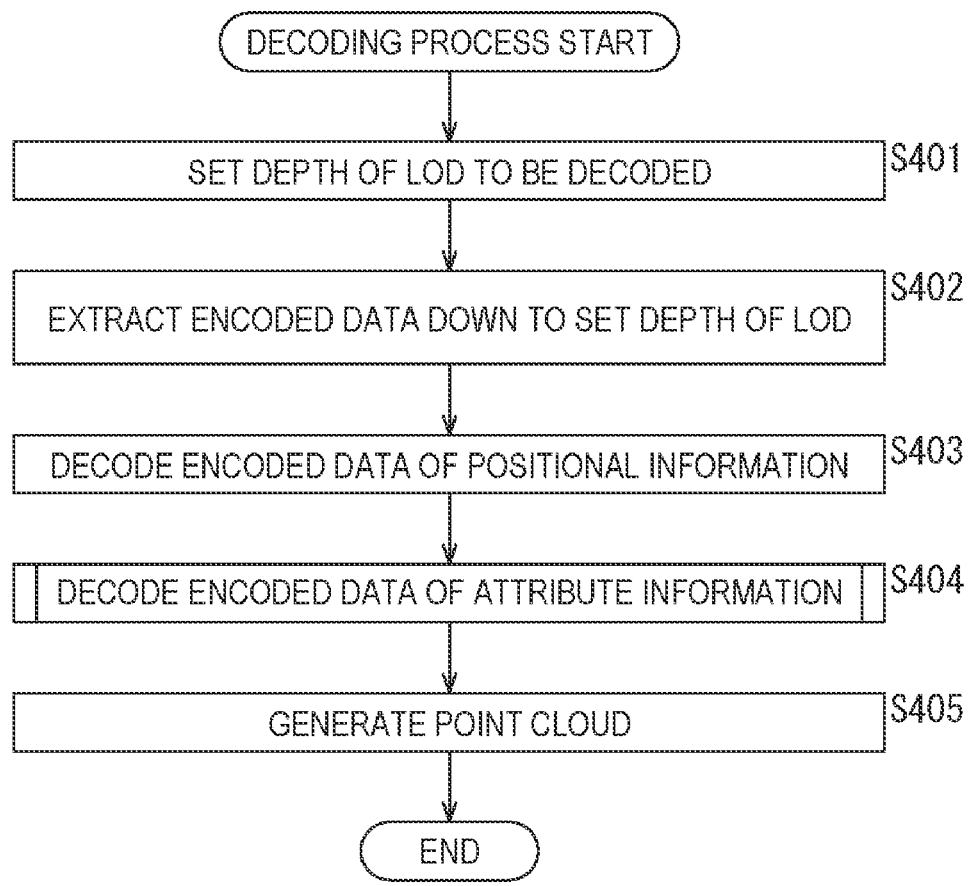
FIG. 26 is a flowchart for explaining an example flow in a decoding process.
Figure 27:
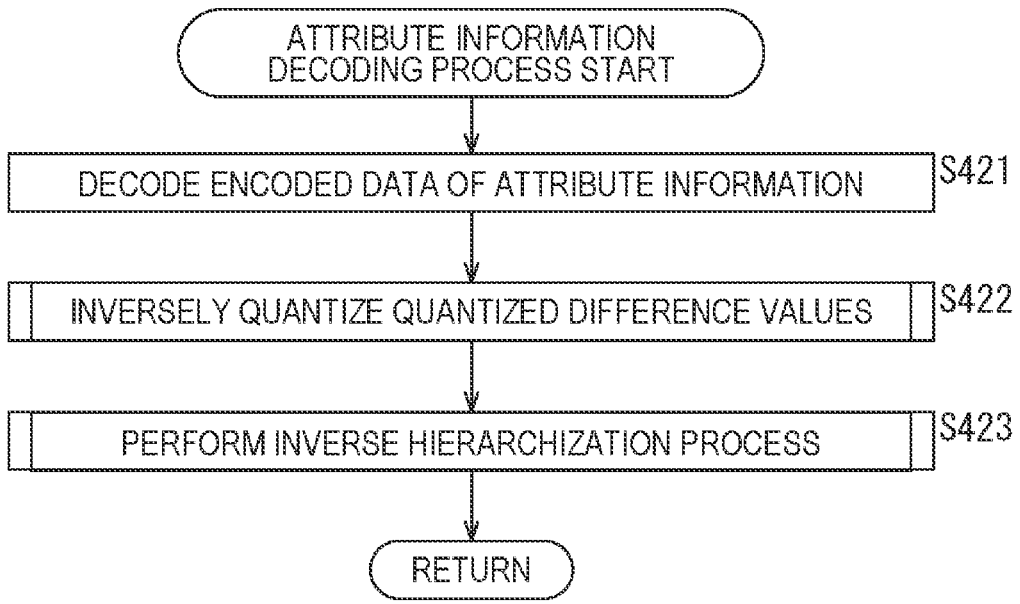
FIG. 27 is a flowchart for explaining an example flow in an attribute information decoding process.

Next, an example flow in the attribute information decoding process to be performed in step S404 in FIG. 26 is described, with reference to the flowchart shown in FIG. 27.

When the attribute information decoding process is started, the decoding unit 421 of the attribute information decoding unit 404 in step S421 decodes the encoded data of the attribute information, and generates the attribute information (decoding result). This attribute information (decoding result) has been quantized as described above.

In step S422, the inverse quantization unit 422 performs an inverse quantization process, to inversely quantize the attribute information (decoding result) generated in step S421. In doing so, the inverse quantization unit 422 adopts the present technology described above in <1. Scalable Decoding> to perform inverse quantization. The inverse quantization process will be described later in detail. Note that the inversely quantized attribute information is the difference values between the attribute information and the predicted values, as described above.

In step S423, the inverse hierarchization processing unit 423 performs an inverse hierarchization process, to inversely hierarchize the attribute information (difference values) inversely quantized in step S422, and derive the attribute information about the respective points. In doing so, the inverse hierarchization processing unit 423 adopts the present technology described above in <1. Scalable Decoding> to perform inverse hierarchization. The inverse hierarchization process will be described later in detail.

When the processing in step S423 is completed, the attribute information decoding process comes to an end, and the process returns to FIG. 26.

By performing the processing in each step as described above, the attribute information decoding unit 404 can correctly derive predicted values of the attribute information, and correctly perform inverse hierarchization on the hierarchical structure of the attribute information associated with the hierarchical structure of the positional information. By doing so, the decoding device 400 can also perform inverse quantization not depending on any lower hierarchical level. That is, the decoding device 400 can more easily perform scalable decoding of attribute information.

<Flow in an Inverse Quantization Process>

Figure 28:
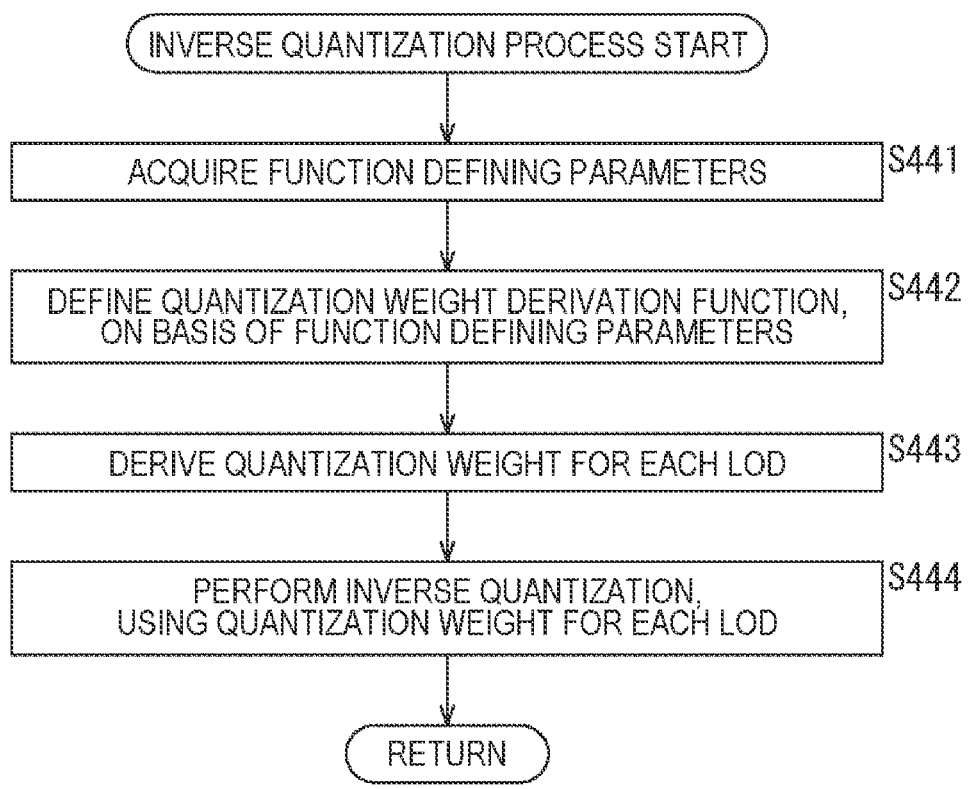
FIG. 28 is a flowchart for explaining an example flow in an inverse quantization process.

Next, an example flow in the inverse quantization process to be performed in step S422 in FIG. 27 is described, with reference to the flowchart shown in FIG. 28. A case where method 1-1-2 described in the fourth row from the top of the table shown in FIG. 12 is adopted is described herein.

When the inverse quantization process is started, the inverse quantization unit 422 in step S441 acquires the quantization weight derivation function defining parameters generated by decoding encoded data.

In step S442, the inverse quantization unit 422 defines a weight derivation function, on the basis of the function defining parameters acquired in step S441.

In step S443, the inverse quantization unit 422 derives a quantization weight for each hierarchical level (LoD), using the weight derivation function defined in step S442.

In step S444, the inverse quantization unit 422 inversely quantizes the attribute information (decoding result), using the quantization weights derived in step S443.

When the processing in step S444 is completed, the inverse quantization process comes to an end, and the process returns to FIG. 27.

By performing the inverse quantization process as described above, the inverse quantization unit 422 can perform inverse quantization not depending on any lower hierarchical level. That is, the decoding device 400 can more easily perform scalable decoding of attribute information.

<Flow in an Inverse Hierarchization Process>

Figure 29:
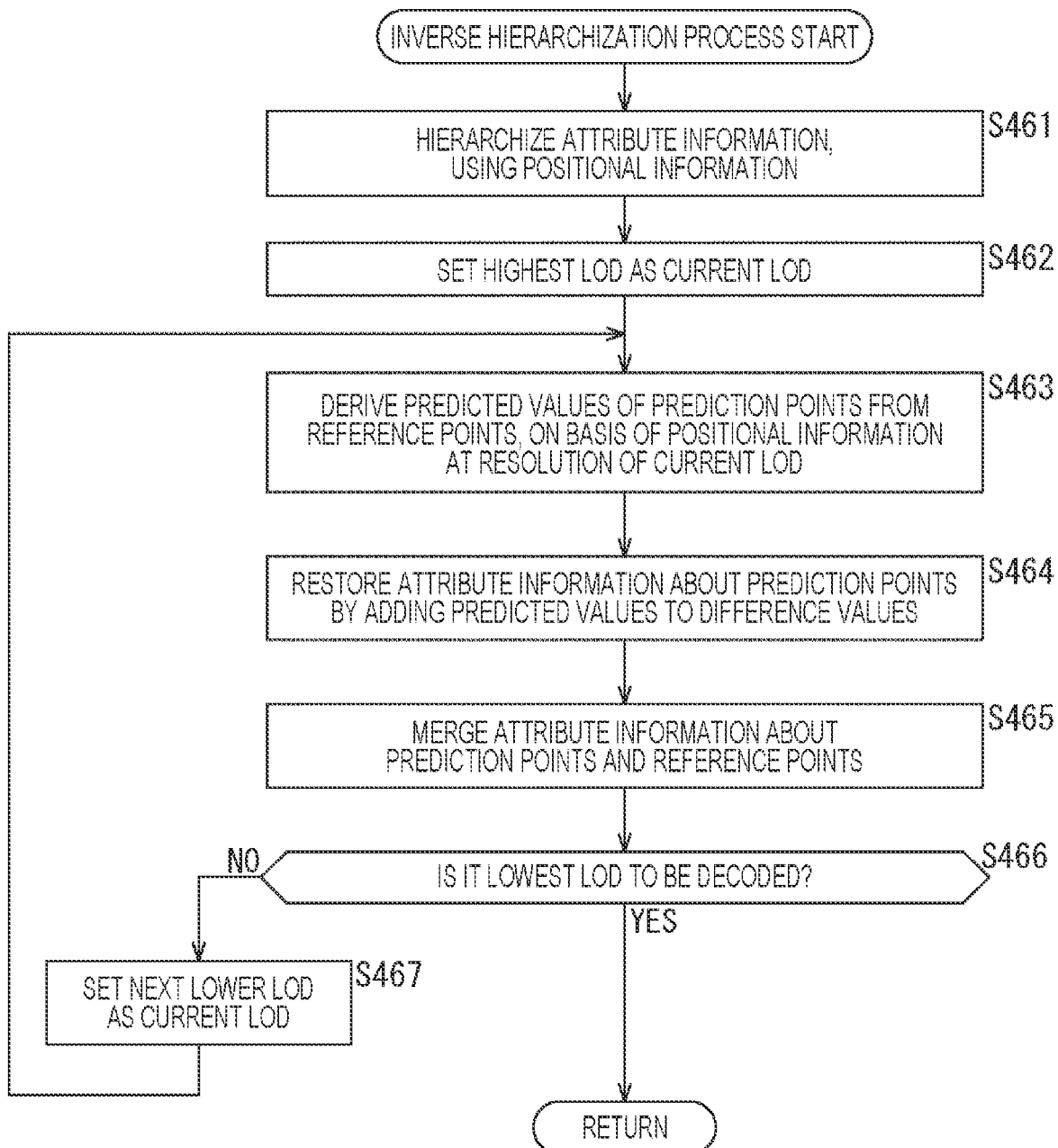
FIG. 29 is a flowchart for explaining an example flow in an inverse hierarchization process.

Next, an example flow in the inverse hierarchization process to be performed in step S423 in FIG. 27 is described, with reference to the flowchart shown in FIG. 29. A case where method 1-1 described in the second row from the top of the table shown in FIG. 6 is adopted is described herein.

When the inverse hierarchization process is started, the inverse hierarchization processing unit 423 in step S461 hierarchizes attribute information (decoding result), using positional information (decoding result). That is, the inverse hierarchization processing unit 423 performs a process similar to the hierarchization process described in the first embodiment, and associates the hierarchical structure of the attribute information with the hierarchical structure of the positional information about the hierarchical level to be decoded. As a result, the attribute information (decoding result) about the respective points is associated with the positional information (decoding result). On the basis of this correspondence relationship, the process described below is performed.

In step S462, the individual hierarchical level processing unit 441 of the inverse hierarchization processing unit 423 determines the highest hierarchical level (LoD)) to be the current hierarchical level (current LoD) that is the process target.

In step S463, the prediction unit 451 derives predicted values of the respective prediction points. That is, the prediction unit 451 derives predicted values of the attribute information about the prediction points, using the attribute information about the reference points corresponding to the respective prediction points.

For example, as explained above with reference to FIG. 4, the prediction unit 451 weights the attribute information about the respective reference points corresponding to the prediction points with quantization weights ($\alpha$ (P, Q (i, j))) corresponding to the reciprocals of the distances between the prediction points and the reference points, and integrates the attribute information by performing an arithmetic operation as shown in Expression (1) shown above. In this manner, the prediction unit 451 derives predicted values. In doing so, the prediction unit 451 derives and adopts the distances between the prediction points and the reference points, using the positional information at the resolution of the current hierarchical level (current LoD).

In step S464, the arithmetic unit 452 restores the attribute information about the prediction points by adding the predicted values derived in step S463 to the difference values of the prediction points.

In step S465, the merge processing unit 453 merges the derived attribute information about the prediction points and the attribute information about the reference points, to generate attribute information about all the points of the current hierarchical level.

In step S466, the individual hierarchical level processing unit 441 determines whether or not the current hierarchical level (current LoD) is the lowest hierarchical level. If the current hierarchical level is determined not to be the lowest hierarchical level, the process moves on to step S467.

In step S467, the individual hierarchical level processing unit 441 sets the next lower hierarchical level (LoD) as the current hierarchical level (current LoD) that is the process target. When the processing in step S467 is completed, the process returns to step S463. That is, the processing in each of steps S463 to S467 is performed for each hierarchical level.

Further, if the current hierarchical level is determined to be the lowest hierarchical level in step S466, the inverse hierarchization process comes to an end, and the process returns to FIG. 27.

By performing the processing in each step as described above, the inverse hierarchization processing unit 423 can correctly derive predicted values of the attribute information, and correctly perform inverse hierarchization on the hierarchical structure of the attribute information associated with the hierarchical structure of the positional information. That is, the decoding device 400 can more easily perform scalable decoding of attribute information.

Note that, when method 1-1' described in the third row from the top of the table shown in FIG. 6 is adopted, and when method 1-2 described in the fourth row from the top of the table shown in FIG. 6, the inverse hierarchization process is performed basically in a flow similar to that in the flowchart shown in FIG. 29. Therefore, these cases are not explained herein.

<Flow in an Inverse Quantization Process>

Figure 30:
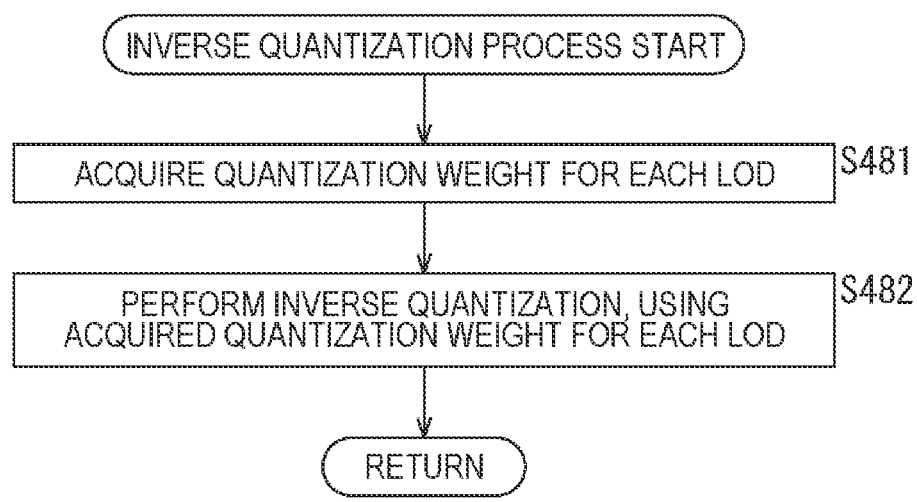
FIG. 30 is a flowchart for explaining an example flow in an inverse quantization process.

Next, an example flow in an inverse quantization process when method 1-2-2 described in the seventh row from the top of the table shown in FIG. 12 is adopted is described, with reference to the flowchart shown in FIG. 30.

When the inverse quantization process is started, the inverse quantization unit 422 in step S481 acquires the quantization weights for the respective hierarchical levels (LoDs), the quantization weights having been generated by decoding encoded data.

In step S482, the inverse quantization unit 422 inversely quantizes the attribute information (decoding result), using the quantization weights acquired in step S481.

When the processing in step S482 is completed, the inverse quantization process comes to an end, and the process returns to FIG. 27.

By performing the inverse quantization process as described above, the inverse quantization unit 422 can perform inverse quantization not depending on any lower hierarchical level. That is, the decoding device 400 can more easily perform scalable decoding of attribute information.

4. DCM

<DCM for Positional Information>

As described above, positional information is turned into an octree. In recent years, as disclosed in Non-Patent Document 6, for example, a direct coding mode (DCM) for encoding the relative distance from a node to each leaf in the node in which only a certain number of leaves (the nodes at the lowest hierarchical level in the octree, or the points at the highest resolution) or fewer exist in an octree has been suggested.

For example, in conversion of voxel data into an octree, if the process target node satisfies a predetermined condition and is determined to be sparse, this DCM is adopted to calculate and encode the relative distance from the process target node to each leaf that belongs directly or indirectly to the process target node (in each of the x, y, and z directions).

Note that a "directly belonging node" means a node that hangs from the other node in a tree structure. For example, a node that belongs directly to a process target node is a node (a so-called child node) that belongs to the process target node and is one hierarchical level lower than the process target node. Meanwhile, an "indirectly belonging node" means a node that hangs from the other node via another node in a tree structure. For example, a node that belongs indirectly to a process target node is a node (a so-called grandchild node) that belongs to the process target node via another node, and is at least two hierarchical levels lower than the process target node.

Figure 31:
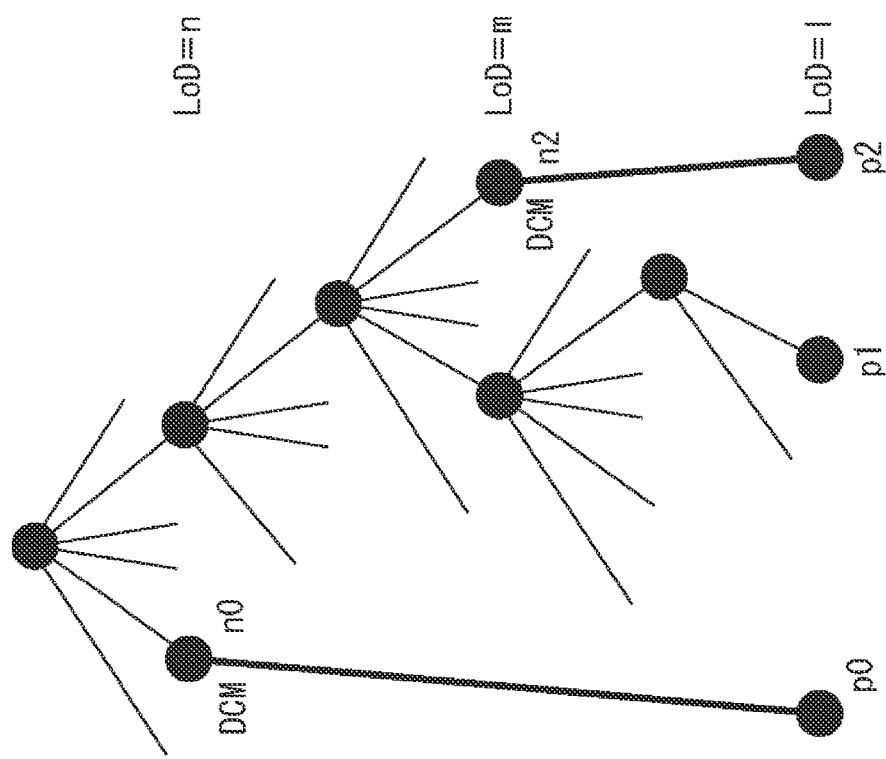
FIG. 31 is a diagram showing an example of an octree of positional information to which a DCM is applied.

For example, as shown in FIG. 31, when a node n0 (LoD=n) is determined to be sparse during conversion into an octree, a leaf p0 that belongs to (hangs from) the node n0 is identified, and the difference (in position) between the node n2 and the leaf p2 is derived. That is, encoding of positional information about the nodes at intermediate resolutions (the nodes of the hierarchical levels (LoDs) between LoD=n and LoD=1) is skipped.

Likewise, when a node n2 (LoD=m) is determined to be sparse, a leaf p2 that belongs to (hangs from) the node n2 is identified, and the difference (in position) between the node n2 and the leaf p2 is derived. That is, encoding of the positional information about the node at an intermediate resolution (the node of the hierarchical level (LoD) between LoD=m and LoD=1) is skipped.

As the DCM is adopted in this manner, generation of sparse nodes can be skipped. Thus, the increase in the process load in conversion into an octree can be reduced.

<Hierarchization of Attribute Information According to the DCM>

Figure 32:
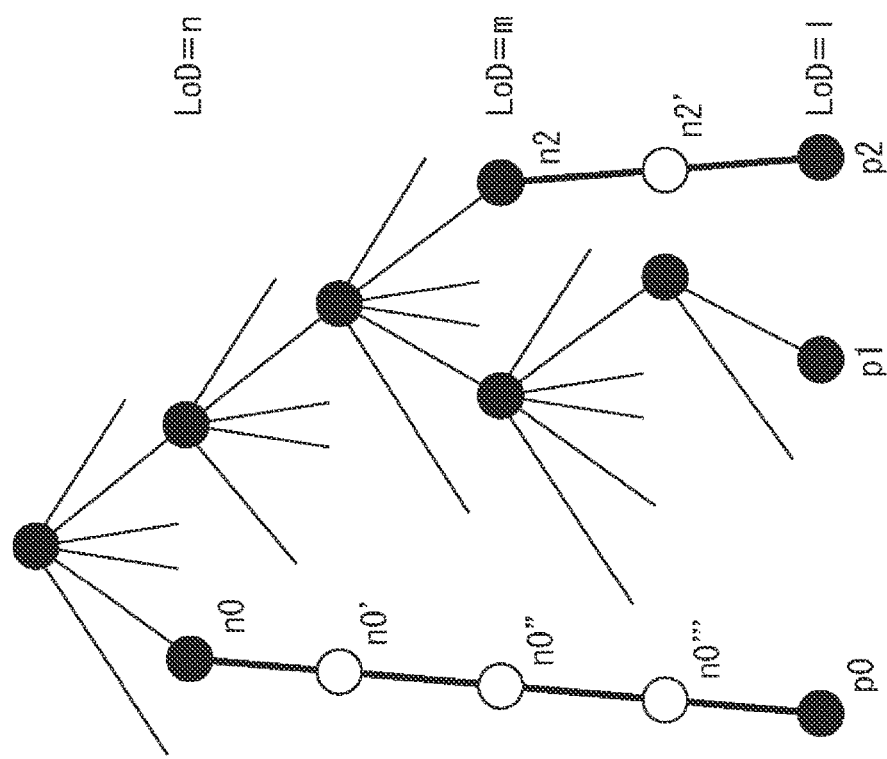
FIG. 32 is a diagram showing an example of an octree to be referred to in processing of attribute information.

Hierarchization of attribute information may be performed on the assumption that nodes at intermediate resolutions are formed in an octree of positional information as shown in FIG. 32, so that scalable decoding can also be performed on the attribute information when such a DCM is adopted. That is, encoding and decoding according to the present technology may be performed on attribute information, on the assumption that the DCM is not adopted.

In the example case shown in FIG. 32, hierarchization of attribute information is performed, on the assumption that there exist nodes at intermediate resolutions (a node n0', a node n0", and a node n0''') indicated by white circles between the node n0 and the leaf p0, and a node at an intermediate resolution (a node n2') indicated by a white circle between the node n2 and the leaf p2. That is, attribute information corresponding to these nodes is generated.

In this manner, the attribute information about the nodes whose positional information is not encoded according to DCM is also encoded. Accordingly, the attribute information about any desired hierarchical level (resolution) can be easily restored up to the highest resolution, without being decoded. That is, even when the DCM is adopted, easier scalable decoding of attribute information can be realized.

For example, in the case of the encoding device 200, the attribute information encoding unit 204 (FIG. 14) hierarchizes the attribute information into a hierarchical structure similar to the example shown in FIG. 32 with respect to the positional information having a hierarchical structure similar to the example shown in FIG. 31, and then quantizes and encodes the attribute information. That is, the hierarchization processing unit 211 (FIG. 15) generates attribute information having a hierarchical structure similar to the example shown in FIG. 32.

Further, in the case of the decoding device 400, for example, the attribute information decoding unit 404 (FIG. 23) decodes encoded data of attribute information at a desired resolution (to a desired hierarchical level). As described above, in the encoded data, the attribute information has a hierarchical structure similar to the example shown in FIG. 32. Therefore, the attribute information decoding unit 404 (the inverse hierarchization processing unit 423 (FIG. 24)) can inversely hierarchize and restore the attribute information about any desired hierarchical level, without requiring decoding up to the highest resolution.

<Node Resolution Setting 1>

Note that, when positional information is referred to during a process related to such attribute information, a node at an intermediate resolution at which positional information encoding is skipped by the DCM may be expressed by the resolution of the hierarchical level, for example.

<In the Case of Encoding>

A case where the hierarchical level LoD=m is the process target in encoding of point cloud data is now described, for example. The positional information encoding unit 201 applies the DCM to sparse nodes, generates positional information having a hierarchical structure similar to the example shown in FIG. 31, and encodes the positional information. That is, the encoded data of this positional information does not include the positional information about the node n0" of LoD=m associated with the node n0.

Figure 33:
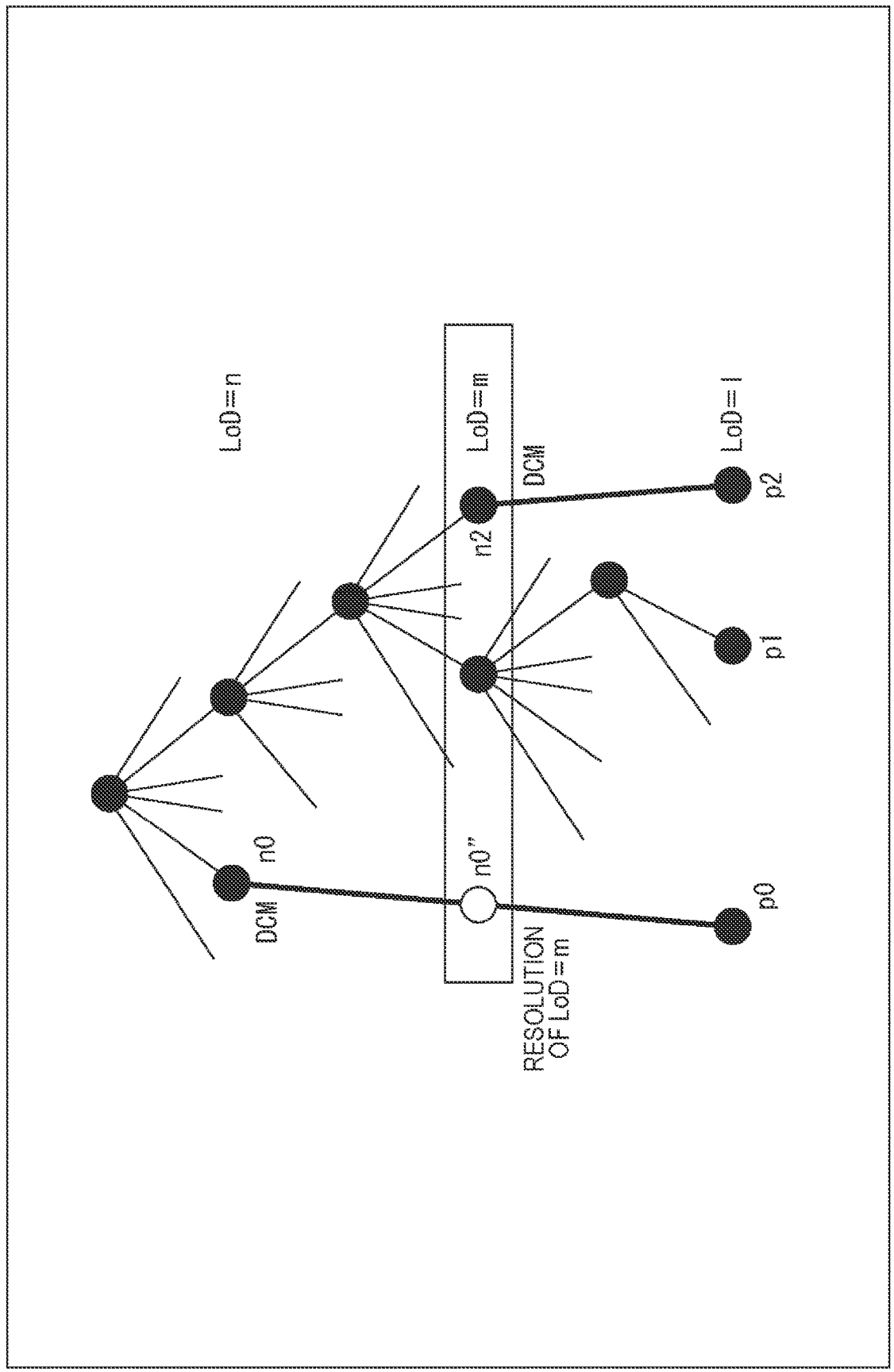
FIG. 33 is a diagram showing an example of an octree in encoding of attribute information.

On the other hand, the attribute information encoding unit 204 generates attribute information about the node n0" of LoD=m, which is associated with the node n0 but is skipped by the DCM, as in the example shown in FIG. 33. In doing so, the attribute information encoding unit 204 (the hierarchization processing unit 211) expresses the node n0" with the resolution of the hierarchical level (LoD=m). That is, the attribute information encoding unit 204 (the hierarchization processing unit 211) generates the attribute information corresponding to the node n0" at the resolution of the hierarchical level (LoD=m).

In that case, the method for generating the attribute information corresponding to the node n0" at the resolution of the hierarchical level (LoD=m) may be any appropriate method. For example, the attribute information corresponding to the node n0 or the leaf p0 may be used to generate the attribute information corresponding to the node n0". In that case, the attribute information about the node n0 or the leaf p0 may be converted in accordance with the difference in resolution between the node n0 or the leaf p0 and the node n0", for example, to generate the attribute information corresponding to the node n0".

Alternatively, for example, the attribute information about a node located in the vicinity may be used to generate the attribute information corresponding to the node n0".

By doing so, the encoding device 200 can encode the attribute information corresponding to the node n0" at the resolution of the hierarchical level (LoD=m).

<In the Case of Decoding>

Next, a case where the hierarchical level LoD=m is the process target in decoding of encoded data of point cloud data is described. The encoded data of the attribute information encoded in the above manner includes the attribute information corresponding to the node n0" at the resolution of the hierarchical level (LoD=m). Accordingly, the attribute information decoding unit 404 can easily restore the attribute information corresponding to the node n0" at the resolution of the hierarchical level (LoD=m) by decoding the encoded data of the attribute information up to the hierarchical level (LoD=m).

That is, the decoding device 400 can more easily decode attribute information in a scalable manner, even when the DCM is adopted.

Figure 34:
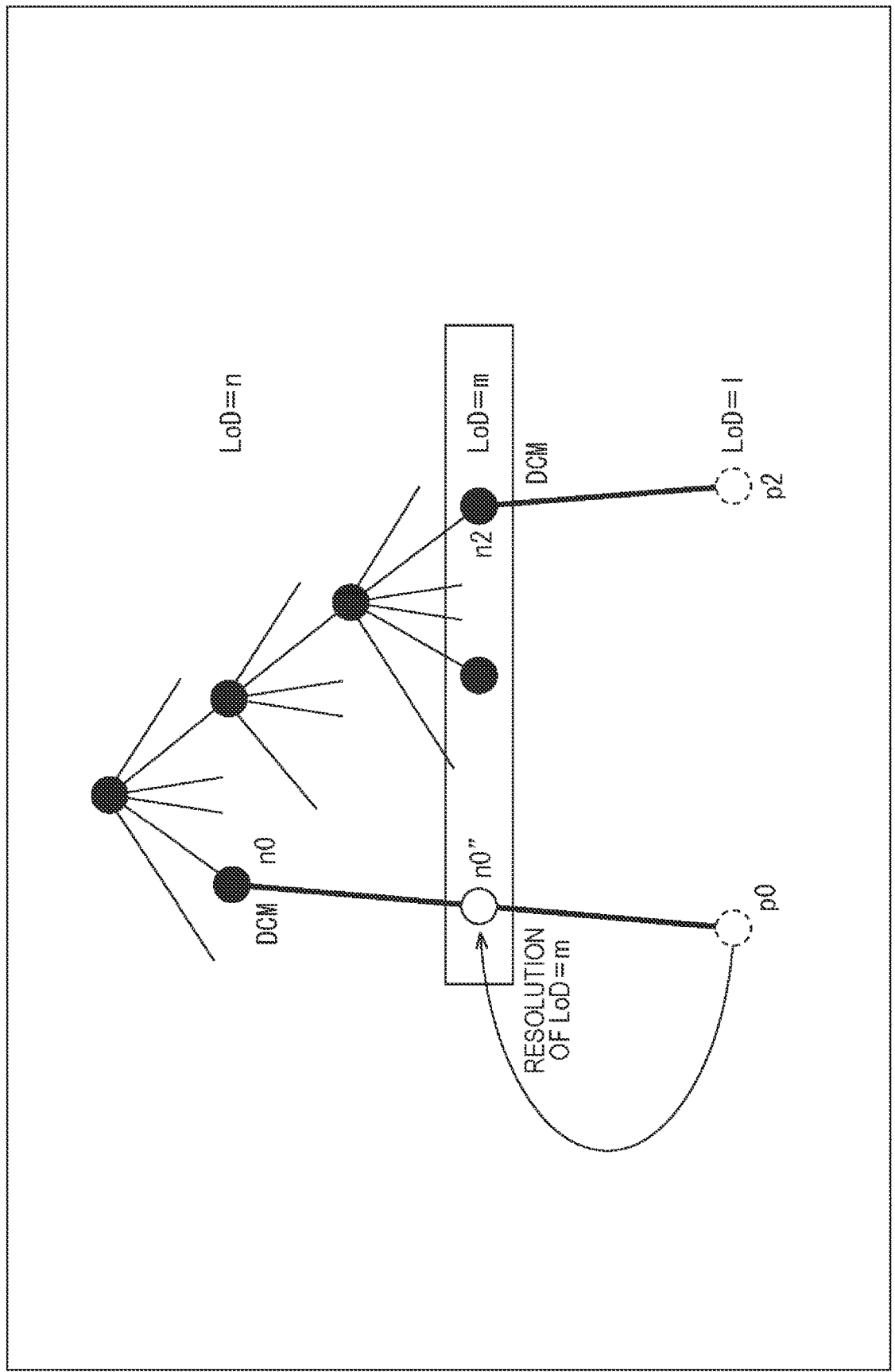
FIG. 34 is a diagram showing an example of an octree in decoding of attribute information.

Note that, as for positional information, the positional information corresponding to the node n0" of the hierarchical level (LoD=m) is not encoded. Therefore, the positional information decoding unit 403 may generate the positional information corresponding to the node n0" at the resolution of the hierarchical level (LoD=m), by restoring the positional information corresponding to the leaf p0 and converting the resolution from the final resolution (the highest resolution) to the resolution of the hierarchical level (LoD=m), as in an example shown in FIG. 34.

<Node Resolution Setting 2>

Also, a node at an intermediate resolution at which encoding of the positional information is skipped by the DCM may be expressed with the highest resolution (which is the resolution of the leaf (LoD=1)), for example.

<In the Case of Encoding>

Figure 35:
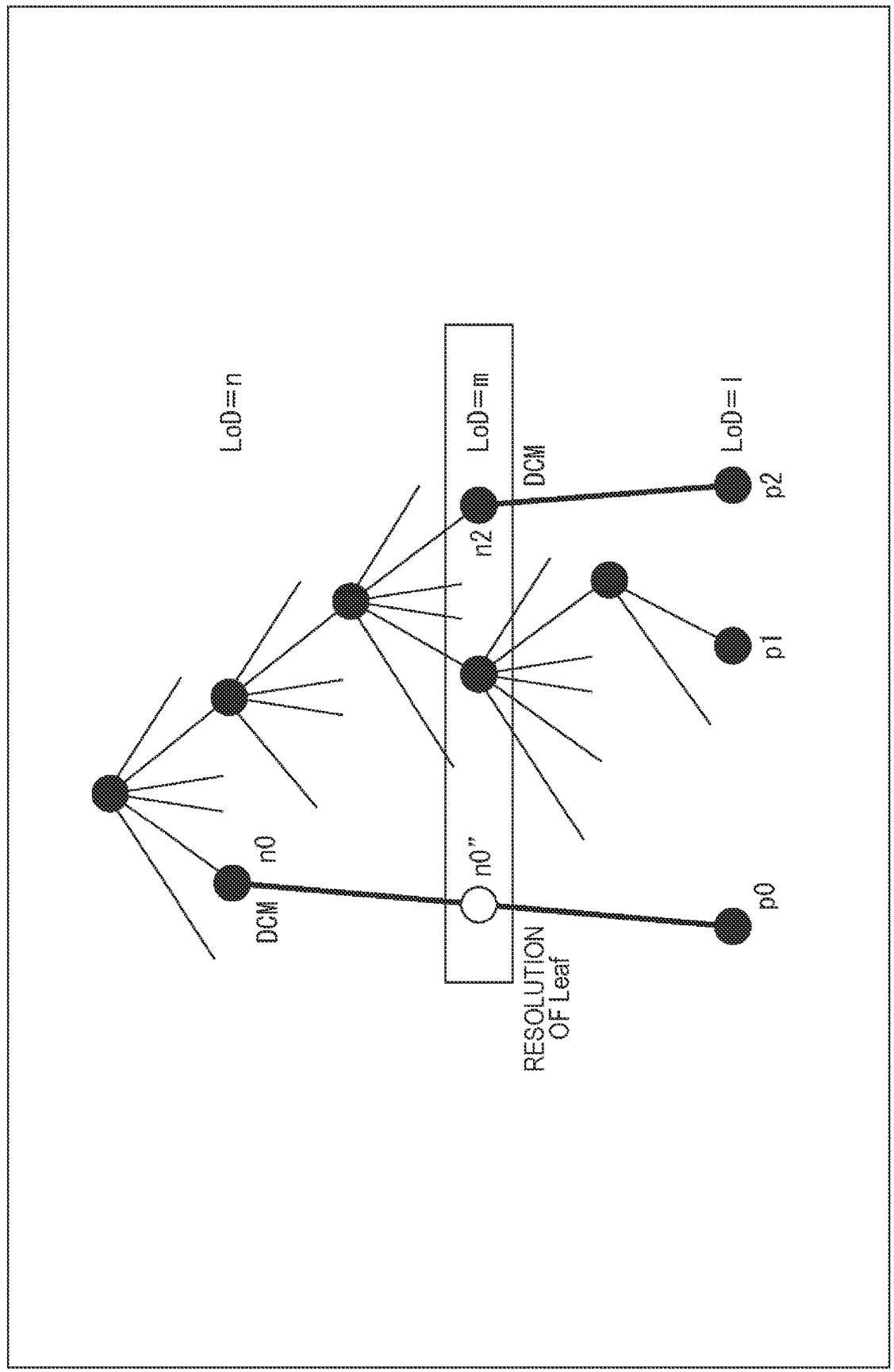
FIG. 35 is a diagram showing an example of an octree in encoding of attribute information.

A case where the hierarchical level LoD=m is the process target in encoding of point cloud data is now described, for example. In this case, the attribute information encoding unit 204 generates attribute information about the node n0" of LoD=m, which is associated with the node n0 but is skipped by the DCM, as in an example shown in FIG. 35. In doing so, the attribute information encoding unit 204 (the hierarchization processing unit 211) expresses the node n0" with the resolution of the leaf (LoD=1). That is, the attribute information encoding unit 204 (the hierarchization processing unit 211) generates the attribute information corresponding to the node n0" at the resolution of the leaf (LoD=1) (that is, the same attribute information as the attribute information corresponding to the leaf p0).

By doing so, the encoding device 200 can encode the attribute information corresponding to the node n0" at the resolution of the leaf (LoD=1).

<In the Case of Decoding>

Next, a case where the hierarchical level LoD=m is the process target in decoding of encoded data of point cloud data is described. The encoded data of the attribute information encoded in the above manner includes the attribute information corresponding to the node n0" at the resolution of the leaf (LoD=1). Accordingly, the attribute information decoding unit 404 can easily restore the attribute information corresponding to the node n0" at the resolution of the leaf (LoD=1) by decoding the encoded data of the attribute information up to the hierarchical level (LoD=m).

That is, the decoding device 400 can more easily decode attribute information in a scalable manner, even when the DCM is adopted.

Figure 36:
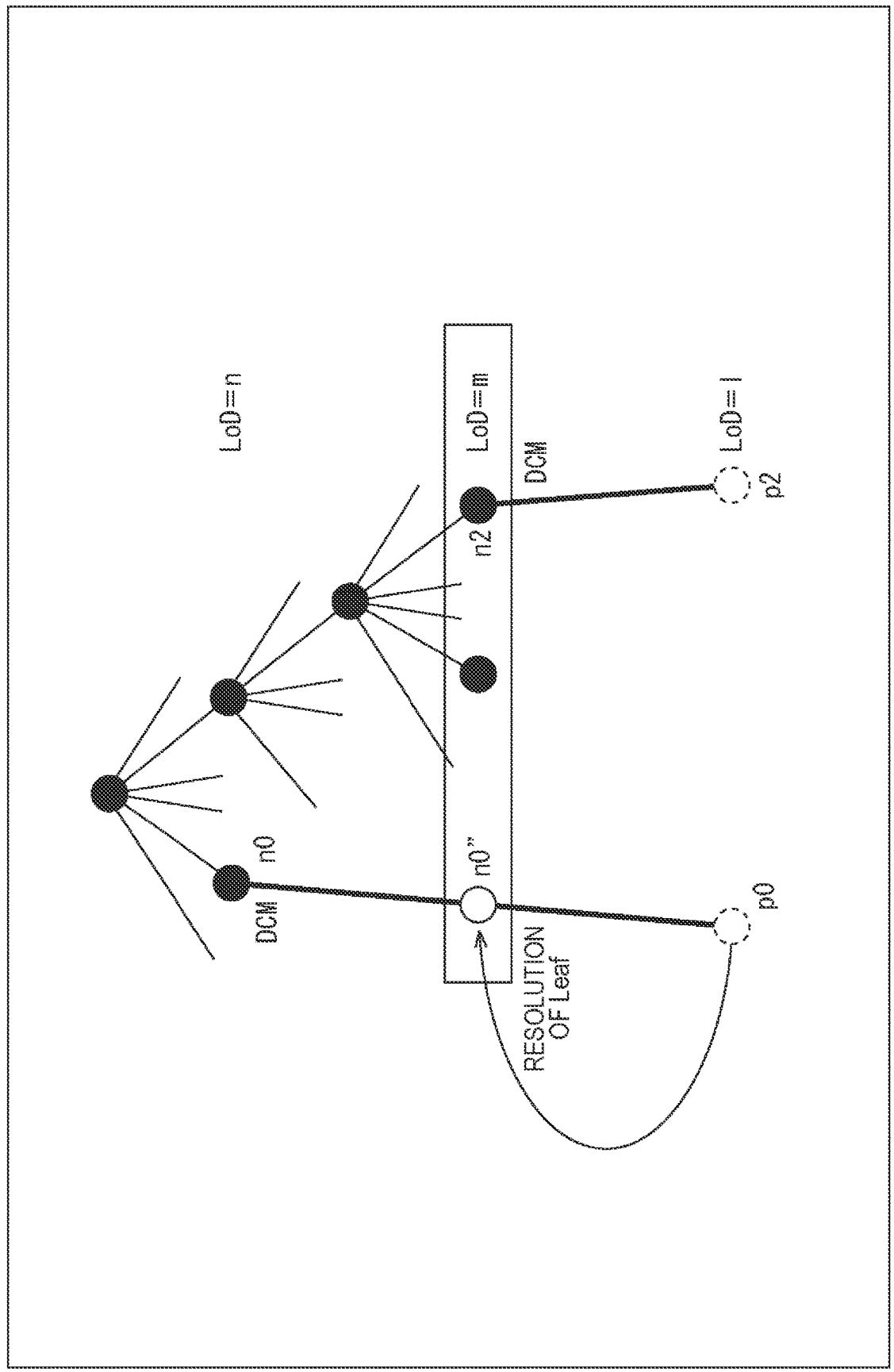
FIG. 36 is a diagram showing an example of an octree in decoding of attribute information.

Note that, as for positional information, the node n0" of the hierarchical level (LoD=m) is not encoded. Therefore, the positional information decoding unit 403 may restore the positional information corresponding to the leaf p0, and use the restored positional information as the positional information corresponding to the node n0" at the resolution of the leaf (LoD=1), as in an example shown in FIG. 36.

5. Quantization Weights

<Example 1 of a Quantization Weight Derivation Function>

In <1. Scalable Decoding>, examples of quantization weights have been described with reference to FIG. 12 and others. For example, in <Quantization Weights: Method 1-1-1>, an example of quantization weight derivation using a predetermined quantization weight derivation function has been described. This quantization weight derivation function for deriving quantization weights may be any appropriate function, and may be a function like Expression (11) and Expression (12) shown in A of FIG. 37, for example. Expression (11) and Expression (12) are also shown below.

[Mathematical Formula 3]

$$\text{for } i = 0 \text{ to } i - LoDCount \quad (11)$$
$$QuantizationWeight[i] =$$
$$\frac{\text{point Count}}{predictiorCount[i]} = \frac{\sum_{k=0}^{LoDCount} predictorCount[k]}{predictorCount[i]}$$

[Mathematical Formula 4]

$$\text{if } (i == LoDCount) \quad (12)$$
$$QuantizationWeight[i] = 1$$

In Expression (11) and Expression (12), LoDCount represents the lowest hierarchical level (the highest-resolution hierarchical level) of the hierarchical structure of attribute information. Further, QuantizationWeight [i] represents the quantization weight for the hierarchical level i (the (i−1)th hierarchical level from the highest hierarchical level (the lowest-resolution hierarchical level)) in this hierarchical structure (this quantization weight is a value set for each hierarchical level). In Expressions, pointCount represents the total number of nodes, which is the total number of points, in this hierarchical structure. Further, predictorCount [i] represents the number of prediction points of the hierarchical level i, which is the number of points at which predicted values are derived at the hierarchical level i. The integrated value (the numerator on the rightmost side of Expression (11)) of the number of prediction points of the respective hierarchical levels from the hierarchical level 0 (the highest hierarchical level) to the hierarchical level LoDCount (the lowest hierarchical level) indicates the total number (pointCount) of points.

As shown in Expression (11), the ratio between the total number of points and the number of prediction points of the hierarchical level i is set in the quantization weight (QuantizationWeight [i]) for the hierarchical level i in this case. However, as shown in Expression (12), in the case of the lowest hierarchical level (i==LoDCount), "1" is set in the quantization weight (QuantizationWeight [i]).

By deriving the quantization weight (QuantizationWeight [i]) with the use of such a quantization weight derivation function, the encoding device 200 and the decoding device 400 can derive quantization weights independently of any lower hierarchical level. Accordingly, quantization and inverse quantization not depending on any lower hierarchical level can be performed, as described above in <Quantization Weights: Method 1>. That is, because it is not necessary to refer to information about any lower hierarchical level as described above, the encoding device 200 and the decoding device 400 can more easily realize scalable decoding.

Further, using this quantization weight derivation function (Expression (11) and Expression (12)), the encoding device 200 and the decoding device 400 can derive quantization weights so that a higher hierarchical level has a greater quantization weight. Thus, the decrease in accuracy of encoding and decoding can be reduced.

Note that, as described above in <Quantization Weights: Method 1-1-1>, the encoding device 200 and the decoding device 400 may share this quantization weight derivation function (Expression (11) and Expression (12)) in advance. By doing so, the encoding device 200 and the decoding device 400 can derive the same quantization weights from each other. Further, there is no need to transmit information for sharing this quantization weight derivation function, it is possible to reduce the decrease in encoding efficiency and the increase in the load of the encoding process and the decoding process.

Also, as described above in <Quantization Weights: Method 1-1-2>, the encoding device 200 may define this quantization weight derivation function (Expression (11) and Expression (12)) at the time of encoding. In that case, the encoding device 200 may transmit, to the decoding device 400, the defined quantization weight derivation function or the parameters (the quantization weight derivation function defining parameters) from which the decoding device 400 can derive the quantization weight derivation function.

For example, the encoding device 200 may transmit, to the decoding device 400, such a quantization weight derivation function or such quantization weight derivation function defining parameters included in a bitstream that includes encoded data of the point cloud.

For example, in the quantization process described above with reference to the flowchart shown in FIG. 20, the quantization unit 212 defines the above Expression (11) and Expression (12) as the quantization weight derivation function (step S271). The quantization unit 212 then derives the quantization weights for the respective hierarchical levels (LoDs), using the quantization weight derivation function (step S272). The quantization unit 212 then quantizes the difference values of the attribute information, using the derived quantization weights for the respective LoDs (step S273). The quantization unit 212 then supplies the quantization weight derivation function or the quantization weight derivation function defining parameters to the encoding unit 213, and causes the encoding unit 213 to perform encoding (step S274). That is, the quantization unit 212 transmits the quantization weight derivation function or the quantization weight derivation function defining parameters to the decoding side.

Note that, the encoding device 200 may transmit, to the decoding device 400, the quantization weight derivation function or the quantization weight derivation function defining parameters as data or a file independent of the bitstream including the encoded data of the point cloud.

As such a quantization weight derivation function or parameters are transmitted from the encoding device 200 to the decoding device 400 in the above manner, the encoding device 200 and the decoding device 400 can share the quantization weight derivation function (Expression (11) and Expression (12)). Thus, the encoding device 200 and the decoding device 400 can derive the same quantization weights from each other.

Also, as described above in <Quantization Weights: Method 1-2>, the encoding device 200 and the decoding device 400 may share quantization weights (QuantizationWeight [i]) derived with the use of the quantization weight derivation function (Expression (11) and Expression (12)). For example, as described above in <Quantization Weights: Method 1-2-2>, the encoding device 200 may derive quantization weights using the quantization weight derivation function at the time of encoding, and transmit the quantization weights to the decoding device 400.

For example, the encoding device 200 may transmit, to the decoding device 400, such quantization weights included in a bitstream that includes encoded data of the point cloud.

For example, in the quantization process described above with reference to the flowchart shown in FIG. 22, the quantization unit 212 derives quantization weights for the respective hierarchical levels (LoDs), using the above quantization weight derivation function (Expression (11) and Expression (12)) (step S321). The quantization unit 212 then quantizes the difference values of the attribute information, using the derived quantization weights for the respective LoDs (step S322). The quantization unit 212 then supplies the encoding unit 213 with the quantization weights used in the quantization, and causes the encoding unit 213 to perform encoding (step S323). That is, the quantization unit 212 has the quantization weights transmitted to the decoding side.

Note that, the encoding device 200 may transmit, to the decoding device 400, the quantization weights as data or a file independent of the bitstream including the encoded data of the point cloud.

As quantization weights are transmitted from the encoding device 200 to the decoding device 400 in the above manner, the encoding device 200 and the decoding device 400 can share the quantization weights.

Accordingly, the encoding device 200 and the decoding device 400 can easily derive quantization weights independently of any lower hierarchical level. Thus, the encoding device 200 and the decoding device 400 can more easily realize scalable decoding. Further, as the decoding device 400 does not need to derive quantization weights using a quantization weight derivation function, the increase in the load of the decoding process can be reduced.

<Example 2 of a Quantization Weight Derivation Function>

A quantization weight derivation function may be a function like Expression (13) shown in B of FIG. 37, for example. Expression (13) is also shown below.

[Mathematical Formula 5]

$$\text{QuantizationWeight}[i] = \frac{\sum_{k=0}^{LoDCount} predictorCount[k]}{predictorCount[i]} \quad \text{for } i = 0 \text{ to } i - LoDCount \quad (13)$$

In Expression (13), LoDCount represents the lowest hierarchical level of the hierarchical structure of attribute information, as in the case of Expression (11) and Expression (12). Also, QuantizationWeight [i] represents the quantization weight for the hierarchical level i in this hierarchical structure. Further, predictorCount [i] represents the number of prediction points of the hierarchical level i, which is the number of points at which predicted values are derived at the hierarchical level i. The integrated value (the numerator on the rightmost side of Expression (11)) of the number of prediction points of the respective hierarchical levels from the hierarchical level i (the process target hierarchical level) to the hierarchical level LoDCount (the lowest hierarchical level) indicates the number of points below the hierarchical level i.

As shown in Expression (13), the ratio between the number of points below the hierarchical level i and the number of prediction points of the hierarchical level i is set in the quantization weight (QuantizationWeight [i]) for the hierarchical level i in this case.

When the quantization weight derivation function of Expression (13) is adopted, the encoding device 200 and the decoding device 400 can derive quantization weights independently of any lower hierarchical level, as when the quantization weight derivation function of Expression (11) and Expression (12) is adopted. Accordingly, quantization and inverse quantization not depending on any lower hierarchical level can be performed, as described above in <Quantization Weights: Method 1>. That is, because it is not necessary to refer to information about any lower hierarchical level as described above, the encoding device 200 and the decoding device 400 can more easily realize scalable decoding.

Further, when the quantization weight derivation function of Expression (13) is adopted, the encoding device 200 and the decoding device 400 can derive quantization weights so that a higher hierarchical level has a greater quantization weight, as when the quantization weight derivation function of Expression (11) and Expression (12) is adopted. Thus, the decrease in accuracy of encoding and decoding can be reduced.

The value of a quantization weight (QuantizationWeight [i]) is set on the basis of the concept that a point that is more frequently referred to by other points is more important (having a greater effect on subjective image quality), as shown in FIG. 5. Further, in general, a prediction point of a higher hierarchical level is likely to be more frequently referred to by other points. Therefore, a greater quantization weight is set for a prediction point of a higher hierarchical level. As described above with reference to FIG. 12, when quantization weights are set for the respective hierarchical levels (LoDs), a greater quantization weight is set for a higher hierarchical level, on the basis of the concept.

In the case of a point cloud in which points are sufficiently dense, or when there basically exist other points in the vicinity of each point, the number of points normally increases with increase in resolution. Typically, the degree of increase in the number of points is high enough, and the number of prediction points (predictorCount [i]) increases monotonically in the direction toward the lowest hierarchical level. Therefore, regardless of whether the quantization weight derivation function of Expression (11) and Expression (12) is adopted, or whether the quantization weight derivation function of Expression (13) is adopted, the quantization weight (QuantizationWeight [i]) for the hierarchical level i tends to be greater at a higher hierarchical level.

On the other hand, in the case of a point cloud with sparse points, or when there is only a low possibility that other points exist in the vicinity of each point, the number of points normally does not increase greatly with increase in resolution. Typically, there is a possibility that a large proportion of points is assigned as prediction points at the higher hierarchical levels in the hierarchical structure, and the number of prediction points is smaller at a lower hierarchical level.

When the quantization weight derivation function of Expression (11) and Expression (12) is adopted, the greater the quantization weight (QuantizationWeight [i]) for the hierarchical level i, the smaller the number (predictorCount [i]) of prediction points of the hierarchical level. Therefore, there typically is a possibility that a higher hierarchical level having a larger proportion of points assigned as prediction points has a smaller quantization weight than a lower hierarchical level. That is, the correspondence relationship between the quantization weight and the number of times the prediction points are referred to might be weakened, and degradation of subjective image quality due to quantization might increase.

On the other hand, the number of points below the hierarchical level i increases monotonically in the direction toward the highest hierarchical level. Therefore, when the quantization weight derivation function of Expression (13) is adopted, the quantization weight (QuantizationWeight [i]) for the hierarchical level i is likely to be greater at a higher hierarchical level. That is, it is easy to maintain the tendency that a greater quantization weight is set for a prediction point (of a higher hierarchical level) that is frequently referred to by other points. Accordingly, degradation of subjective image quality due to quantization can be made smaller than when the weight derivation function of Expression (11) and Expression (12) is adopted.

Note that, as described above in <Quantization Weights: Method 1-1-1>, the encoding device 200 and the decoding device 400 may share this quantization weight derivation function (Expression (13)) in advance. By doing so, the encoding device 200 and the decoding device 400 can derive the same quantization weights from each other. Further, there is no need to transmit information for sharing this quantization weight derivation function, it is possible to reduce the decrease in encoding efficiency and the increase in the load of the encoding process and the decoding process.

Also, as described above in <Quantization Weights: Method 1-1-2>, the encoding device 200 may define this quantization weight derivation function (Expression (13)) at the time of encoding. In that case, the encoding device 200 may transmit, to the decoding device 400, the defined quantization weight derivation function or the parameters (the quantization weight derivation function defining parameters) from which the decoding device 400 can derive the quantization weight derivation function.

For example, the encoding device 200 may transmit, to the decoding device 400, such a quantization weight derivation function or such quantization weight derivation function defining parameters included in a bitstream that includes encoded data of the point cloud.

For example, in the quantization process described above with reference to the flowchart shown in FIG. 20, the quantization unit 212 defines the above Expression (13) as the quantization weight derivation function (step S271). The quantization unit 212 then derives the quantization weights for the respective hierarchical levels (LoDs), using the quantization weight derivation function (step S272). The quantization unit 212 then quantizes the difference values of the attribute information, using the derived quantization weights for the respective LoDs (step S273). The quantization unit 212 then supplies the quantization weight derivation function or the quantization weight derivation function defining parameters to the encoding unit 213, and causes the encoding unit 213 to perform encoding (step S274). That is, the quantization unit 212 transmits the quantization weight derivation function or the quantization weight derivation function defining parameters to the decoding side.

Note that, the encoding device 200 may transmit, to the decoding device 400, the quantization weight derivation function or the quantization weight derivation function defining parameters as data or a file independent of the bitstream including the encoded data of the point cloud.

As such a quantization weight derivation function or parameters are transmitted from the encoding device 200 to the decoding device 400 in the above manner, the encoding device 200 and the decoding device 400 can share the quantization weight derivation function (Expression (13)). Thus, the encoding device 200 and the decoding device 400 can derive the same quantization weights from each other.

Also, as described above in <Quantization Weights: Method 1-2>, the encoding device 200 and the decoding device 400 may share quantization weights (QuantizationWeight [i]) derived with the use of the quantization weight derivation function (Expression (13)). For example, as described above in <Quantization Weights: Method 1-2-2>, the encoding device 200 may derive quantization weights using the quantization weight derivation function at the time of encoding, and transmit the quantization weights to the decoding device 400.

For example, the encoding device 200 may transmit, to the decoding device 400, such quantization weights included in a bitstream that includes encoded data of the point cloud.

For example, in the quantization process described above with reference to the flowchart shown in FIG. 22, the quantization unit 212 derives quantization weights for the respective hierarchical levels (LoDs), using the above quantization weight derivation function (Expression (13)) (step S321). The quantization unit 212 then quantizes the difference values of the attribute information, using the derived quantization weights for the respective LoDs (step S322). The quantization unit 212 then supplies the encoding unit 213 with the quantization weights used in the quantization, and causes the encoding unit 213 to perform encoding (step S323). That is, the quantization unit 212 has the quantization weights transmitted to the decoding side.

Note that, the encoding device 200 may transmit, to the decoding device 400, the quantization weights as data or a file independent of the bitstream including the encoded data of the point cloud.

As such quantization weights are transmitted from the encoding device 200 to the decoding device 400 in the above manner, the encoding device 200 and the decoding device 400 can share the quantization weights.

Accordingly, the encoding device 200 and the decoding device 400 can easily derive quantization weights independently of any lower hierarchical level. Thus, the encoding device 200 and the decoding device 400 can more easily realize scalable decoding. Further, as the decoding device 400 does not need to derive quantization weights using a quantization weight derivation function, the increase in the load of the decoding process can be reduced.

6. LoD Generation

<LoD Generation During Decoding of Positional Information>

As described above with reference to FIG. 6 and others in <1. Scalable Decoding>, attribute information is hierarchized to have a hierarchized structure similar to the hierarchical structure of the positional information. Thus, scalable decoding of the attribute information can be performed. Prediction points (in other words, reference points) of each hierarchical level are then selected, so that the hierarchical structure of the attribute information is set. Such a process of setting a hierarchical structure is called a LoD generation process or a subsampling process.

As described above in <2. First Embodiment> and <3. Second Embodiment>, this LoD generation process is performed at the time of encoding/decoding of attribute information. In the case of the encoding device 200, for example, the point classification unit 231 of the attribute information encoding unit 204 performs this LoD generation process (step S242). Also, in the case of the decoding device 400, the inverse hierarchization processing unit 423 of the attribute information decoding unit 404 performs this LoD generation process (step S461).

In an example other than this example, the LoD generation process may be performed at the time of decoding of the encoded data of the positional information, for example. As the encoded data of the positional information is decoded, the hierarchical structure of the positional information (which point belongs to which hierarchical level) becomes clear. Therefore, in the LoD generation process, information indicating this hierarchical structure of the positional information is generated. On the basis of the information, the attribute information is then hierarchized or inversely hierarchized so as to be associated with the hierarchical structure of the positional information. As the above process is performed, the hierarchical structure of the positional information can be applied to the attribute information.

Such hierarchization and inverse hierarchization is then applied to encoding and decoding of the attribute information. That is, encoding and decoding are performed, with the hierarchical structure of the attribute information being associated with hierarchical structure of the positional information. As a result, scalable decoding of attribute information can be performed. Further, redundant processing can be reduced, and the increase in the load of the attribute information encoding/decoding process can be reduced.

Note that, in the case of the encoding device 200, this LoD generation process may be performed at the time of encoding of the positional information.

<Example of a LoD Generation Process>

Figure 38:
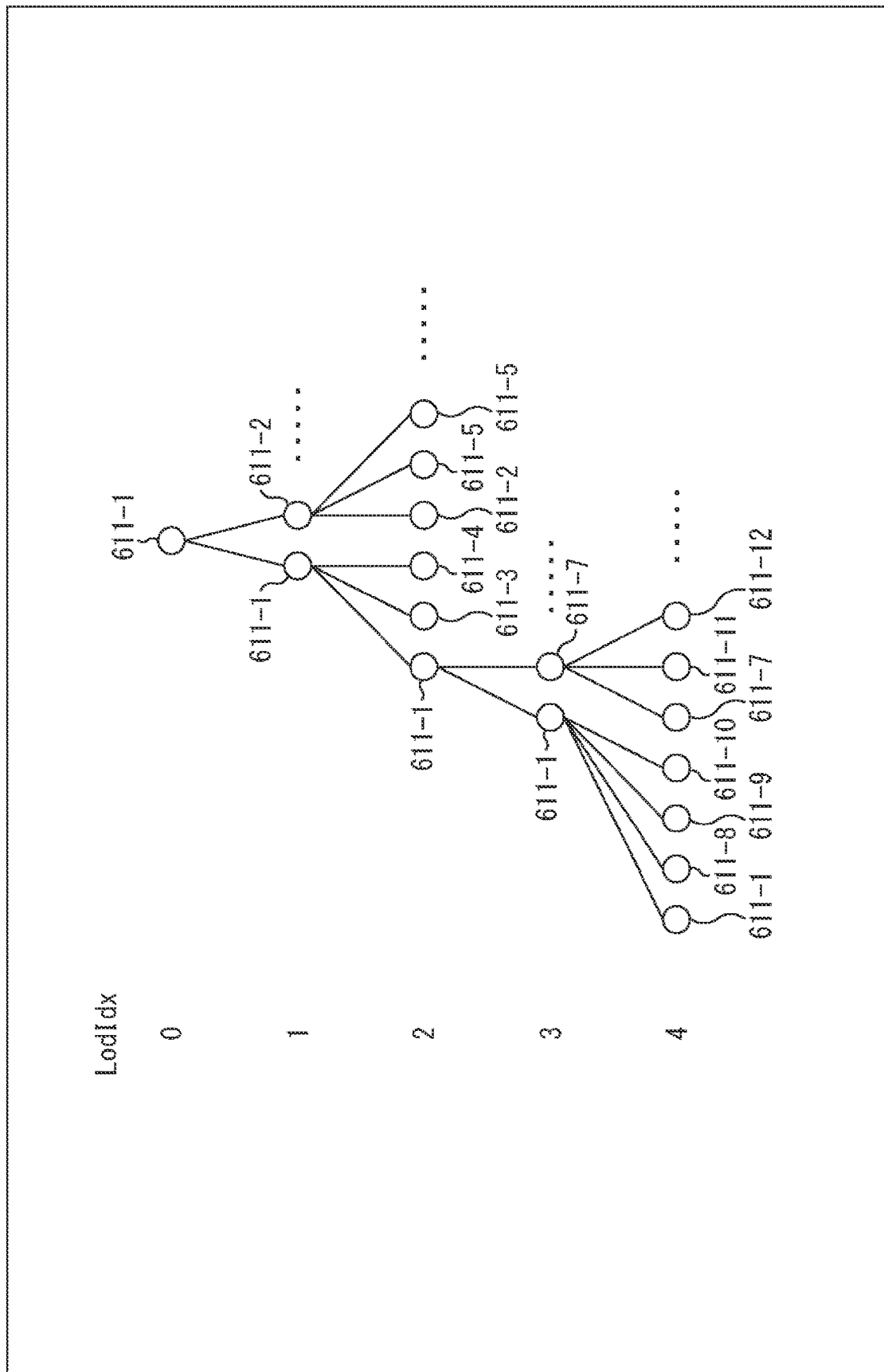
FIG. 38 is a diagram showing an example of the hierarchical structure of positional information.

Such a LoD generation process is now described. As the encoded data of the positional information is decoded, the hierarchical structure of an octree or the like is restored, for example. FIG. 38 shows an example of the hierarchical structure of the restored positional information. Nodes 611 indicated by circles in this hierarchical structure represent hierarchized points. Note that FIG. 38 shows only part of the hierarchical structure (some of the nodes 611). Although nodes 611-1 to 611-12 are shown in FIG. 38, they are referred to as nodes 611 when there is no need to distinguish the nodes from one another.

The positional information is decoded for each hierarchical level in the direction from the highest hierarchical level (LoDIdx=0) to the lowest hierarchical level. In the example case illustrated in FIG. 38, the node 611-1 appears at the highest hierarchical level (LoDIdx=0). At the next lower hierarchical level (LoDIdx=1), the point corresponding to the node 611-1 is divided as the resolution increases, and a new node 611-2 appears. At the next lower hierarchical level (LoDIdx=2), the point corresponding to the node 611-1 is divided, so that new nodes 611-3 and 611-4 appear. The point corresponding to the node 611-2 is divided, so that new nodes 611-5 to 611-7 appear.

At the next lower hierarchical level (LoDIdx=3), the point corresponding to the node 611-1 is divided, so that a new node 611-7 appears. At the next lower hierarchical level (LoDIdx=4), the point corresponding to the node 611-1 is divided, so that new nodes 611-8 to 611-10 appear. The point corresponding to the node 611-7 is divided, so that new nodes 611-11 and 611-12 appear.

Figure 39:
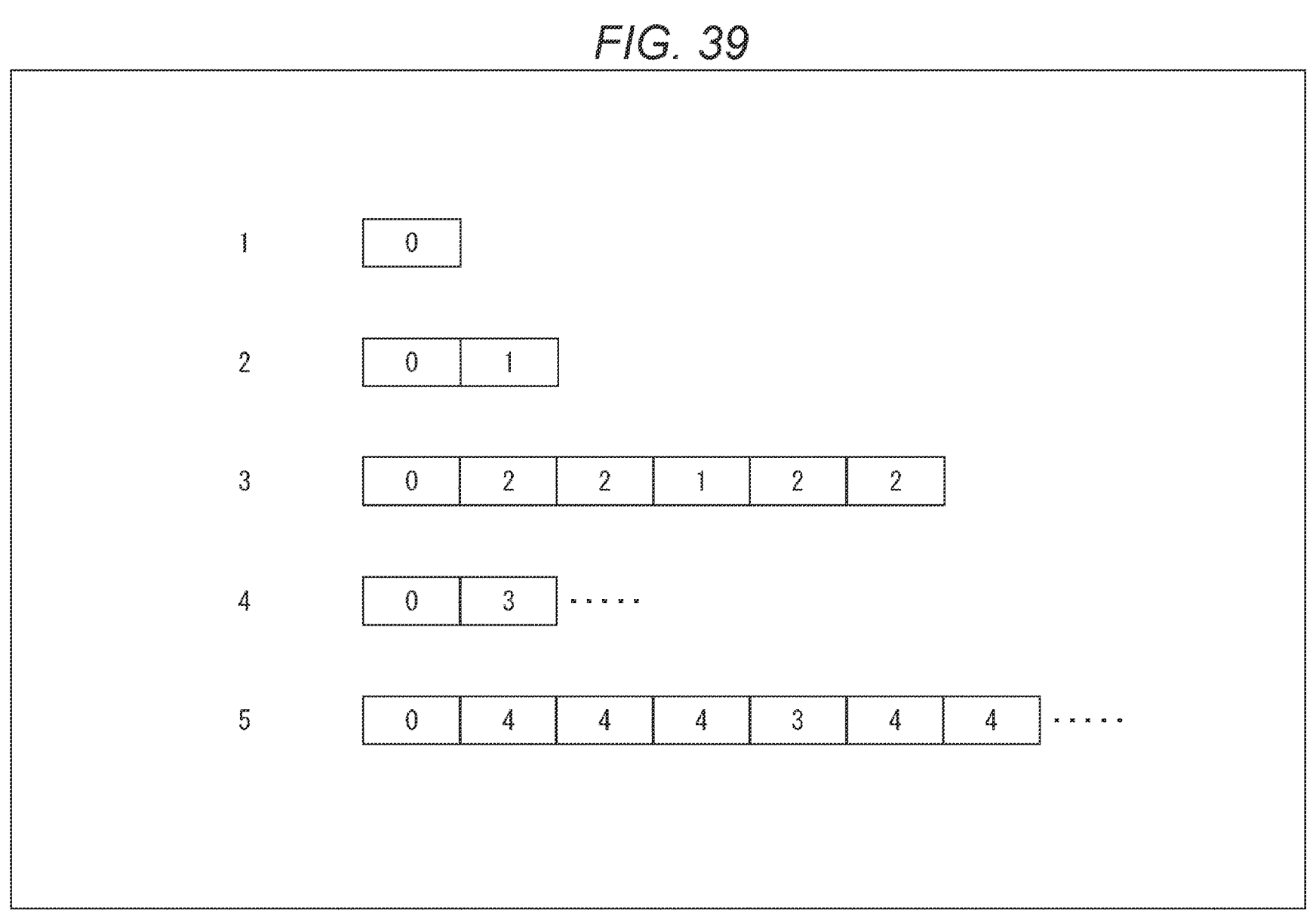

The respective nodes 611 that appear sequentially in this manner are labeled to indicate the hierarchical levels (LodIdx), with the use of a list of data structures, for example. FIG. 39 shows an example of labeling on the example shown in FIG. 38. This labeling is performed at the respective hierarchical levels in the order from the highest hierarchical level to the lowest hierarchical level in the hierarchical structure of the positional information, and a label of the value indicating the hierarchical level is attached to each newly appearing node.

For example, after the highest hierarchical level (LoDIdx=0) is processed, and the node 611-1 appears, a label "0" is attached to the node 611-1 in the list, as shown in the first row (row "1") from the top in FIG. 39.

After the next lower hierarchical level (LoDIdx=1) is processed, and the node 611-2 newly appears, a label "1" is attached to the node 611-2 in the list, as shown in the second row (row "2") from the top in FIG. 39. Since the node 611-1 has already been labeled, any label is not attached to the node 611-1 at this level.

Further, after the next lower hierarchical level (LoDIdx=2) is processed, and the nodes 611-3 to 611-6 newly appear, a label "2" is attached to each of the nodes 611-3 to 611-6 in the list, as shown in the third row (row "3") from the top in FIG. 39. Since the nodes 611-1 and 611-2 have already been labeled, any label is not attached to the nodes 611-1 and 611-2 at this level. Meanwhile, in a hierarchical structure (an octree), the respective nodes (the respective points) are aligned in Morton order. Likewise, in the list, the labels of the respective nodes 611 are aligned in Morton order. Accordingly, in the example case illustrated in FIG. 39, the label order is "0, 2, 2, 1, 2, 2, . . . ".

Further, after the next lower hierarchical level (LoDIdx=3) is processed, and the node 611-7 newly appears, a label "3" is attached to the node 611-7 in the list, as shown in the fourth row (row "4") from the top in FIG. 39. Since the node 611-1 has already been labeled, any label is not attached to the node 611-1 at this level. Since the node 611-7 appears immediately after the node 611-1 in Morton order, the label order is "0, 3, . . . " in the example case illustrated in FIG. 39.

Further, after the next lower hierarchical level (LoDIdx=4) is processed, and the nodes 611-8 to 611-12 newly appear, a label "4" is attached to the nodes 611-8 to 611-12 in the list, as shown in the fifth row (row "5") from the top in FIG. 39. Since the nodes 611-1 and 611-7 have already been labeled, any label is not attached to the nodes 611-1 and 611-7 at this level. In Morton order, the nodes 611-8 to 611-10 appear immediately after the node 611-1, and the nodes 611-11 and 611-12 appear immediately after the node 611-7. Accordingly, in the example case illustrated in FIG. 39, the label order is "0, 4, 4, 4, 3, 4, 4, . . . ".

As the attribute information is hierarchized with reference to the list generated as described above, and the attribute information is encoded/decoded, the attribute information can be encoded/decoded in a hierarchical structure similar to that of the positional information. Thus, scalable decoding of attribute information can be realized. Further, redundant processing can be reduced, and the increase in the load of the attribute information encoding/decoding process can be reduced.

<Case 1 Including the DCM>

Figure 40:
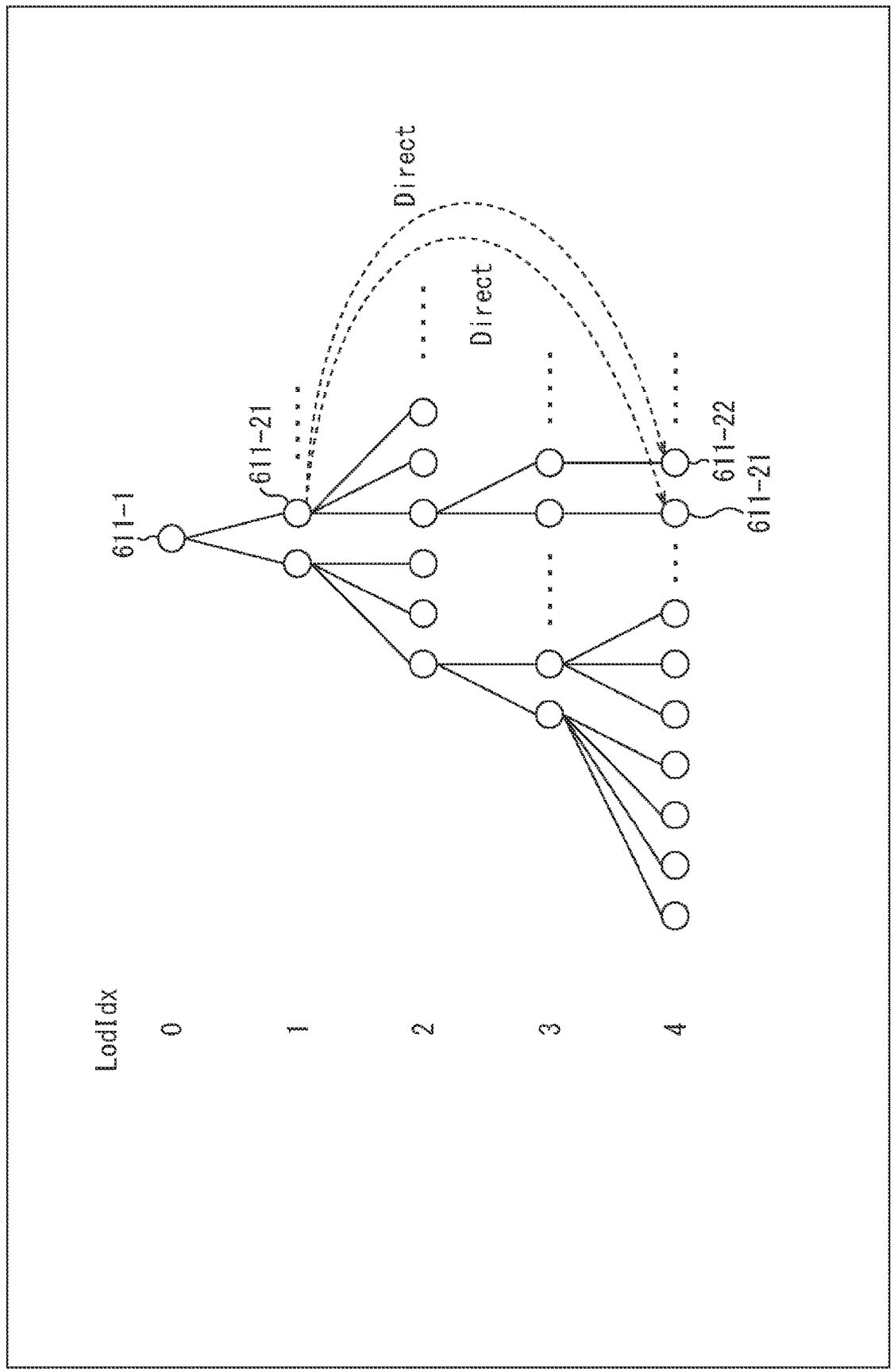
FIG. 40 is a diagram showing an example of the hierarchical structure of positional information.

A case where the DCM is included in the hierarchical structure of positional information is now described. FIG. 40 shows an example of the hierarchical structure of positional information in that case. In the hierarchical structure shown in FIG. 40, the point of a node 611-21 that appears at the hierarchical level LoDIdx=1 is divided at the hierarchical level LoDIdx=3. That is, a new node 611-22 appears at the hierarchical level LoDIdx=3. Further, the DCM is applied to this node 611-21. The DCM is also applied to the node 611-22.

Figure 41:
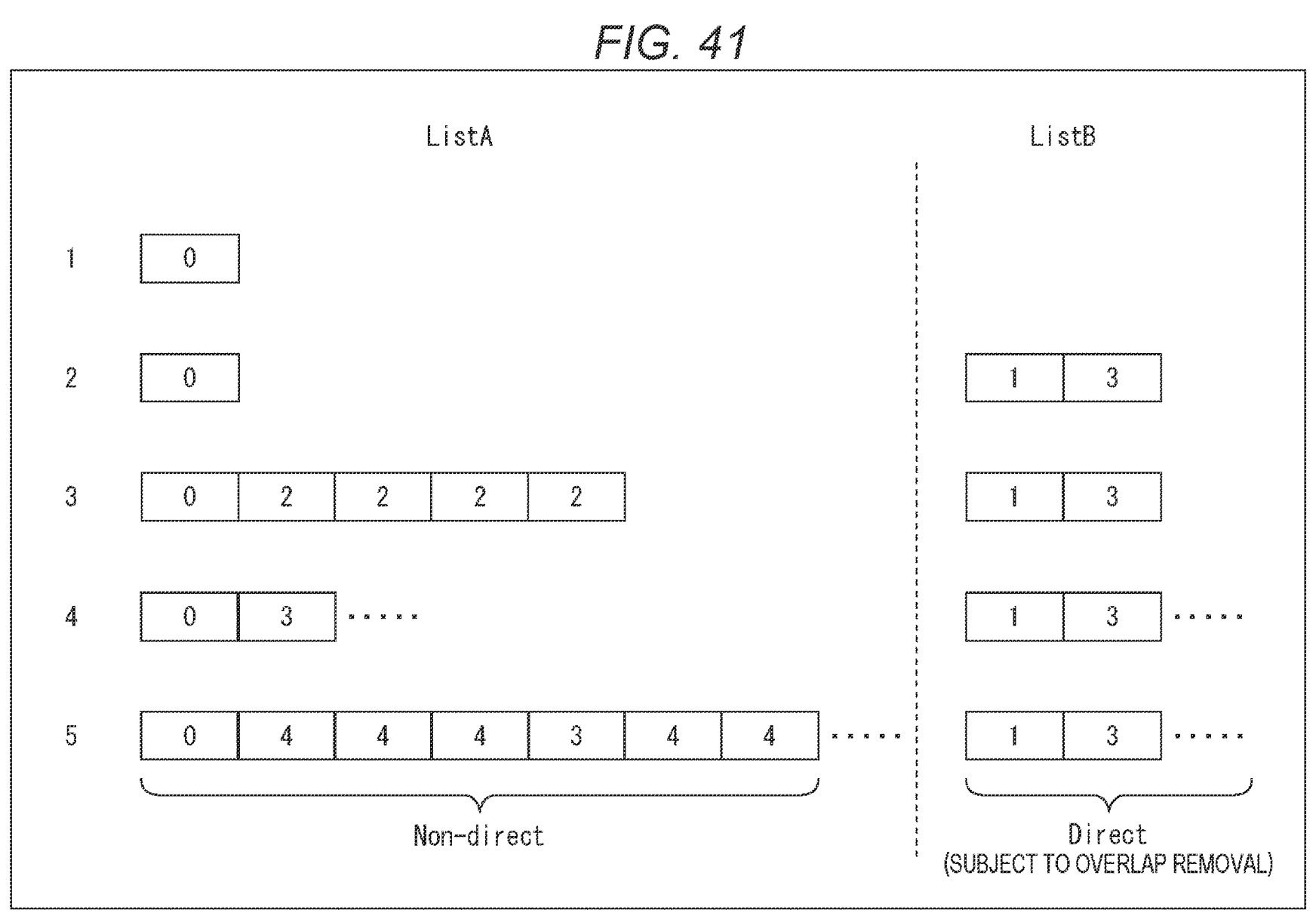

For such nodes to which the DCM is applied may be labeled with the use of a different list from that for the nodes to which the DCM is not applied. An example of labeling performed on the example in FIG. 40 by such a method is shown in FIG. 41. As shown in FIG. 41, the nodes to which the DCM is not applied are labeled with the use of List A in a manner similar to that in the example case shown in FIG. 39. On the other hand, the nodes 611-21 and 611-22 to which the DCM is applied are labeled with the use of List B, which differs from List A. Note that List A and List B are names given to the respective lists for ease of explanation, and may have any names in practice.

After the highest hierarchical level (LoDIdx=0) is processed, the next lower hierarchical level (LoDIdx=1) is processed, and the node 611-21 to which the DCM is applied newly appears. A label "1" is then attached to the node 611-21 in List B shown on the right side of the dotted line in FIG. 41. The DCM is also applied to the node 611-22, and encoding is performed on the relative distance from the node 611-21 at LoDIdx=1. Therefore, a label is attached to the node 611-22 at this hierarchical level. However, since the node 611-22 is separated from the node 611-21 at LoDIdx=3, a label "3" is attached to this node 611-22.

Note that the label on the node 611-21 and the label on the node 611-22 are aligned in accordance with the positions of both nodes in Morton order at the lowest hierarchical level (the highest resolution). In the example case illustrated in FIG. 40, the labels are aligned in the order of "1, 3", because the node 611-21 and the node 611-22 are aligned in this order.

As for the other nodes 611 to which the DCM is applied, labels are set in List B in a similar manner. The label strings in List A and List B are then used in encoding/decoding of attribute information. At that stage, the label strings in List A and the label strings in List B are merged and aligned in Morton order. That is, the labels are aligned so as to correspond to the nodes aligned in Morton order at the lowest hierarchical level (the highest resolution).

Further, the labels in List B (the labels on the nodes to which the DCM is applied) are subjected to a process to remove the overlapping points. As for the nodes 611 to which the DCM is applied, labeling is also performed on the nodes 611 to be separated, at the time of the first appearance.

For example, in the case illustrated in FIG. 41, labeling is performed on both the node 611-21 and the node 611-22 at the hierarchical level LoDIdx=1.

However, there may be cases where nodes are not separated, depending on the decoding target hierarchical level. For example, when decoding is performed at the hierarchical level (resolution) LoDIdx=2 in the example in FIG. 40, the node 611-21 and the node 611-22 are not separated. That is, at the hierarchical level LoDIdx=2, the point (the node 611-21) corresponding to the label "1" and the point (the node 611-22) corresponding to the label "3" overlap. Therefore, any label is not necessary on the node 611-22. In view of this, the labels whose corresponding points overlap are removed as described above.

That is, this process of removing overlapping points is performed only on the labels in List B (the label on the nodes to which the DCM is applied) (the labels in List A are not applicable).

As described above, the label strings corresponding to the nodes to which the DCM is not applied and the label strings corresponding to the nodes to which the DCM is applied are merged, the respective labels are aligned in Morton order, and, further, one label string from which the overlapping points have been removed as appropriate is used as a result of a LoD generation process to encoding and decoding of attribute information.

As the attribute information is hierarchized with reference to the list generated as described above, and the attribute information is encoded/decoded, the attribute information can be encoded/decoded in a hierarchical structure similar to that of the positional information. Accordingly, scalable decoding of attribute information can also be realized when the DCM is included in the hierarchical structure of the positional information. Further, redundant processing can be reduced, and the increase in the load of the attribute information encoding/decoding process can be reduced.

<Case 2 Including the DCM>

Figure 42:
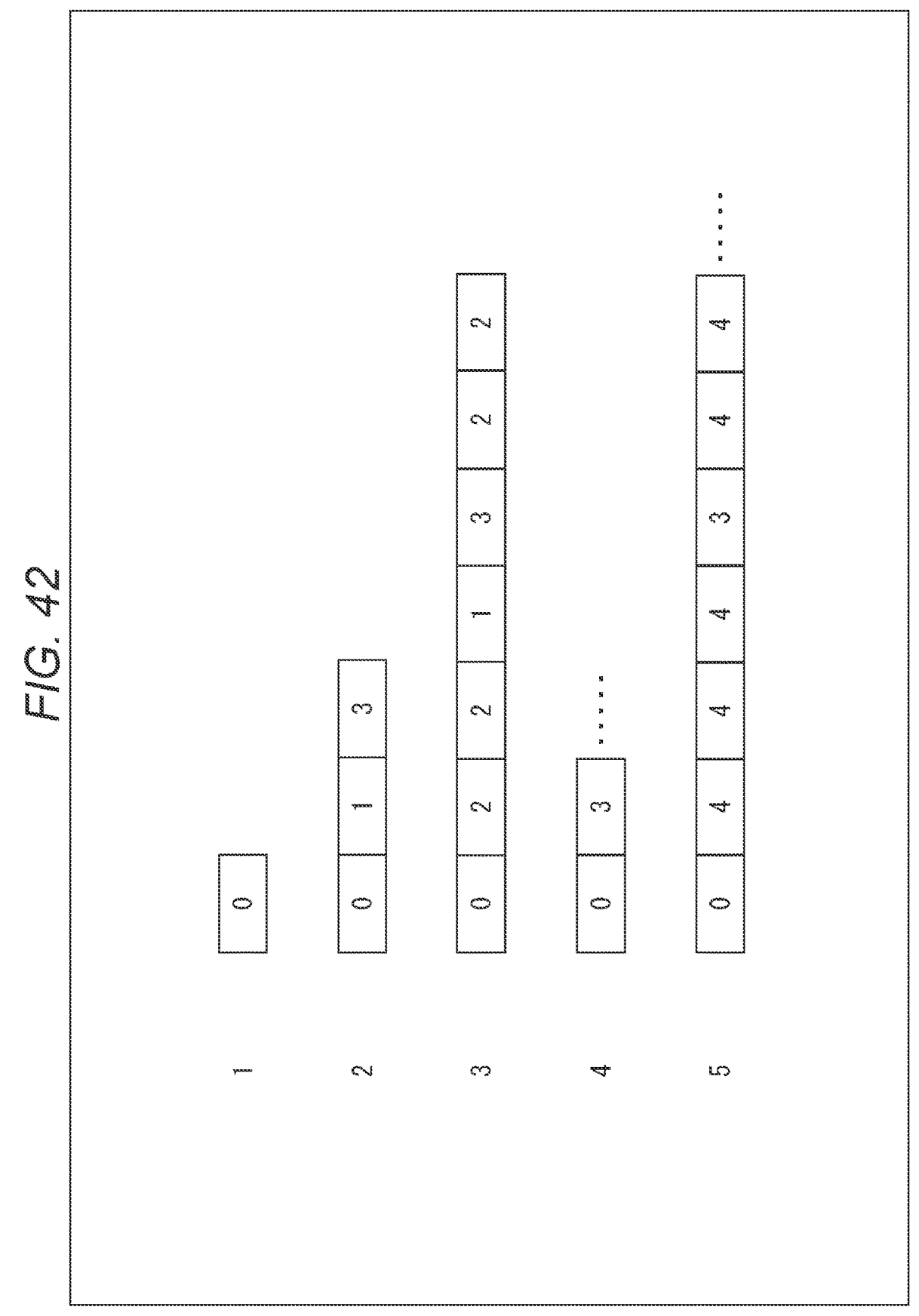

Alternatively, when the DCM is included in the hierarchical structure of positional information, the nodes to which the DCM is applied may not be separated from the nodes to which the DCM is not applied. That is, labeling may be performed with the use of the same list. Like FIG. 41, FIG. 42 shows an example of labeling on the hierarchical structure shown in FIG. 40. In the example illustrated in FIG. 42, labeling is performed with the use of a single list, as in the example case illustrated in FIG. 39.

First, after the highest hierarchical level (LoDIdx=0) is processed, and a node 611-1 appears, a label "0" is attached to the node 611-1 (the first row (row "1") from the top in FIG. 42) in the list, as in the example case illustrated in FIG. 39.

After the next lower hierarchical level (LoDIdx=1) is processed, and a node 611-21 to which the DCM is applied newly appears, a label "1" is attached to the node 611-21 in the list. The DCM is also applied to the node 611-22, and encoding is performed on the relative distance from the node 611-21 at LoDIdx=1. Therefore, a label is attached to the node 611-22 at this hierarchical level. However, since the node 611-22 is separated from the node 611-21 at LoDIdx=3, a label "3" is attached to this node 611-22 (the second row (row "2") from the top in FIG. 42).

Note that the label on the node 611-21 and the label on the node 611-22 are aligned in accordance with the positions of both nodes in Morton order at the lowest hierarchical level (the highest resolution), as in the case illustrated in FIG. 41. In the example case illustrated in FIG. 40, the labels are aligned in the order of "1, 3", because the node 611-21 and the node 611-22 are aligned in this order.

However, in the example case illustrated in FIG. 42, removal of overlapping points is performed each time labeling is performed on a node to which the DCM is applied. For example, when decoding is performed at the hierarchical level (resolution) LoDIdx=2 in the example in FIG. 40, the point (the node 611-21) corresponding to the label "1" and the point (the node 611-22) corresponding to the label "3" overlap, and therefore, the label "3" is removed. In other words, in the second row (row "2") from the top in FIG. 42, only the label "1" is attached.

On the other hand, when decoding is performed at the hierarchical level (resolution) LoDIdx=4 in the example in FIG. 40, the point (the node 611-21) corresponding to the label "1" and the point (the node 611-22) corresponding to the label "3" do not overlap, and therefore, label removal is not performed. In other words, in the second row (row "2") from the top in FIG. 42, the label "1" and the label "3" are attached.

Further, after the next lower hierarchical level (LoDIdx=2) is processed, and new nodes 611 appear, a label "2" is attached to those nodes (the third row (row "3") from the top in FIG. 42) in the list. Likewise, after the next lower hierarchical level (LoDIdx=3) is processed, and new nodes 611 appear, a label "3" is attached to those nodes (the third row (row "4") from the top in FIG. 42) in the list. Likewise, after the next lower hierarchical level (LoDIdx=4) is processed, and new nodes 611 appear, a label "4" is attached to those nodes (the third row (row "5") from the top in FIG. 42) in the list. Like the nodes 611, these labels are aligned in Morton order.

One label string that is generated as above and includes the labels corresponding to the nodes to which the DCM is not applied and the labels corresponding to the nodes to which the DCM is applied is used as a result of a LoD generation process to encoding and decoding of attribute information. In the case of this method, the respective labels are aligned in Morton order in the generated label string. Therefore, this label string can be applied to encoding and decoding of attribute information, without the need to align and merge the respective labels in Morton order, as in the example case illustrated in FIG. 41.

As the attribute information is hierarchized with reference to the list generated as described above, and the attribute information is encoded/decoded, the attribute information can be encoded/decoded in a hierarchical structure similar to that of the positional information. Thus, scalable decoding of attribute information can also be realized in the case of this method. Further, redundant processing can be reduced, and the increase in the load of the attribute information encoding/decoding process can be reduced.

<Encoding Device>

Figure 43:
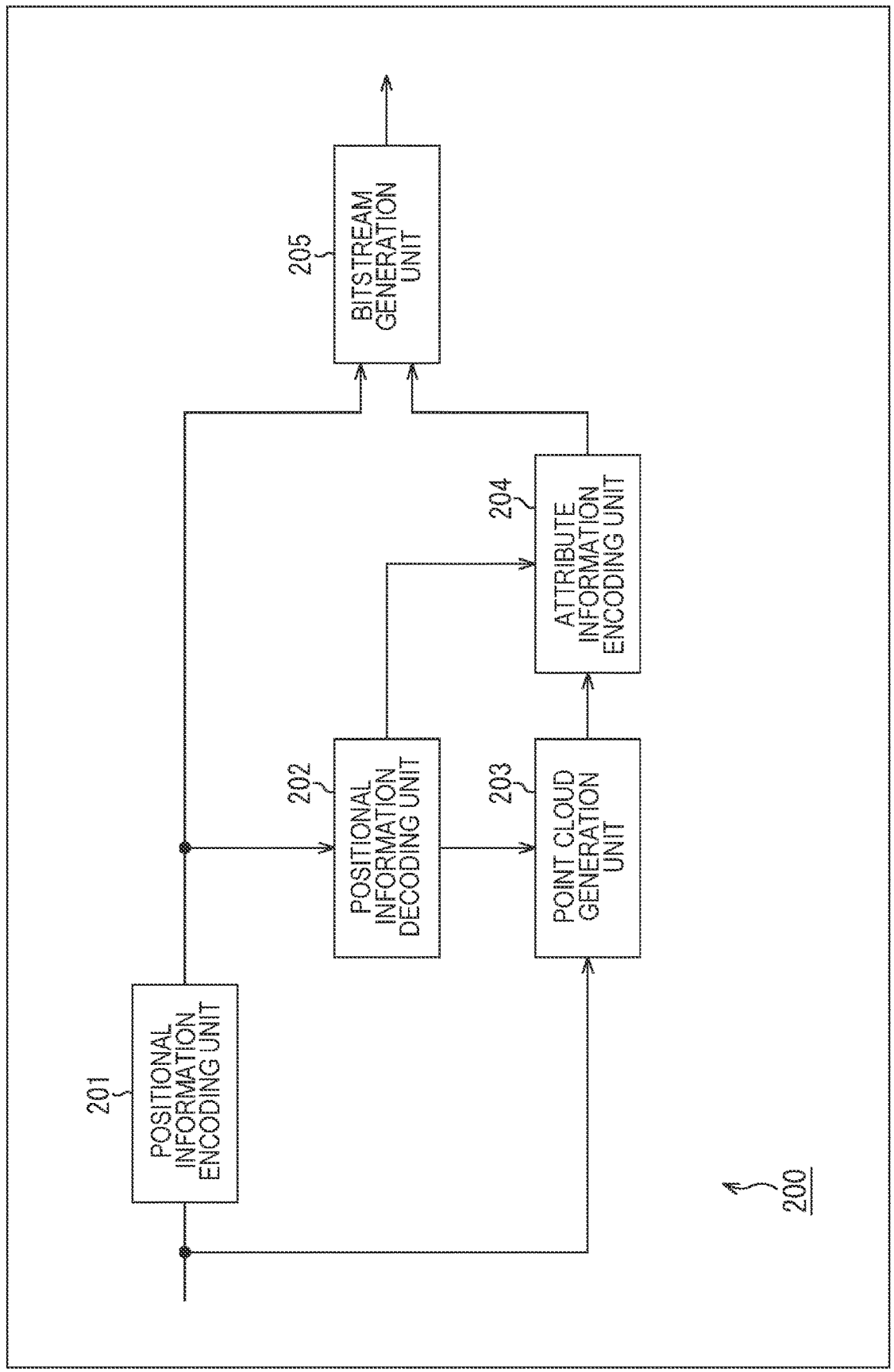
FIG. 43 is a block diagram showing a typical example configuration of an encoding device.

FIG. 43 is a block diagram showing an example configuration of the encoding device 200 in this case. That is, the encoding device 200 shown in FIG. 43 encodes a point cloud by applying the present technology described above in <6. LoD Generation> to the encoding.

Note that FIG. 43 shows the principal components and aspects such as processing units and the data flow, but FIG. 43 does not necessarily show all the components and aspects. That is, in the encoding device 200, there may be a processing unit that is not shown as a block in FIG. 43, or there may be a processing or data flow that is not shown as arrows or the like in FIG. 43.

The encoding device 200 shown in FIG. 43 includes the positional information encoding unit 201 to the bitstream generation unit 205, as in the case illustrated in FIG. 14. However, when decoding encoded data of positional information, the positional information decoding unit 202 performs a LoD generation process (a subsampling process), using a list as described above with reference to FIGS. 38 to 42.

For example, when the hierarchical structure of the positional information does not include any node to which the DCM is applied, the positional information decoding unit 202 performs the LoD generation process by the method described above with reference to FIG. 39. Further, when the hierarchical structure of the positional information includes nodes to which the DCM is applied, for example, the positional information decoding unit 202 performs the LoD generation process by the method described above with reference to FIG. 41 or 42.

The positional information decoding unit 202 then supplies the generated list (label string) to the attribute information encoding unit 204. The attribute information encoding unit 204 encodes the attribute information, using the LoD generation process result (label string). That is, the attribute information encoding unit 204 uses the label string (the hierarchical structure of the positional information) as the hierarchical structure of the attribute information, and performs encoding. By doing so, the attribute information encoding unit 204 can hierarchize each set of attribute information into a hierarchical structure similar to that of the positional information, without performing the LoD generation process (subsampling process).

Thus, the encoding device 200 can realize scalable decoding of the attribute information. The encoding device 200 can also reduce redundant processing and the increase in the load of the attribute information encoding process.

<Flow in an Encoding Process>

Figure 44:
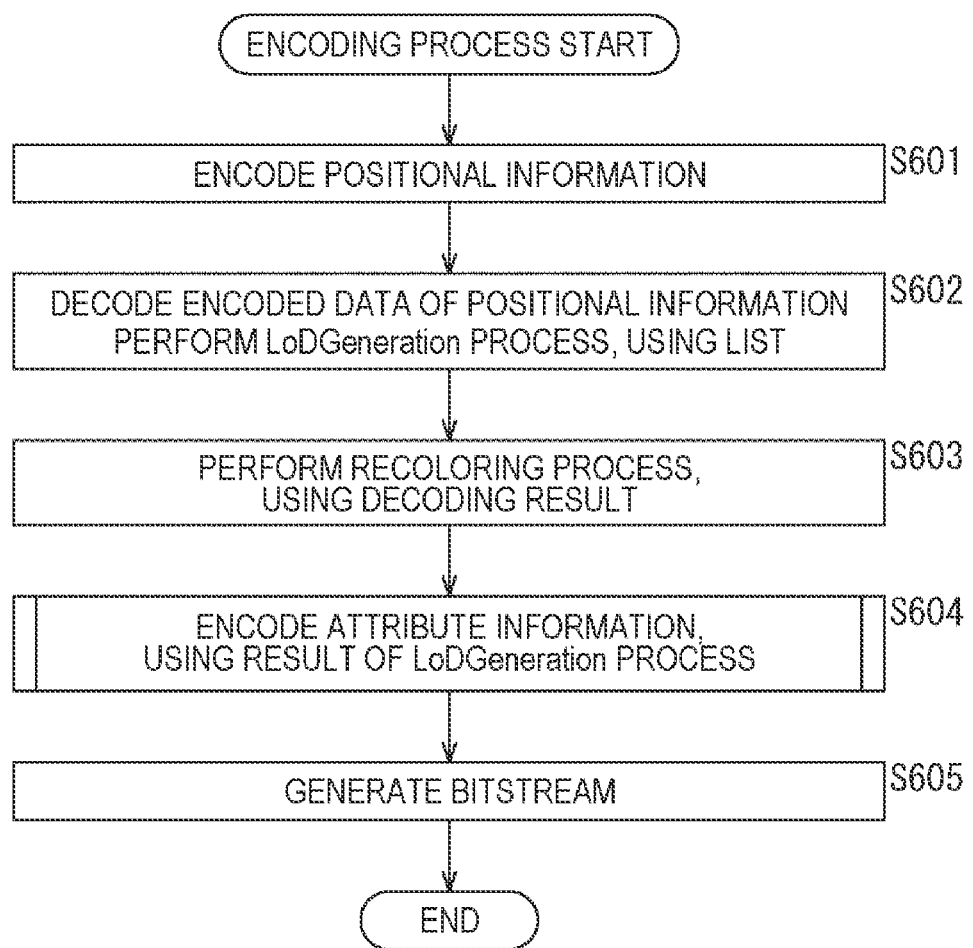
FIG. 44 is a flowchart for explaining an example flow in an encoding process.

Referring now to the flowchart shown in FIG. 44, an example flow in an encoding process in this case is described. When the encoding process is started, the positional information encoding unit 201 of the encoding device 200 encodes the positional information about an input point cloud, and generates encoded data of the positional information in step S601.

In step S602, the positional information decoding unit 202 decodes the encoded data of the positional information generated in step S601, and generates the positional information. In doing so, the positional information decoding unit 202 performs a LoD generation process using a list, and performs labeling on each node, as described above with reference to FIGS. 38 to 42.

In step S603, the point cloud generation unit 203 performs a recoloring process using the attribute information about the input point cloud and the positional information (decoding result) generated in step S202, and associates the attribute information with the positional information.

In step S604, the attribute information encoding unit 204 performs an attribute information encoding process to encode the attribute information subjected to the recoloring process in step S603, and generates encoded data of the attribute information. In doing so, the attribute information encoding unit 604 encodes the attribute information, using the result (a label string) of the LoD generation process performed in step S602. In this case, the attribute information encoding process is also performed in a flow similar to that shown in the flowchart in FIG. 18. However, the hierarchization process to be performed in step S221 will be described later in detail.

In step S605, the bitstream generation unit 205 generates and outputs a bitstream containing the encoded data of the positional information generated in step S601 and the encoded data of the attribute information generated in step S604.

When the processing in step S605 is completed, the encoding process comes to an end.

By performing the processing in each step in the above manner, the encoding device 200 can associate the hierarchical structure of the attribute information with the hierarchical structure of the positional information. That is, the encoding device 200 can further facilitate scalable decoding of attribute information. The encoding device 200 can also reduce redundant processing and the increase in the load of the encoding process.

<Flow in a Hierarchization Process>

Figure 45:
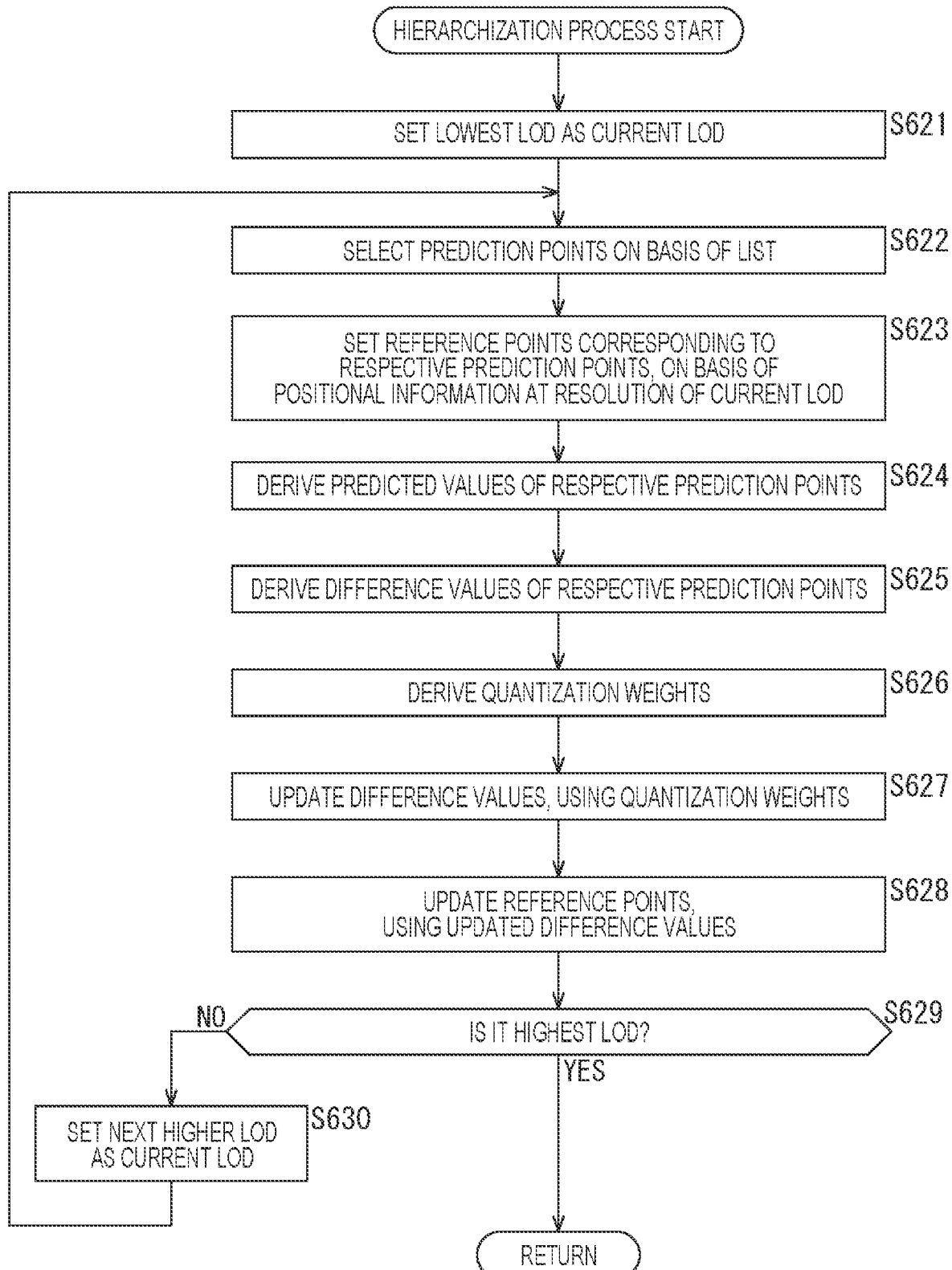
FIG. 45 is a flowchart for explaining an example flow in a hierarchization process.

In this case, the attribute information encoding process to be performed in step S604 in FIG. 44 is also performed in a flow similar to that in the flowchart in FIG. 18. However, in step S221 of the attribute information encoding process, the hierarchization process is performed in the flow described below. Referring now to the flowchart shown in FIG. 45, an example flow in the hierarchization process in this case is described.

When the hierarchization process is started, the individual hierarchical level processing units 221 of the hierarchization processing unit 211 in step 3621 sets the lowest hierarchical level (LoD) as the current hierarchical level (current LoD) that is the process target. That is, the lowest hierarchical level (LoD) is set as the process target.

In step S622, the point classification unit 231 selects prediction points on the basis of the list labeled in the LoD generation process in step S602 in FIG. 44. That is, the point classification unit 231 constructs a hierarchical structure similar to that of the positional information.

The processing in steps S623 to S630 is performed in a manner similar to that in the processing in steps S243 to S250 (FIG. 19).

By performing the processing in each step in the above manner, the hierarchization processing unit 211 can associate the hierarchical structure of the attribute information with the hierarchical structure of the positional information. That is, the hierarchization processing unit 211 can further facilitate scalable decoding of attribute information. The hierarchization processing unit 211 can also reduce redundant processing and the increase in the load of the hierarchization process.

<Decoding Device>

The configuration of the decoding device 400 in this case is also similar to that of the example shown in FIG. 23. That is, the decoding device 400 in FIG. 23 can decode a bitstream generated by encoding a point cloud by the present technology described above in <6. LoD Generation>. In this case, however, when decoding encoded data of positional information, the positional information decoding unit 403 performs a LoD generation process (a subsampling process), using a list as described above with reference to FIGS. 38 to 42. That is, the positional information decoding unit 403 performs a LoD generation process by a method similar to that adopted by the positional information decoding unit 202.

The positional information decoding unit 403 then supplies the generated list (label string) to the attribute information decoding unit 404. The attribute information decoding unit 404 decodes the encoded data of the attribute information, using the LoD generation process result (label string). That is, the attribute information decoding unit 404 uses the label string (the hierarchical structure of the positional information) as the hierarchical structure of the attribute information, and performs decoding. By doing so, the attribute information decoding unit 404 can perform an inverse hierarchization process regarding each set of the attribute information as a hierarchical structure similar to that of the positional information, without performing a LoD generation process (subsampling process).

Thus, the decoding device 400 can realize scalable decoding of the attribute information. The decoding device 400 can also reduce redundant processing and the increase in the load of the decoding process for the encoded data of the attribute information.

Note that, in this case, the attribute information decoding unit 404 also has a configuration similar to that in the example case illustrated in FIG. 24. Further, the inverse hierarchization processing unit 423 has a configuration similar to that in the example case illustrated in FIG. 25.

<Flow in a Decoding Process>

Figure 46:
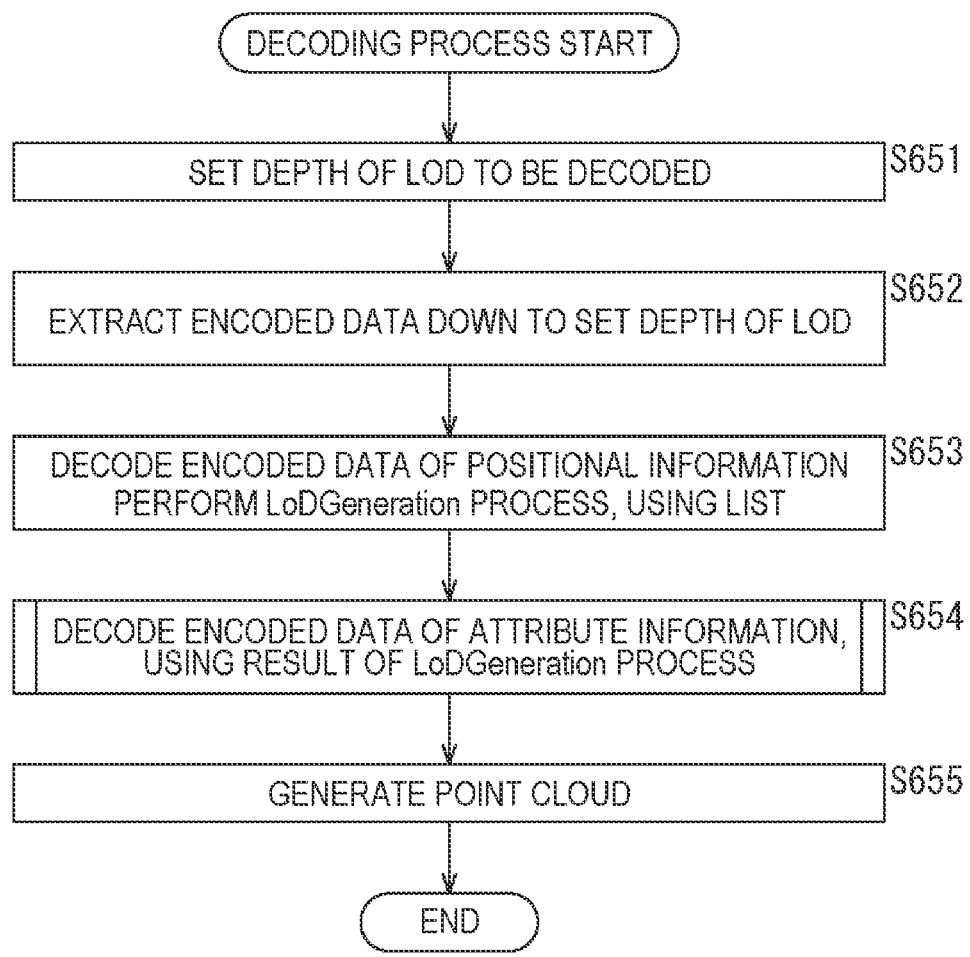
FIG. 46 is a flowchart for explaining an example flow in a decoding process.

Referring now to the flowchart shown in FIG. 46, an example flow in a decoding process in this case is described. When the decoding process is started, the decoding target LoD depth setting unit 401 of the decoding device 400 in step S651 sets the depth of the LoD to be decoded.

In step S652, the encoded data extraction unit 402 acquires and holds a bitstream, and extracts encoded data of the positional information and the attribute information about the hierarchical levels ranging from the highest hierarchical level LoD to the LoD depth set in step S651.

In step S653, the positional information decoding unit 403 decodes the encoded data of the positional information extracted in step S652, and generates the positional information (decoding result). In doing so, the positional information decoding unit 403 performs a LoD generation process using a list, and performs labeling on each node, as described above with reference to FIGS. 38 to 42.

In step S654, the attribute information decoding unit 404 decodes the encoded data of the attribute information extracted in step S652, and generates the attribute information (decoding result). In doing so, the attribute information decoding unit 404 decodes the encoded data of the attribute information, using the result (a label string) of the LoD generation process performed in step S653. In this case, the attribute information decoding process is also performed in a flow similar to that shown in the flowchart in FIG. 27. However, the inverse hierarchization process to be performed in step S423 will be described later in detail.

In step S655, the point cloud generation unit 405 generates and outputs a point cloud (decoding result), using the positional information (decoding result) generated in step S653 and the attribute information (decoding result) generated in step S654.

When the processing in step S655 is completed, the decoding process comes to an end.

By performing the processing in each step in the above manner, the decoding device 400 can associate the hierarchical structure of the attribute information with the hierarchical structure of the positional information. That is, the decoding device 400 can more easily perform scalable decoding of attribute information. The decoding device 400 can also reduce redundant processing and the increase in the load of the decoding process.

<Flow in an Inverse Hierarchization Process>

Figure 47:
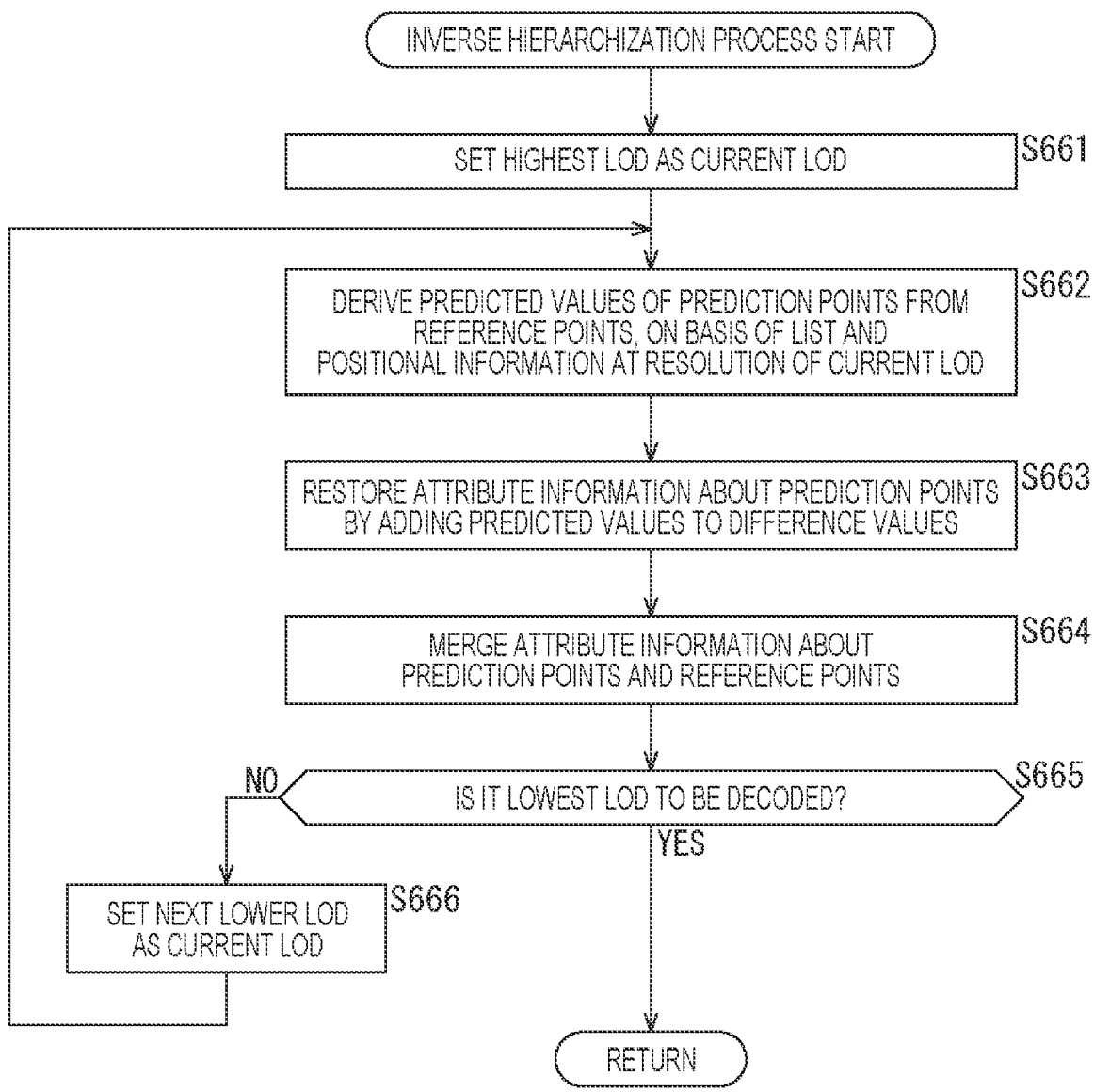
FIG. 47 is a flowchart for explaining an example flow in an inverse hierarchization process.

In this case, the attribute information decoding process to be performed in step S654 in FIG. 46 is also performed in a flow similar to that in the flowchart in FIG. 27. However, in step S423 of the attribute information decoding process, the inverse hierarchization process is performed in the flow described below. Referring now to the flowchart shown in FIG. 47, an example flow in the inverse hierarchization process in this case is described.

When the inverse hierarchization process is started, the individual hierarchical level processing units 441 of the inverse hierarchization processing unit 423 in step S661 sets the highest hierarchical level (LoD) as the current hierarchical level (current LoD) that is the process target. That is, the lowest hierarchical level (LoD) is set as the process target.

In step S662, the prediction unit 451 derives predicted values of the prediction points from the reference points, on the basis of the list labeled in the LoD generation process in step S653 in FIG. 46 and the positional information at the resolution of the current LoD.

For example, the prediction unit 451 identifies the reference points of the current LoD on the basis of the list, or by regarding the hierarchical structure of the attribute information similar to the hierarchical structure of the positional information, and derives the predicted values of the prediction points of the current LoD on the basis of the reference points and the positional information at the resolution of the current LoD. The predicted value deriving method adopted herein may be any appropriate method. For example, the prediction unit 451 may derive the predicted values by a method similar to that in the case of the processing in step S463.

The processing in respective steps S663 to S666 is performed in a manner similar to that in the processing in respective steps S464 to S467 (FIG. 29).

By performing the processing in each step in the above manner, the inverse hierarchization processing unit 423 can associate the hierarchical structure of the attribute information with the hierarchical structure of the positional information. That is, the decoding device 400 can more easily perform scalable decoding of attribute information. The inverse hierarchization processing unit 423 can also reduce redundant processing and the increase in the load of the inverse hierarchization process.

7. Notes

<Hierarchization and Inverse Hierarchization Method>

In the above description, "lifting" has been explained as an example of a method for hierarchizing and inversely hierarchizing attribute information. However, the present technology can be applied to any technique for hierarchizing attribute information. That is, the method for hierarchizing and inversely hierarchizing attribute information may be other than "lifting".

<Control Information>

Control information according to the present technology described in each of the above embodiments may be transmitted from the encoding side to the decoding side. For example, control information (enabled_flag, for example) for controlling whether or not to allow (or prohibit) application of the present technology described above may be transmitted. Further, control information specifying the range (the upper limit and/or the lower limit of block size, slices, pictures, sequences, components, views, layers, and the like, for example) in which the present technology described above is allowed (or prohibited) to be applied may be transmitted, for example.

<Vicinity/Neighborhood>

Note that, in this specification, the positional relationship such as "vicinity" and "neighborhood" may include not only a spatial positional relationship but also a temporal positional relationship.

<Computer>

The above described series of processes can be performed by hardware or can be performed by software. When the series of processes are to be performed by software, the program that forms the software is installed into a computer. Here, the computer may be a computer incorporated into special-purpose hardware, or may be a general-purpose personal computer or the like that can execute various kinds of functions when various kinds of programs are installed thereinto, for example.

Figure 48:
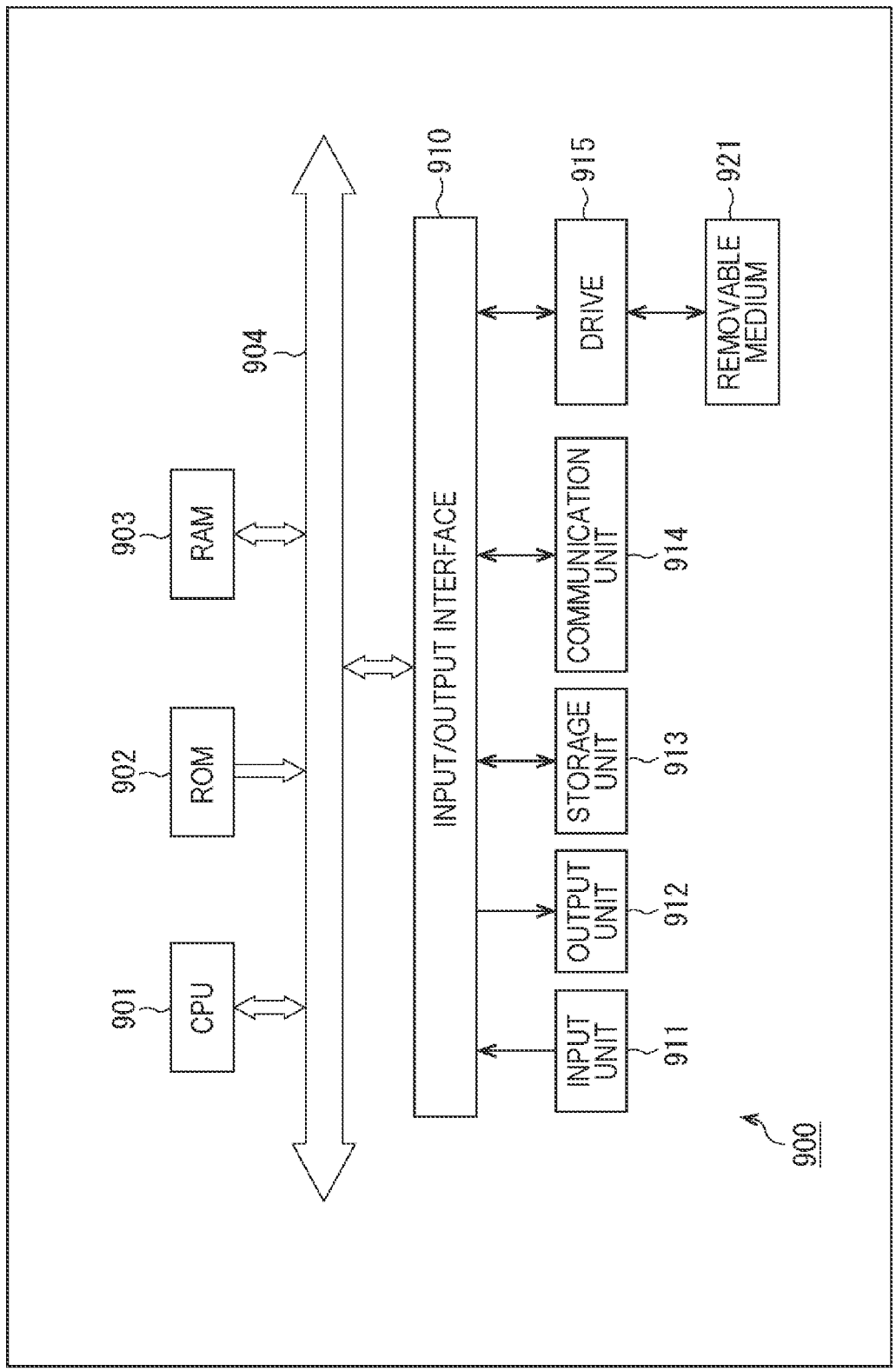
FIG. 48 is a block diagram showing a typical example configuration of a computer.

FIG. 48 is a block diagram showing an example configuration of the hardware of a computer that performs the above described series of processes in accordance with a program.

In a computer 900 shown in FIG. 48, a central processing unit (CPU) 901, a read only memory (ROM) 902, and a random access memory (RAM) 903 are connected to one another by a bus 904.

An input/output interface 910 is also connected to the bus 904. An input unit 911, an output unit 912, a storage unit 913, a communication unit 914, and a drive 915 are connected to the input/output interface 910.

The input unit 911 is formed with a keyboard, a mouse, a microphone, a touch panel, an input terminal, and the like, for example. The output unit 912 is formed with a display, a speaker, an output terminal, and the like, for example. The storage unit 913 is formed with a hard disk, a RAM disk, a nonvolatile memory, and the like, for example. The communication unit 914 is formed with a network interface, for example. The drive 915 drives a removable medium 921 such as a magnetic disk, an optical disk, a magnetooptical disk, or a semiconductor memory.

In the computer having the above described configuration, the CPU 901 loads a program stored in the storage unit 913 into the RAM 903 via the input/output interface 910 and the bus 904, for example, and executes the program, so that the above described series of processes is performed. The RAM 903 also stores data necessary for the CPU 901 to perform various processes and the like as necessary.

The program to be executed by the computer may be recorded on the removable medium 921 as a packaged medium or the like to be used, for example. In that case, the program can be installed into the storage unit 913 via the input/output interface 910 when the removable medium 921 is mounted on the drive 915.

Alternatively, this program can be provided via a wired or wireless transmission medium such as a local area network, the Internet, or digital satellite broadcasting. In that case, the program may be received by the communication unit 914, and be installed into the storage unit 913.

Also, this program may be installed beforehand into the ROM 902 or the storage unit 913.

<Targets to which the Present Technology is Applied>

Although cases where the present technology is applied to encoding and decoding of point cloud data have been described so far, the present technology is not limited to those examples, but can be applied to encoding and decoding of 3D data of any standard. That is, various processes such as encoding and decoding processes, and any specifications of various kinds of data such as 3D data and metadata can be adopted, as long as the present technology described above is not contradicted. Also, some of the processes and specifications described above may be omitted, as long as the present technology is not contradicted.

Further, in the above description, the encoding device 200 and the decoding device 400 have been described as example applications of the present technology, but the present technology can be applied to any desired configuration.

For example, the present technology can be applied to various electronic apparatuses, such as transmitters and receivers (television receivers or portable telephone devices, for example) in satellite broadcasting, cable broadcasting such as cable TV, distribution via the Internet, distribution to terminals via cellular communication, or the like, and apparatuses (hard disk recorders or cameras, for example) that record images on media such as optical disks, magnetic disks, and flash memory, and reproduce images from these storage media, for example.

Further, the present technology can also be embodied as a component of an apparatus, such as a processor (a video processor, for example) serving as a system LSI (Large Scale Integration) or the like, a module (a video module, for example) using a plurality of processors or the like, a unit (a video unit, for example) using a plurality of modules or the like, or a set (a video set, for example) having other functions added to units.

Further, the present technology can also be applied to a network system formed with a plurality of devices, for example. For example, the present technology may be embodied as cloud computing that is shared and jointly processed by a plurality of devices via a network. For example, the present technology may be embodied in a cloud service that provides services related to images (video images) to any kinds of terminals such as computers, audio visual (AV) devices, portable information processing terminals, and IoT (Internet of Things) devices.

Note that, in the present specification, a system means an assembly of plurality of components (devices, modules (parts), and the like), and not all the components need to be provided in the same housing. In view of this, plurality of devices that is housed in different housings and is connected to one another via a network forms a system, and one device having plurality of modules housed in one housing is also a system.

<Fields and Usage to which the Present Technology can be Applied>

A system, an apparatus, a processing unit, and the like to which the present technology is applied can be used in any appropriate field such as transportation, medical care, crime prevention, agriculture, the livestock industry, mining, beauty care, factories, household appliances, meteorology, or nature observation, for example. Further, the present technology can also be used for any appropriate purpose.

<Other Aspects>

Note that, in this specification, a "flag" is information for identifying a plurality of states, and includes not only information to be used for identifying two states of true (1) or false (0), but also information for identifying three or more states. Therefore, the values this "flag" can have may be the two values of "1" and "0", for example, or three or more values. That is, this "flag" may be formed with any number of bits, and may be formed with one bit or a plurality of bits. Further, as for identification information (including a flag), not only the identification information but also difference information about the identification information with respect to reference information may be included in a bitstream. Therefore, in this specification, a "flag" and "identification information" include not only the information but also difference information with respect to the reference information.

Further, various kinds of information (such as metadata) regarding encoded data (a bitstream) may be transmitted or recorded in any mode that is associated with the encoded data. Here, the term "to associate" means to enable use of other data (or a link to other data) while data is processed, for example. That is, pieces of data associated with each other may be integrated as one piece of data, or may be regarded as separate pieces of data. For example, information associated with encoded data (an image) may be transmitted through a transmission path different from the encoded data (image). Further, information associated with encoded data (an image) may be recorded in a recording medium different from the encoded data (image) (or in a different recording area of the same recording medium), for example. Note that this "association" may apply to some of the data, instead of the entire data. For example, an image and the information corresponding to the image may be associated with each other for any appropriate unit, such as for a plurality of frames, each frame, or some portion in each frame.

Note that, in this specification, the terms "to combine", "to multiplex", "to add", "to integrate", "to include", "to store", "to contain", "to incorporate, "to insert", and the like mean combining a plurality of objects into one, such as combining encoded data and metadata into one piece of data, for example, and mean a method of the above described "association".

Further, embodiments of the present technology are not limited to the above described embodiments, and various modifications may be made to them without departing from the scope of the present technology.

For example, any configuration described above as one device (or one processing unit) may be divided into a plurality of devices (or processing units). Conversely, any configuration described above as a plurality of devices (or processing units) may be combined into one device (or one processing unit). Furthermore, it is of course possible to add a component other than those described above to the configuration of each device (or each processing unit). Further, some components of a device (or processing unit) may be incorporated into the configuration of another device (or processing unit) as long as the configuration and the functions of the entire system remain substantially the same.

Also, the program described above may be executed in any device, for example. In that case, the device is only required to have necessary functions (function blocks and the like) so that necessary information can be obtained.

Also, one device may carry out each step in one flowchart, or a plurality of devices may carry out each step, for example. Further, when one step includes a plurality of processes, the plurality of processes may be performed by one device or may be performed by a plurality of devices. In other words, a plurality of processes included in one step may be performed as processes in a plurality of steps. Conversely, processes described as a plurality of steps may be collectively performed as one step.

Also, a program to be executed by a computer may be a program for performing the processes in the steps according to the program in chronological order in accordance with the sequence described in this specification, or may be a program for performing processes in parallel or performing a process when necessary, such as when there is a call, for example. That is, as long as there are no contradictions, the processes in the respective steps may be performed in a different order from the above described order. Further, the processes in the steps according to this program may be executed in parallel with the processes according to another program, or may be executed in combination with the processes according to another program.

Also, each of the plurality of techniques according to the present technology can be independently implemented, as long as there are no contradictions, for example. It is of course also possible to implement a combination of some of the plurality of techniques according to the present technology. For example, part or all of the present technology described in one of the embodiments may be implemented in combination with part or all of the present technology described in another one of the embodiments. Further, part or all of the present technology described above may be implemented in combination with some other technology not described above.

Note that the present technology may also be embodied in the configurations described below.

(1) An information processing apparatus including
a hierarchization unit that performs hierarchization of attribute information about a point cloud representing a three-dimensional object by recursively repeating, on a reference point, a process of classifying points of the point cloud into a prediction point that is a point at which a difference value between the attribute information and a predicted value is left, and the reference point that is a point at which the attribute information is referred to during derivation of the predicted value,
in which, during the hierarchization, the hierarchization unit selects the prediction point in such a manner that a point also exists in a voxel of a hierarchical level one level higher than a hierarchical level to which voxels containing points of a current hierarchical level belong.

(2) The information processing apparatus according to (1), in which
the hierarchization unit
derives the predicted value of the prediction point, using the attribute information about the reference point weighted in accordance with a distance between the prediction point and the reference point, and
derives the difference value, using the derived predicted value.

(3) The information processing apparatus according to (2), in which
the hierarchization unit derives the predicted value of the prediction point, using the attribute information about the reference point weighted in accordance with the distance based on positional information at a resolution of the lowest hierarchical level in the point cloud.

(4) The information processing apparatus according to (2), in which
the hierarchization unit derives the predicted value of the prediction point, using the attribute information about the reference point weighted in accordance with the distance based on positional information at a resolution of the current hierarchical level in the point cloud.

(5) The information processing apparatus according to (2), in which
the hierarchization unit classifies all the points in the current hierarchical level into the prediction points, sets a reference point in a voxel of the one level higher hierarchical level, and derives the predicted values of the prediction points, using the attribute information about the reference point.

(6) The information processing apparatus according to any one of (1) to (5), further including
a quantization unit that quantizes the difference value of each point of each hierarchical level, using a quantization weight for each hierarchical level, the difference value having been generated by the hierarchization unit.

(7) The information processing apparatus according to (6), in which
the quantization unit quantizes the difference value, using the quantization weight for each hierarchical level, the quantization weight having a greater value at a higher hierarchical level.

(8) The information processing apparatus according to (6), further including
an encoding unit that encodes the difference value quantized by the quantization unit and a parameter that defines a function to be used for deriving the quantization weight for each hierarchical level, and generates encoded data.

(9) The information processing apparatus according to (6), further including
an encoding unit that encodes the difference value quantized by the quantization unit and the quantization weight for each hierarchical level, and generates encoded data.

(10) An information processing method including:
performing hierarchization of attribute information about a point cloud representing a three-dimensional object by recursively repeating, on a reference point, a process of classifying points of the point cloud into a prediction point that is a point at which a difference value between the attribute information and a predicted value is left, and the reference point that is a point at which the attribute information is referred to during derivation of the predicted value; and
selecting, during the hierarchization, the prediction point in such a manner that a point also exists in a voxel of a hierarchical level one level higher than a hierarchical level to which voxels containing points of a current hierarchical level belong.

(11) An information processing apparatus including
an inverse hierarchization unit that performs inverse hierarchization of attribute information about a point cloud representing a three-dimensional object, the attribute information having been hierarchized by recursively repeating, on a reference point, a process of classifying points of the point cloud into a prediction point that is a point at which a difference value between the attribute information and a predicted value is left, and the reference point that is a point at which the attribute information is referred to during derivation of the predicted value,
in which, during the inverse hierarchization, the inverse hierarchization unit derives the predicted value of the attribute information about the prediction point at each hierarchical level using the attribute information about the reference point and positional information at a resolution of a hierarchical level that is not the lowest hierarchical level of the point cloud, and derives the attribute information about the prediction point using the predicted value and the difference value.

(12) The information processing apparatus according to (11), in which
the inverse hierarchization unit derives the predicted value, using the attribute information about the reference point and the positional information about the reference point and the prediction point at a resolution of the current hierarchical level.

(13) The information processing apparatus according to (11), in which the inverse hierarchization unit derives the predicted value, using the attribute information about the reference point, the positional information about the reference point at a resolution of a hierarchical level one level higher than the current hierarchical level, and the positional information about the prediction point at a resolution of the current hierarchical level.
(14) The information processing apparatus according to any one of (11) to (13), in which
the inverse hierarchization unit derives the predicted value of the prediction point, using the attribute information about the reference point weighted in accordance with a distance between the prediction point and the reference point.
(15) The information processing apparatus according to any one of (11) to (14), in which
the inverse hierarchization unit hierarchizes the attribute information using the positional information, and associates the attribute information with the positional information about each point at each hierarchical level.
(16) The information processing apparatus according to any one of (11) to (15), further including
an inverse quantization unit that inversely quantizes the difference value of each point of each hierarchical level, using a quantization weight for each hierarchical level, the difference value having been quantized.
(17) The information processing apparatus according to (16), in which
the inverse quantization unit inversely quantizes the quantized difference value, using the quantization weight for each hierarchical level, the quantization weight having a greater value at a higher hierarchical level.
(18) The information processing apparatus according to (16), further including
a decoding unit that decodes encoded data, and acquires the quantized difference value and a parameter that defines a function to be used for deriving the quantization weight for each hierarchical level.
(19) The information processing apparatus according to (16), further including
a decoding unit that decodes encoded data, and acquires the quantized difference value and the quantization weight for each hierarchical level.
(20) An information processing method including:
performing inverse hierarchization of attribute information about a point cloud representing a three-dimensional object, the attribute information having been hierarchized by recursively repeating, on a reference point, a process of classifying points of the point cloud into a prediction point that is a point at which a difference value between the attribute information and a predicted value is left, and the reference point that is a point at which the attribute information is referred to during derivation of the predicted value; and
deriving, during the inverse hierarchization, the predicted value of the attribute information about the prediction point at each hierarchical level using the attribute information about the reference point and positional information at a resolution of a hierarchical level that is not the lowest hierarchical level of the point cloud, and deriving the attribute information about the prediction point using the predicted value and the difference value.
(21) An information processing apparatus including:
a generation unit that generates information indicating a hierarchical structure of positional information about a point cloud representing a three-dimensional object; and
a hierarchization unit that hierarchizes attribute information about the point cloud to associate the attribute information with the hierarchical structure of the positional information, on the basis of the information generated by the generation unit.
(22) The information processing apparatus according to (21), in which
the generation unit generates the information about the positional information obtained by decoding encoded data of the positional information.
(23) The information processing apparatus according to (21) or (22), in which
the generation unit generates the information by labeling each node of the hierarchical structure of the positional information, using a list.
(24) The information processing apparatus according to (23), in which
the generation unit labels each newly appearing node with a value indicating the hierarchical level in order from the highest hierarchical level to the lowest hierarchical level in the hierarchical structure of the positional information.
(25) The information processing apparatus according to (24), in which
the generation unit labels each newly appearing node in Morton order at each hierarchical level in the hierarchical structure of the positional information.
(26) The information processing apparatus according to (24) or (25), in which,
when a node to which a direct coding mode (DCM) is applied newly appears, the generation unit performs labeling on the node, and labeling on another node that is divided from the node at a lower hierarchical level and to which the DCM is applied.
(27) The information processing apparatus according to (26), in which
the generation unit performs labeling on the node to which the DCM is applied, using a list different from a list being used for labeling a node to which the DCM is not applied.
(28) The information processing apparatus according to (26) or (27), in which,
when points corresponding to a plurality of labels overlap, the generation unit leaves one of the plurality of labels and deletes the other ones of the plurality of labels.
(29) The information processing apparatus according to any one of (21) to (28), in which,
on the basis of the information, the hierarchization unit selects prediction points of the respective hierarchical levels of the attribute information, to associate the attribute information with the hierarchical structure of the positional information.
(30) An information processing method including:
generating information indicating a hierarchical structure of positional information about a point cloud representing a three-dimensional object; and
hierarchizing attribute information to associate the attribute information with the hierarchical structure of the positional information, on the basis of the generated information.
(31) An information processing apparatus including:
a generation unit that generates information indicating a hierarchical structure of positional information about a point cloud representing a three-dimensional object; and
an inverse hierarchization unit that inversely hierarchizes attribute information about the point cloud, to associate a hierarchical structure of the attribute information with the hierarchical structure of the positional information, on the basis of the information generated by the generation unit.
(32) The information processing apparatus according to (31), in which
the generation unit generates the information about the positional information obtained by decoding encoded data of the positional information.
(33) The information processing apparatus according to (31) or (32), in which
the generation unit generates the information by labeling each node of the hierarchical structure of the positional information, using a list.
(34) The information processing apparatus according to (33), in which
the generation unit labels each newly appearing node with a value indicating the hierarchical level in order from the highest hierarchical level to the lowest hierarchical level in the hierarchical structure of the positional information.
(35) The information processing apparatus according to (34), in which
the generation unit labels each newly appearing node in Morton order, at each hierarchical level in the hierarchical structure of the positional information.
(36) The information processing apparatus according to (34) or (35), in which,
when a node to which a direct coding mode (DCM) is applied newly appears, the generation unit performs labeling on the node, and labeling on another node that is divided from the node at a lower hierarchical level and to which the DCM is applied.
(37) The information processing apparatus according to (36), in which
the generation unit performs labeling on the node to which the DCM is applied, using a list different from a list being used for labeling a node to which the DCM is not applied.
(38) The information processing apparatus according to (36) or (37), in which,
when points corresponding to a plurality of labels overlap, the generation unit leaves one of the plurality of labels and deletes the other ones of the plurality of labels.
(39) The information processing apparatus according to any one of (31) to (38), in which,
on the basis of the information, the inverse hierarchization unit selects prediction points of the respective hierarchical levels of the attribute information, to associate the attribute information with the hierarchical structure of the positional information.
(40) An information processing method including:
generating information indicating a hierarchical structure of positional information about a point cloud representing a three-dimensional object; and
inversely hierarchizing attribute information about the point cloud on the basis of the generated information, with a hierarchical structure of the attribute information being associated with the hierarchical structure of the positional information.
(41) An information processing apparatus including:
a hierarchization unit that hierarchizes attribute information about a point cloud representing a three-dimensional object, to associate the attribute information with a hierarchical structure of positional information about the point cloud; and
a quantization unit that quantizes the attribute information hierarchized by the hierarchization unit, using a quantization weight for each hierarchical level.
(42) The information processing apparatus according to (41), in which
the quantization unit quantizes the attribute information, using the quantization weight formed with a ratio between the number of points in the point cloud and the number of points at a process target hierarchical level.
(43) The information processing apparatus according to (42), in which
the quantization unit quantizes the attribute information about the lowest hierarchical level, using the quantization weight of a value "1".
(44) The information processing apparatus according to (41), in which
the quantization unit quantizes the attribute information, using the quantization weight formed with a ratio between the number of points at a hierarchical level below a process target hierarchical level and the number of points at the process target hierarchical level.
(45) An information processing method including:
hierarchizing attribute information about a point cloud representing a three-dimensional object, to associate the attribute information with a hierarchical structure of positional information about the point cloud; and
quantizing the hierarchized attribute information, using a quantization weight for each hierarchical level.
(46) An information processing apparatus including:
an inverse quantization unit that inversely quantizes attribute information about a point cloud, using a quantization weight for each hierarchical level, the attribute information having been hierarchized to be associated with a hierarchical structure of positional information about the point cloud representing a three-dimensional object and been quantized with the quantization weight; and
an inverse hierarchization unit that inversely hierarchizes the attribute information inversely quantized by the inverse quantization unit.
(47) The information processing apparatus according to (46), in which
the inverse quantization unit inversely quantizes the attribute information, using the quantization weight formed with a ratio between the number of points in the point cloud and the number of points at a process target hierarchical level.
(48) The information processing apparatus according to (47), in which
the inverse quantization unit inversely quantizes the attribute information about the lowest hierarchical level, using the quantization weight of a value "1".
(49) The information processing apparatus according to (46), in which
the inverse quantization unit inversely quantizes the attribute information, using the quantization weight formed with a ratio between the number of points at a hierarchical level below a process target hierarchical level and the number of points at the process target hierarchical level.
(50) The information processing apparatus according to any one of (46) to (49), in which
the inverse quantization unit acquires the quantization weight used for quantization of the attribute information, and inversely quantizes the attribute information using the acquired quantization weight.

(51) An information processing method including:
hierarchizing attribute information about a point cloud representing a three-dimensional object, to associate the attribute information with a hierarchical structure of positional information about the point cloud; and
quantizing the hierarchized attribute information, using a quantization weight for each hierarchical level.

REFERENCE SIGNS LIST

100 Spatial region
101 Voxel
102 Point
111 Point
112 Point
113 Point
200 Encoding device
201 Positional information encoding unit
202 Positional information decoding unit
203 Point cloud generation unit
204 Attribute information encoding unit
205 Bitstream generation unit
211 Hierarchization processing unit
212 Quantization unit
213 Encoding unit
221 Individual hierarchical level processing unit
231 Point classification unit
232 Prediction unit
233 Arithmetic unit
234 Update unit
235 Arithmetic unit
400 Decoding device
401 Decoding target LOD depth setting unit
402 Encoded data extraction unit
403 Positional information decoding unit
404 Attribute information decoding unit
405 Point cloud generation unit
421 Decoding unit
422 Inverse quantization unit
423 Inverse hierarchization processing unit
441 Individual hierarchical level processing unit
451 Prediction unit
452 Arithmetic unit
453 Merge processing unit

The invention claimed is:

1. An information processing apparatus comprising
a hierarchization unit configured to perform hierarchization of attribute information about a point cloud representing a three-dimensional object by recursively repeating, on a reference point, a process of classifying points of the point cloud into a prediction point that is a point at which a difference value between the attribute information and a predicted value is left, and the reference point that is a point at which the attribute information is referred to during derivation of the predicted value,
wherein, during the hierarchization, the hierarchization unit is further configured to select the prediction point in such a manner that a point also exists in a voxel of a hierarchical level one level higher than a hierarchical level to which voxels containing points of a current hierarchical level belong; and
a quantization unit configured to quantize the difference value of each point of each hierarchical level, using a quantization weight for each hierarchical level of a plurality of hierarchical levels, the difference value having been generated by the hierarchization unit,
wherein the quantization unit is further configured to quantize the difference value, using the quantization weight for each hierarchical level, the quantization weight for a respective hierarchical level of the plurality of hierarchical levels being set to a value greater than the quantization weight for hierarchical levels of the plurality of hierarchical levels lower than the respective hierarchical level, and
wherein the hierarchization unit and the quantization unit are each implemented via at least one processor.

2. The information processing apparatus according to claim 1, wherein the hierarchization unit is further configured to
derive the predicted value of the prediction point, using the attribute information about the reference point weighted in accordance with a distance between the prediction point and the reference point, and
derive the difference value, using the derived predicted value.

3. The information processing apparatus according to claim 2, wherein
the hierarchization unit is further configured to derive the predicted value of the prediction point, using the attribute information about the reference point weighted in accordance with the distance based on positional information at a resolution of a lowest hierarchical level in the point cloud.

4. The information processing apparatus according to claim 2, wherein
the hierarchization unit is further configured to derive the predicted value of the prediction point, using the attribute information about the reference point weighted in accordance with the distance based on positional information at a resolution of the current hierarchical level in the point cloud.

5. The information processing apparatus according to claim 1, further comprising
an encoding unit configured to encode the difference value quantized by the quantization unit and a parameter that defines a function to be used for deriving the quantization weight for each hierarchical level, and generate encoded data,
wherein the encoding unit is implemented via at least one processor.

6. The information processing apparatus according to claim 1, further comprising
an encoding unit configured to encode the difference value quantized by the quantization unit and the quantization weight for each hierarchical level, and generates encoded data,
wherein the encoding unit is implemented via at least one processor.

7. An information processing method comprising:
performing hierarchization of attribute information about a point cloud representing a three-dimensional object by recursively repeating, on a reference point, a process of classifying points of the point cloud into a prediction point that is a point at which a difference value between the attribute information and a predicted value is left, and the reference point that is a point at which the attribute information is referred to during derivation of the predicted value;
selecting, during the hierarchization, the prediction point in such a manner that a point also exists in a voxel of a hierarchical level one level higher than a hierarchical level to which voxels containing points of a current hierarchical level belong;

quantizing the difference value of each point of each hierarchical level of a plurality of hierarchical levels, using a quantization weight for each hierarchical level; and quantizing the difference value, using the quantization weight for each hierarchical level, the quantization weight for a respective hierarchical level of the plurality of hierarchical levels being set to a value greater than the quantization weight for hierarchical levels of the plurality of hierarchical levels lower than the respective hierarchical level.

8. An information processing apparatus comprising an inverse hierarchization unit configured to perform inverse hierarchization of attribute information about a point cloud representing a three-dimensional object, the attribute information having been hierarchized by recursively repeating, on a reference point, a process of classifying points of the point cloud into a prediction point that is a point at which a difference value between the attribute information and a predicted value is left, and the reference point that is a point at which the attribute information is referred to during derivation of the predicted value, wherein, during the inverse hierarchization, the inverse hierarchization unit is further configured to derive the predicted value of the attribute information about the prediction point at each hierarchical level using the attribute information about the reference point and positional information at a resolution of a hierarchical level that is not a lowest hierarchical level of the point cloud, and derive the attribute information about the prediction point using the predicted value and the difference value, and an inverse quantization unit configured to inversely quantize the difference value of each point of each hierarchical level of a plurality of hierarchical levels, using a quantization weight for each hierarchical level, the difference value having been quantized, wherein the inverse quantization unit is further configured to inversely quantize the quantized difference value, using the quantization weight for each hierarchical level, the quantization weight for a respective hierarchical level of the plurality of hierarchical levels being set to a value greater than the quantization weight for hierarchical levels of the plurality of hierarchical levels lower than the respective hierarchical level, and wherein the inverse hierarchization unit and the inverse quantization unit are each implemented via at least one processor.

9. The information processing apparatus according to claim 8, wherein the inverse hierarchization unit is further configured to derive the predicted value, using the attribute information about the reference point and the positional information about the reference point and the prediction point at a resolution of a current hierarchical level.

10. The information processing apparatus according to claim 8, wherein the inverse hierarchization unit is further configured to derive the predicted value of the prediction point, using the attribute information about the reference point weighted in accordance with a distance between the prediction point and the reference point.

11. The information processing apparatus according to claim 8, wherein the inverse hierarchization unit is further configured to hierarchize the attribute information using the positional information, and associate the attribute information with the positional information about each point at each hierarchical level.

12. The information processing apparatus according to claim 8, further comprising a decoding unit configured to decode encoded data, and acquire the quantized difference value and a parameter that defines a function to be used for deriving the quantization weight for each hierarchical level, wherein the decoding unit is implemented via at least one processor.

13. The information processing apparatus according to claim 8, further comprising a decoding unit configured to decode encoded data, and acquire the quantized difference value and the quantization weight for each hierarchical level, wherein the decoding unit is implemented via at least one processor.

14. An information processing method comprising:

performing inverse hierarchization of attribute information about a point cloud representing a three-dimensional object, the attribute information having been hierarchized by recursively repeating, on a reference point, a process of classifying points of the point cloud into a prediction point that is a point at which a difference value between the attribute information and a predicted value is left, and the reference point that is a point at which the attribute information is referred to during derivation of the predicted value;

deriving, during the inverse hierarchization, the predicted value of the attribute information about the prediction point at each hierarchical level using the attribute information about the reference point and positional information at a resolution of a hierarchical level that is not a lowest hierarchical level of the point cloud, and deriving the attribute information about the prediction point using the predicted value and the difference value;

inversely quantizing the difference value of each point of each hierarchical level, using a quantization weight for each hierarchical level of a plurality of hierarchical levels, the difference value having been quantized; and inversely quantizing the quantized difference value, using the quantization weight for each hierarchical level, the quantization weight for a respective hierarchical level of the plurality of hierarchical levels being set to a value greater than the quantization weight for hierarchical levels of the plurality of hierarchical levels lower than the respective hierarchical level.

15. An information processing apparatus comprising:

a generation unit configured to generate information indicating a hierarchical structure of positional information about a point cloud representing a three-dimensional object;

a hierarchization unit configured to hierarchize attribute information about the point cloud to associate the attribute information with the hierarchical structure of the positional information, on a basis of the information generated by the generation unit; and a quantization unit configured to quantize a difference value between the attribute information and a predicted value of each point of each hierarchical level, using a quantization weight for each hierarchical level, the difference value having been generated by the hierarchization unit, wherein the quantization unit is further configured to quantize the difference value, using the quantization weight for each hierarchical level of a plurality of hierarchical levels, the quantization weight for a respective hierarchical level of the plurality of hierarchical levels being set to a value greater than the quantization weight for hierarchical levels of the plurality of hierarchical levels lower than the respective hierarchical level, and wherein the generation unit, the hierarchization unit, and the quantization unit are each implemented vii at least one processor.

16. An information processing apparatus comprising:

a generation unit configured to generate information indicating a hierarchical structure of positional information about a point cloud representing a three-dimensional object;

an inverse hierarchization unit configured to inversely hierarchize attribute information about the point cloud, to associate a hierarchical structure of the attribute information with the hierarchical structure of the positional information, on a basis of the information generated by the generation unit; and an inverse quantization unit configured to inversely quantize a difference value between the attribute information and a predicted value of each point of each hierarchical level of a plurality of hierarchical levels, using a quantization weight for each hierarchical level, the difference value having been quantized, wherein the inverse quantization unit is further configured to inversely quantize the quantized difference value, using the quantization weight for each hierarchical level, the quantization weight for a respective hierarchical level of the plurality of hierarchical levels being set to a value greater than the quantization weight for hierarchical levels of the plurality of hierarchical levels lower than the respective hierarchical level, and wherein the generation unit, the inverse hierarchization unit, and the inverse quantization unit are each implemented via at least one processor.

* * * * *